US012750737B2

(12) United States Patent
Khoshkholgh Dashtaki et al.

(10) Patent No.: US 12,750,737 B2
(45) Date of Patent: Sep. 29, 2026

(54) MULTIPLEXING CONTROL INFORMATION FOR CONFIGURATION OF WIRELESS RESOURCES

(71) Applicant: Comcast Cable Communications, LLC, Philadelphia, PA (US)

(72) Inventors: Mohammad Ghadir Khoshkholgh Dashtaki, Burnaby (CA); Ali Cagatay Cirik, Chantilly, VA (US); Esmael Hejazi Dinan, McLean, VA (US); Hyoungsuk Jeon, Centreville, VA (US); Hsin-Hsi Tsai, Taichung City (TW)

(73) Assignee: Comcast Cable Communications, LLC, Philadelphia, PA (US)

( * ) Notice: Subject to any disclaimer, the term of this patent is extended or adjusted under 35 U.S.C. 154(b) by 302 days.

(21) Appl. No.: 18/423,409

(22) Filed: Jan. 26, 2024

(65) Prior Publication Data

US 2024/0276305 A1 Aug. 15, 2024

Related U.S. Application Data

(60) Provisional application No. 63/441,264, filed on Jan. 26, 2023.

(51) Int. Cl.
*H04W 28/18* (2009.01)
*H04L 1/1812* (2023.01)
*H04W 48/16* (2009.01)

(52) U.S. Cl.
CPC .......... *H04W 28/18* (2013.01); *H04L 1/1812* (2013.01); *H04W 48/16* (2013.01)

(58) Field of Classification Search
CPC ...... H04W 28/18; H04W 48/16; H04L 1/1812
See application file for complete search history.

(56) References Cited

U.S. PATENT DOCUMENTS

2020/0314889 A1 10/2020 Cirik et al.
2021/0050933 A1* 2/2021 Myung ................ H04L 1/0009
2022/0038211 A1 2/2022 Talarico et al.
2022/0116157 A1* 4/2022 Papasakellariou .... H04L 1/1664
2022/0210806 A1 6/2022 Rastegardoost et al.
(Continued)

FOREIGN PATENT DOCUMENTS

WO 2021214666 A1 10/2021
WO 2022239087 A1 11/2022
WO WO-2024154311 A1 * 7/2024 ........... H04W 72/21

OTHER PUBLICATIONS

3GPP TS 38.211 V17.3.0 (Sep. 2022), 3rd Generation Partnership Project; Technical Specification Group Radio Access Network; NR; Physical channels and modulation (Release 17).
(Continued)

*Primary Examiner* — Jael M Ulysse
(74) *Attorney, Agent, or Firm* — Banner & Witcoff, Ltd.

(57) ABSTRACT

A wireless device may communicate with a base station. A message from the base station may indicate one or more occasions for the wireless device to transmit and/or receive data and/or control information. The wireless device may use uplink control information to inform the base station whether one or more occasions are unused. The message may indicate if/whether such uplink control information is allowed to be multiplexed into an occasion and/or an offset value associated with such multiplexing.

20 Claims, 28 Drawing Sheets

(56) References Cited

U.S. PATENT DOCUMENTS

2022/0248446 A1 8/2022 Zewail et al.
2022/0311555 A1* 9/2022 He ........................ H04L 1/1854
2022/0407617 A1* 12/2022 Myung ............... H04L 41/0806
2023/0023656 A1* 1/2023 Rastegardoost .. H04W 72/0446
2023/0095899 A1* 3/2023 Yang ..................... H04W 72/21 370/329
2023/0156713 A1* 5/2023 Yang ..................... H04L 1/1671 370/329
2023/0171802 A1* 6/2023 Nunome ........... H04W 74/0808 370/329
2023/0254850 A1* 8/2023 Moon ................... H04W 72/02 370/329
2023/0345514 A1* 10/2023 Awoniyi-Oteri ...... H04L 1/1812
2023/0354320 A1* 11/2023 Papasakellariou ........................... H04W 72/1268
2023/0403702 A1* 12/2023 Su ......................... H04L 1/1896
2024/0008034 A1* 1/2024 Huang .................. H04L 5/0053
2024/0155604 A1* 5/2024 Maamari ........... H04W 72/1268
2024/0224271 A1* 7/2024 Xiong ............... H04W 56/0015
2024/0276489 A1* 8/2024 Seok ................. H04W 72/1268
2024/0306154 A1* 9/2024 Wang .................... H04L 1/0026
2024/0349277 A1* 10/2024 Singh ................ H04W 72/1268
2025/0056565 A1* 2/2025 Guo .................... H04W 72/232
2025/0119921 A1* 4/2025 Rastegardoost .......... H04L 1/08

OTHER PUBLICATIONS

3GPP TS 38.212 V17.3.0 (Sep. 2022), Technical Specification, 3rd Generation Partnership Project; Technical Specification Group Radio Access Network; NR; Multiplexing and channel coding (Release 17).
3GPP TS 38.213 V17.3.0 (Sep. 2022), Technical Specification, 3rd Generation Partnership Project; Technical Specification Group Radio Access Network; NR; Physical layer procedures for control (Release 17).
3GPP TS 38.214 V17.3.0 (Sep. 2022), Technical Specification, 3rd Generation Partnership Project; Technical Specification Group Radio Access Network; NR; Physical layer procedures for data (Release 17).
3GPP TS 38.300 V17.1.0 (Jun. 2022), 3rd Generation Partnership Project; Technical Specification Group Radio Access Network; NR; NR and NG-RAN Overall Description; Stage 2 (Release 17).
3GPP TS 38.321 V17.2.0 (Sep. 2022), 3rd Generation Partnership Project; Technical Specification Group Radio Access Network; NR; Medium Access Control (MAC) protocol specification (Release 17).
3GPP TS 38.331 V17.1.0 (Jun. 2022), 3rd Generation Partnership Project; Technical Specification Group Radio Access Network; NR; Radio Resource Control (RRC) protocol specification (Release 17).
3GPP TSG RAN WG1 #111, Toulouse, France, Nov. 14-18, 2022, Title: Title: RAN1 Chair's Notes.
R1-2208421 3GPP TSG RAN WG1 Meeting #110bis-e, e-Meeting, Oct. 10-19, 2022, Source: Huawei, HiSilicon, Title: Discussion on XR-specific capacity enhancements techniques.
R1-2208661 3GPP TSG RAN WG1 Meeting #110bis-e, e-Meeting, Oct. 10-19, 2022, Source: vivo, Title: Discussion on XR specific capacity enhancements.
R1-2208863 3GPP TSG RAN WG1 Meeting #110bis-e, e-Meeting, Oct. 10-19, 2022, Source: OPPO, Title: Discussion on XR specific capacity enhancements techniques.
R1-2208952 3GPP TSG RAN WG1 Meeting #110bis-e, e-Meeting, Oct. 10-19, 2022, Source: CATT, Title: UE power saving techniques for XR.
R1-2208999 3GPP TSG RAN WG1 Meeting #110bis-e, e-Meeting, Oct. 10-19, 2022, Source: TCL Communication, Title: Discussion on XR specific power saving techniques.
R1-2209113 3GPP TSG RAN WG1 Meeting #110bis-e, e-Meeting, Oct. 10-19, 2022, Source: Sony, Title: Considerations on XR-specific capacity enhancements.
R1-2209198 3GPP TSG RAN WG1 Meeting #110bis-e, e-Meeting, Oct. 10-19, 2022, Source: ZTE, Sanechips, Title: XR specific capacity enhancements.
R1-2209535 3GPP TSG RAN WG1 Meeting #110bis-e, e-Meeting, Oct. 10-19, 2022, Source: Nokia, Nokia Shanghai Bell, Title: XR-specific power saving enhancements.
R1-2209597 3GPP TSG RAN WG1 Meeting #110bis-e, e-Meeting, Oct. 10-19, 2022, Source: Apple Inc., Title: XR specific power saving techniques.
R1-2212608 3GPP TSG-RAN WG1 Meeting #111, Toulouse, France, Nov. 10-19, 2022, Source: Moderator (Ericsson), Title: Moderator Summary#3—Study on XR Specific Capacity Improvements.
R1-2212700 3GPP TSG-RAN WG1 Meeting #111, Toulouse, France, Nov. 14-18, 2022, Source: Moderator (Qualcomm Incorporated), Title: Moderator Summary #3 on XR specific power saving techniques.
R2-2209457 3GPP TSG-RAN WG2 Meeting #119bis-e, e-Meeting, Oct. 10~19, 2022, Source: Qualcomm Incorporated, Title: Scheduling enhancements for capacity improvement.
R2-2209473 3GPP TSG-RAN WG2 Meeting #119bis-e, e-Meeting, Oct. 10-19, 2022, Source: CATT, Title: Discussion on CG enhancements.
R2-2209491 3GPP TSG-RAN WG2 Meeting #119bis-e, e-Meeting, Oct. 10-19, 2022, Source: vivo, Title: Discussion on scheduling enhancements XR-specific capacity improvements.
R2-2209516 3GPP TSG-RAN WG2 Meeting #119bis-e, e-Meeting, Oct. 10-19, 2022, Source: Huawei, HiSilicon, Title: Further discussion on C-DRX enhancements for XR.
R2-2209592 3GPP TSG-RAN WG2 Meeting #119bis-e, e-Meeting, Oct. 10-19, 2022, Source: MediaTek Inc., Title: Scheduling enhancement for XR capacity.
R2-2209692 3GPP TSG-RAN WG2 Meeting #119bis-e, e-Meeting, Oct. 10-19, 2022, Source: InterDigital Inc., Title: Discussion on scheduling enhancements.
R2-2209783 3GPP TSG-RAN WG2 Meeting #119bis-e, e-Meeting, Oct. 10-19, 2022, Source: Apple, Title: Considerations of Scheduling Enhancement for XR.
R2-2209940 3GPP TSG-RAN WG2 Meeting #119bis-e, e-Meeting, Oct. 10-19, 2022, Source: Lenovo, Title: Discussion of scheduling enhancement.
R2-2209991 3GPP TSG-RAN WG2 Meeting #119bis-e, e-Meeting, Oct. 10-19, 2022, Source: Spreadtrum Communications, Title: Some enhancements on XR scheduling.
R2-2210025 3GPP TSG-RAN WG2 Meeting #119bis-e, e-Meeting, Oct. 10-19, 2022, Source: OPPO, Title: Discussion on scheduling enhancement.
R2-2210151 3GPP TSG-RAN WG2 Meeting #119bis-e, e-Meeting, Oct. 10-19, 2022, Source: CMCC, Title: Consideration on scheduler enhancement for XR.
R2-2210187 3GPP TSG-RAN WG2 Meeting #119bis-e, Elbonia, Oct. 10 - 19, 2022, Source: Nokia, Nokia Shanghai Bell, Title: Multiple CG configurations for XR.
R2-2210216 3GPP TSG-RAN WG2 Meeting #119bis-e, Online meeting, 10th Oct. 19, 2022, Source: Sony, Title: Considerations on XR specific capacity improvements.
R2-2213002 3GPP TSG-RAN WG2 Meeting #120 Toulouse, France, Online, Nov. 2022, Source: Vice Chairman (Nokia), Title: Report on LTE legacy, DCCA, MUSIM, Slicing, 71 GHz, XR and QoE.
3GPP TR 38.835 V0.4.0 (Dec. 2022), 3rd Generation Partnership Project; Technical Specification Group Radio Access Network; NR; Study on XR Enhancements for NR (Release 18).
May 8, 2024—International Search Report and Written Opinion—App No. PCT/US2024/013129.
R1-2211552 3GPP TSG RAN WG1 Meeting #111, Toulouse, France, Nov. 14-18, 2022, Source: Nokia, Nokia Shanghai Bell, Title: XR-specific capacity enhancements.
Jun. 16, 2026—Japanese Office Action—JP App. 2025-543772.

* cited by examiner

| DCI format | Usage |
|---|---|
| 0_0 | Scheduling of PUSCH in one cell |
| 0_1 | Scheduling of one or multiple PUSCH in one cell, or indicating CG-DFI for configured grant PUSCH |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |
| 3_0 | Scheduling of NR sidelink in one cell |
| 3_1 | Scheduling of LTE sidelink in one cell |

FIG. 17

MULTIPLEXING CONTROL INFORMATION FOR CONFIGURATION OF WIRELESS RESOURCES

CROSS-REFERENCE TO RELATED APPLICATIONS

This application claims the benefit of U.S. Provisional Application No. 63/441,264, filed on Jan. 26, 2023. The above referenced application is hereby incorporated by reference in its entirety.

BACKGROUND

In a wireless communication system, a wireless device communicates with a base station. Configuration messages are used to configure wireless resources for the communications between the wireless device and the base station.

SUMMARY

The following summary presents a simplified summary of certain features. The summary is not an extensive overview and is not intended to identify key or critical elements.

One or more wireless devices may communicate with a base station. One or more messages, such as radio resource control messages, may be used to configure wireless resources for the communication. A message may indicate one or more occasions for a wireless device to transmit and/or receive data and/or control information. For example, the wireless device may use uplink control information to inform the base station whether one or more occasions are unused and/or to send an acknowledgment for a communication. Such control information may be multiplexed into another occasion. The message may indicate if/whether the control information informing unused occasion(s) is allowed to be multiplexed into an occasion and/or the message may indicate an offset value associated with such multiplexing. For example, if other control information exists, the message may indicate if the control information informing unused occasion(s) is allowed to be jointly multiplexed together with the other control information and/or associated offset value(s).

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 17 shows examples of various downlink control information (DCI) formats.

DETAILED DESCRIPTION

Figure 1A:
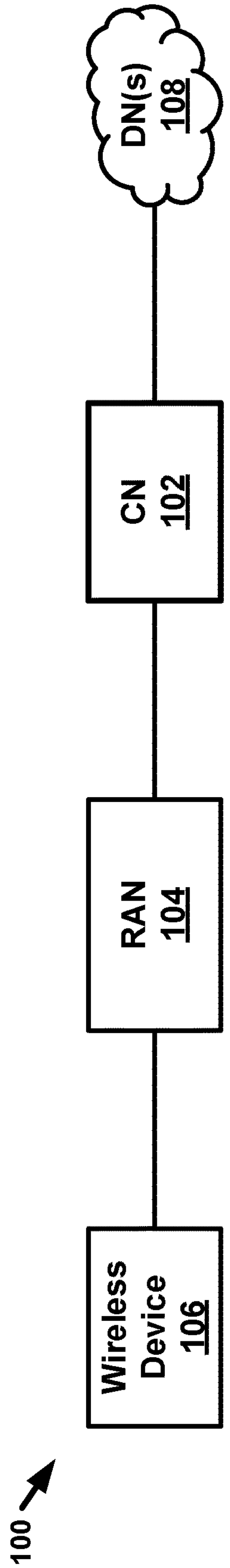
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNS (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (CNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
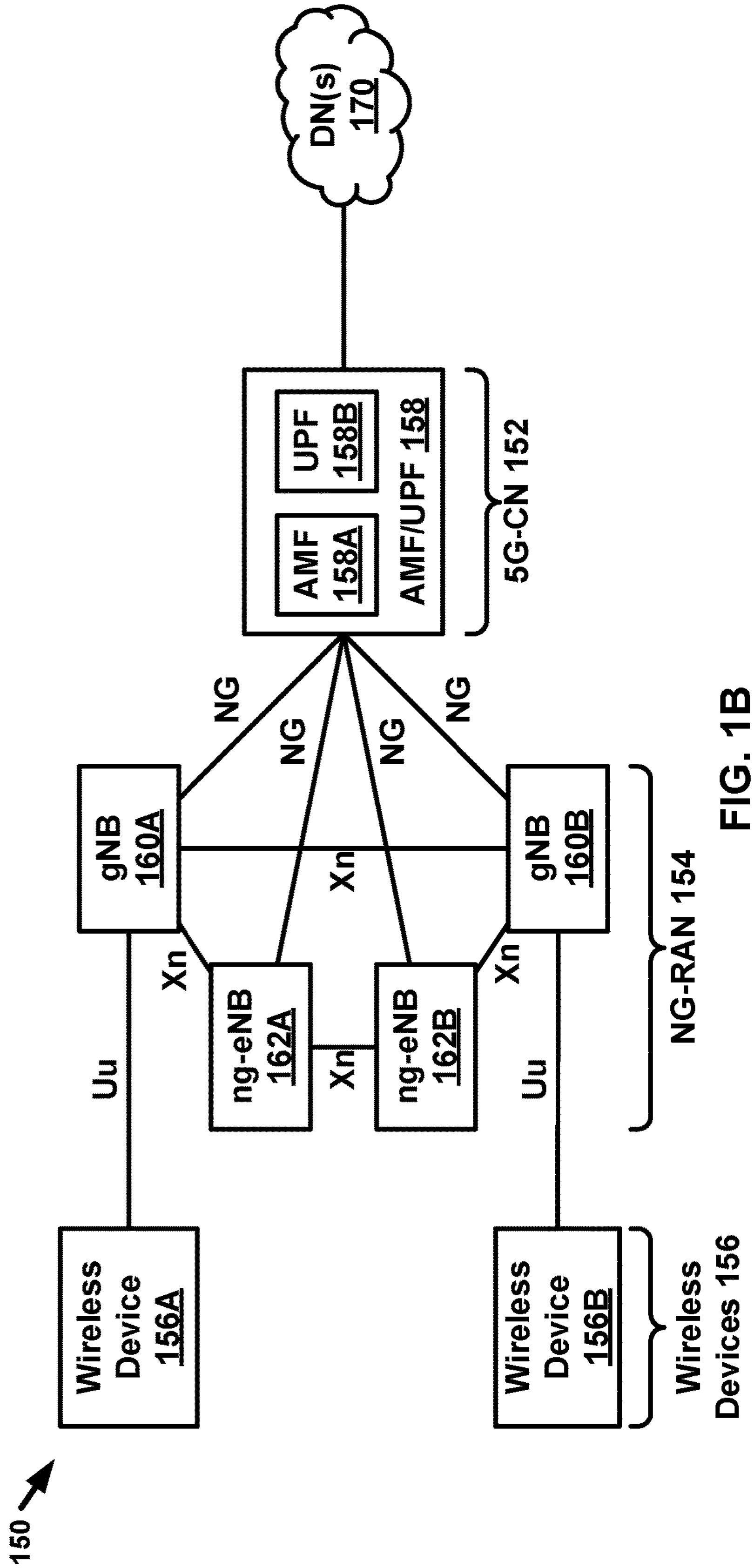

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNS (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QOS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
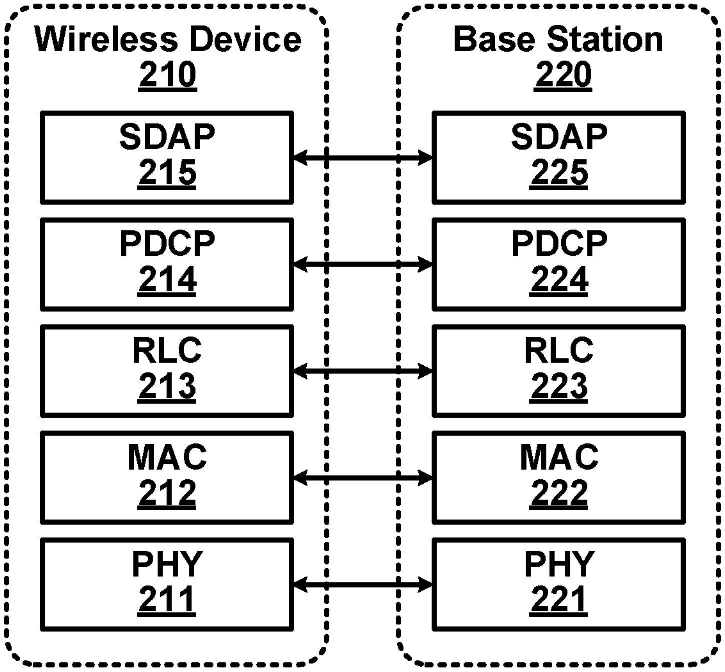
FIG. 2A shows an example user plane.
Figure 2B:
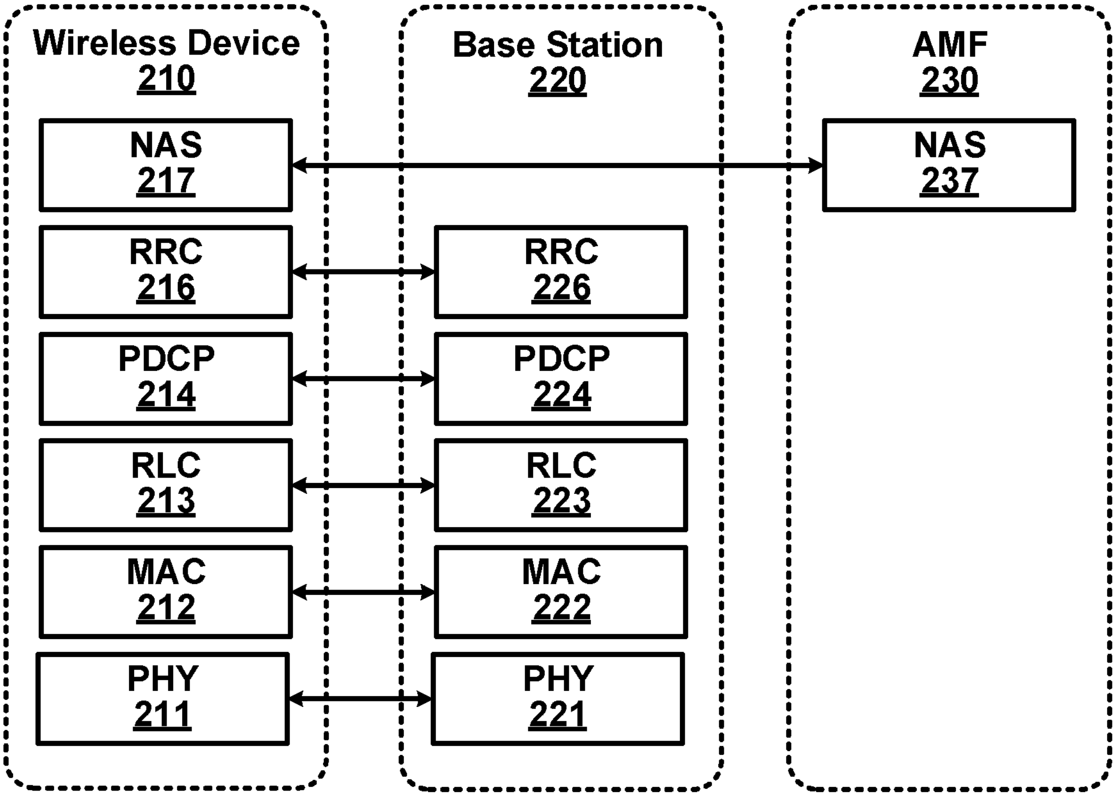
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
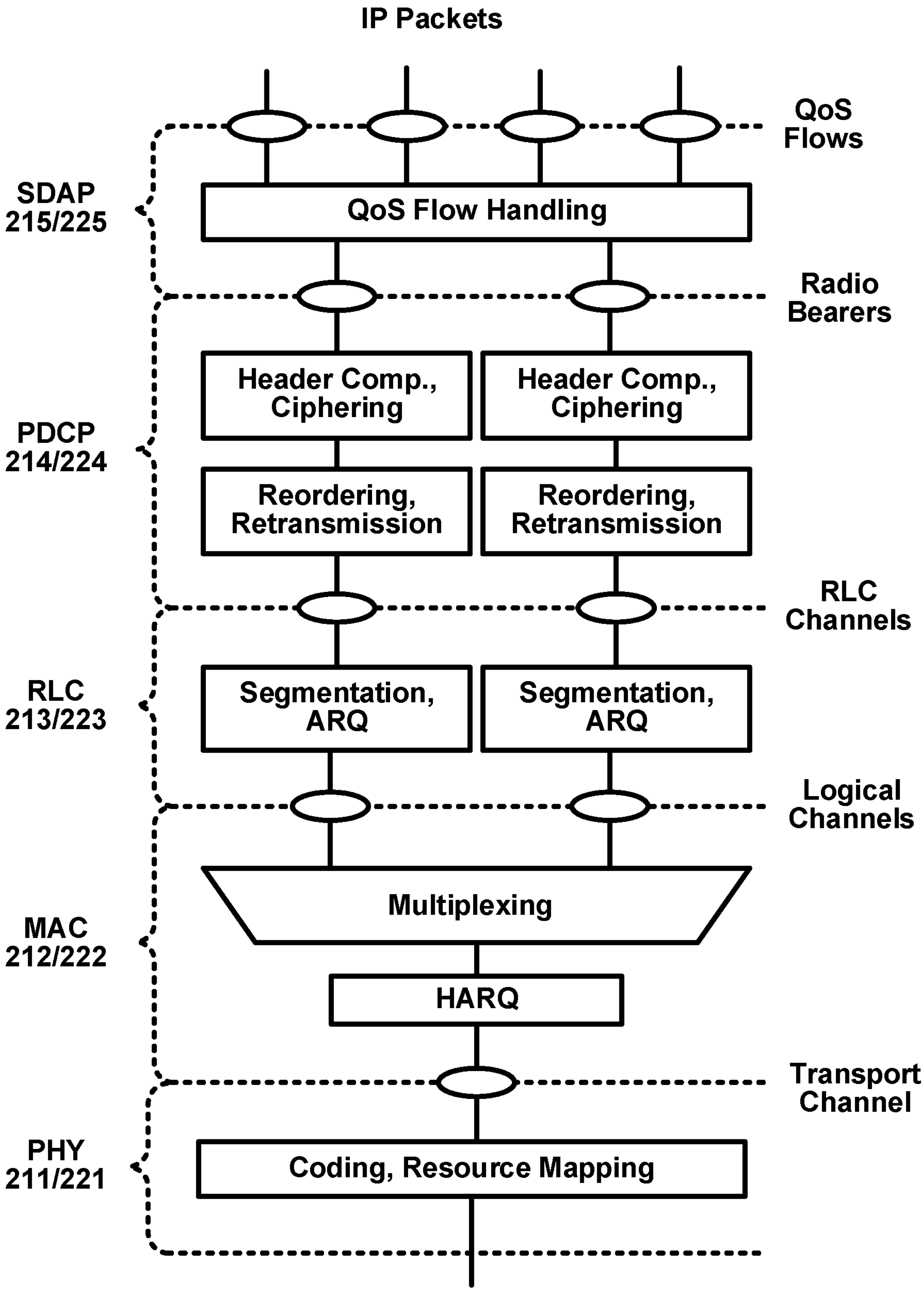
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QOS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity example/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figure 4A:
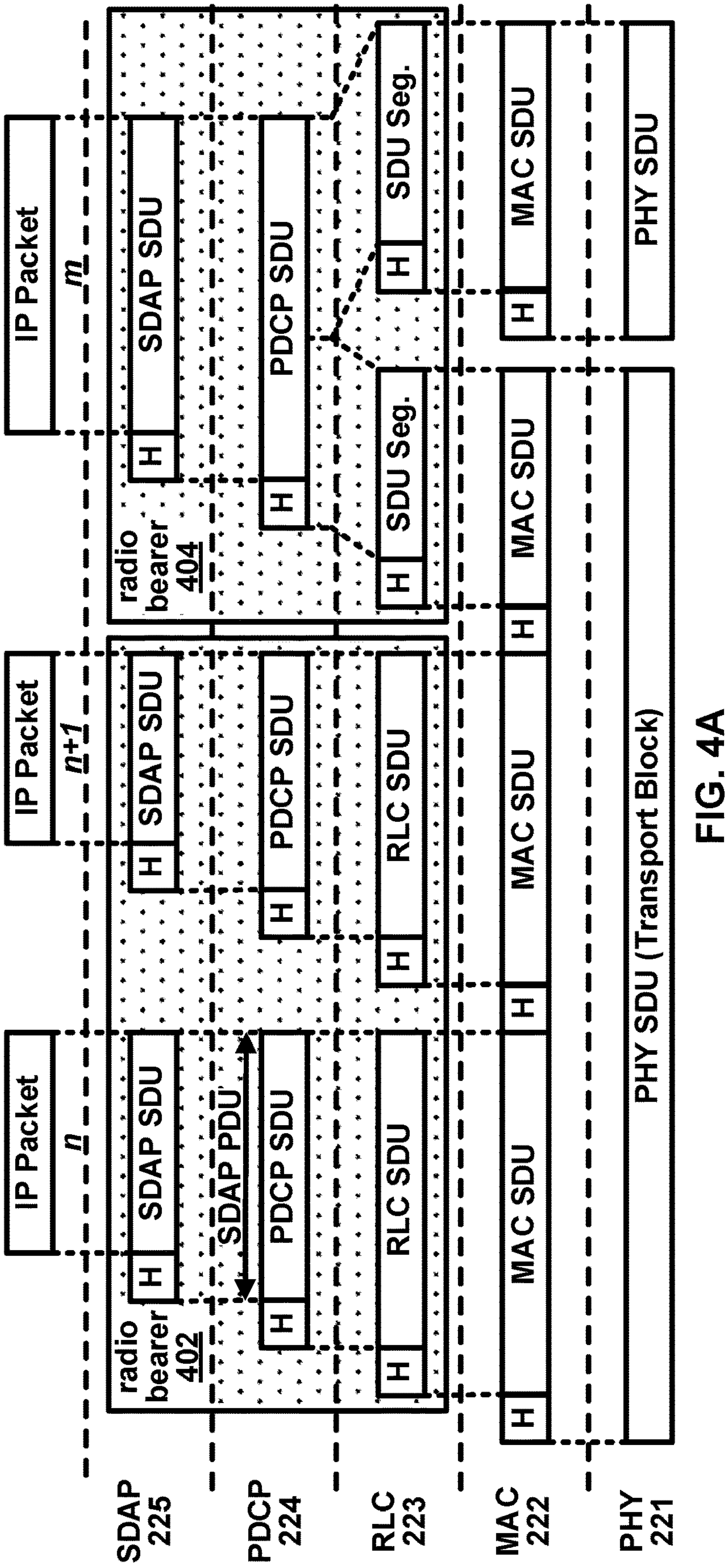
FIG. 4A shows an example downlink data flow for a user plane configuration.

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration) . The NR MAC PDU structure may reduce a processing time and/or associated latency, for example, if the MAC PDU subheaders are computed before assembling the full MAC PDU.

Figure 4B:
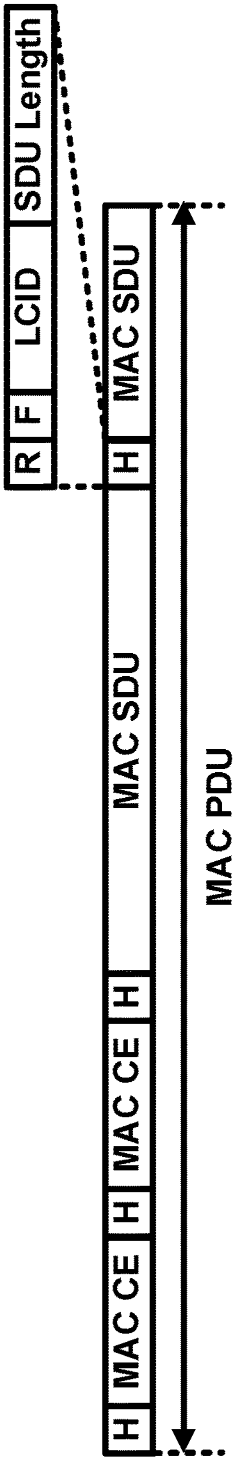
FIG. 4B shows an example format of a Medium Access Control (MAC) subheader in a MAC Protocol Data Unit (PDU).

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figure 5B:
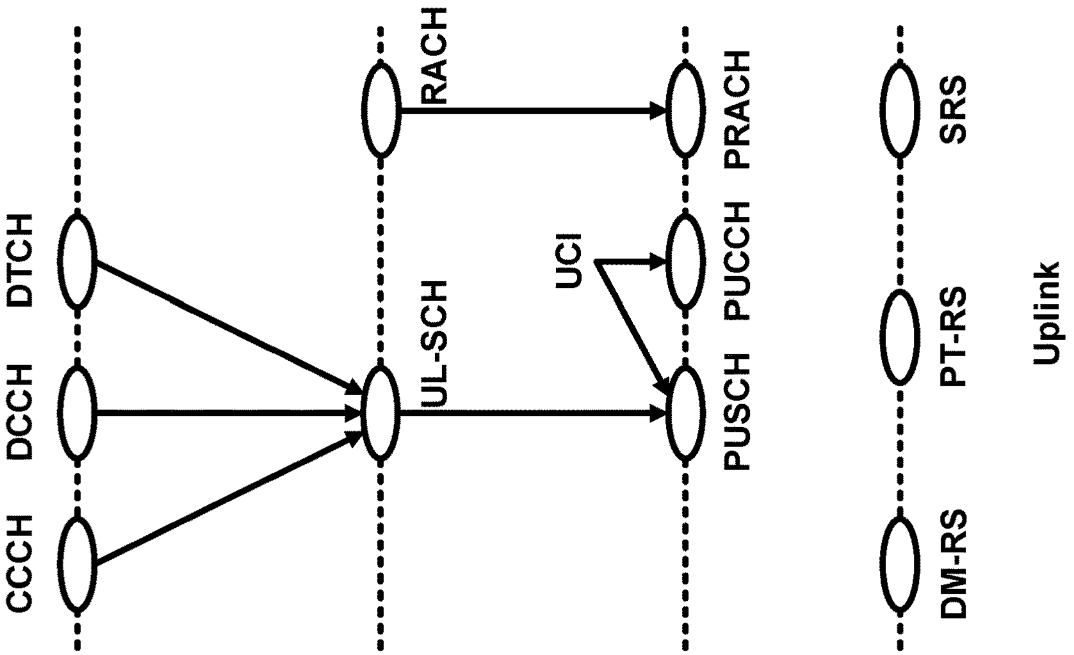
FIG. 5B shows an example mapping for uplink channels.
Figure 5A:
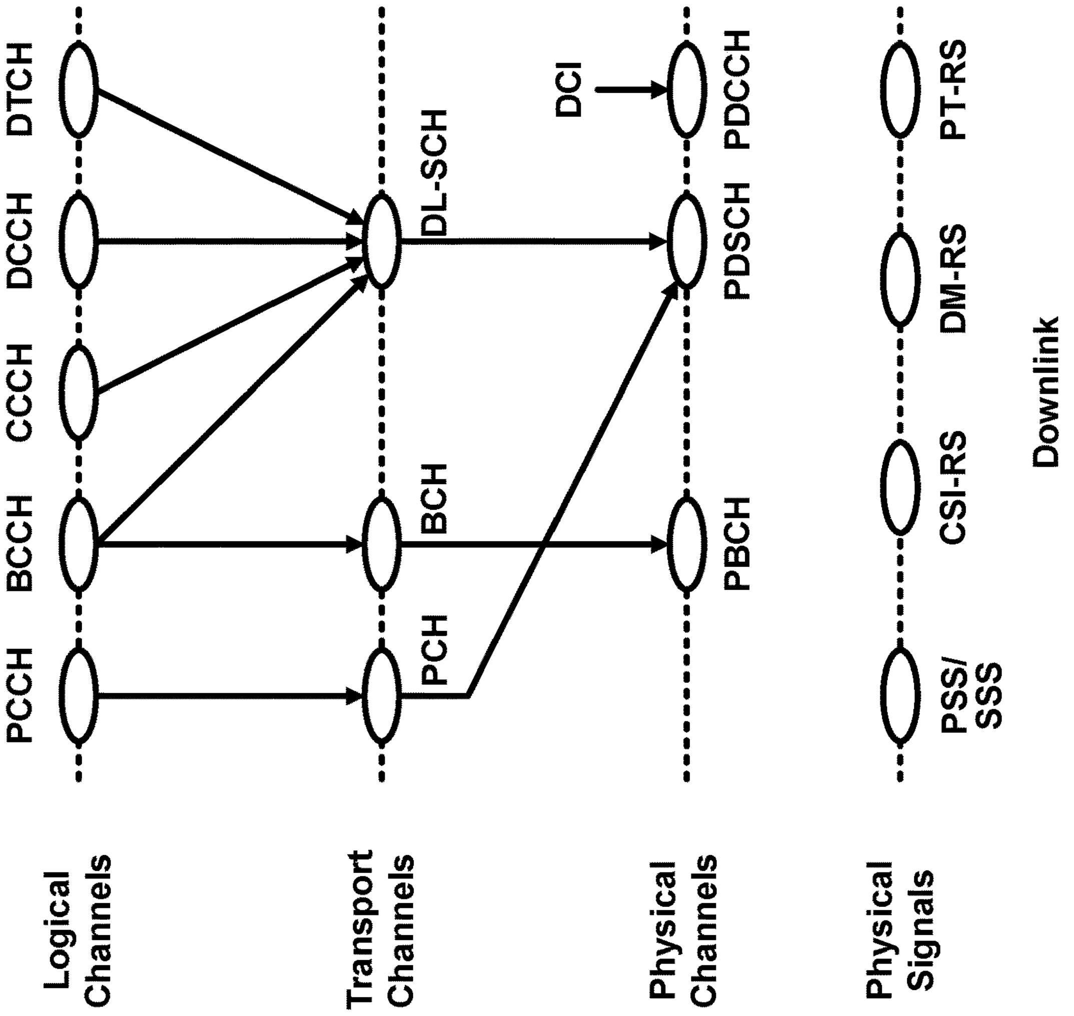
FIG. 5A shows an example mapping for downlink channels.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless devices).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
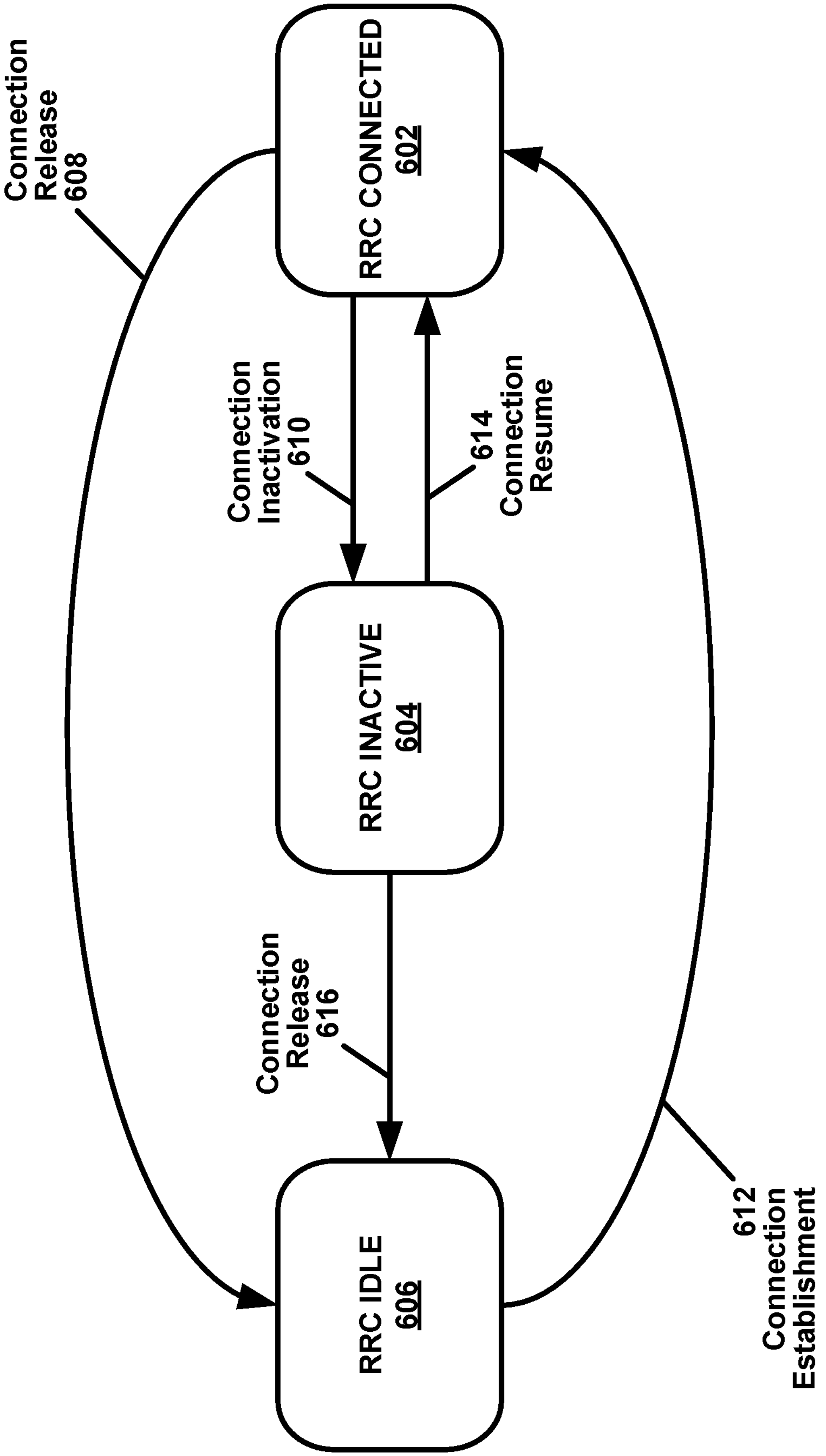
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by a RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., each discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new wireless device registration area, for example, if the wireless device moves (e.g., via a cell reselection) to a cell associated with a TAI that may not be included in the list of TAIs associated with the wireless device registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
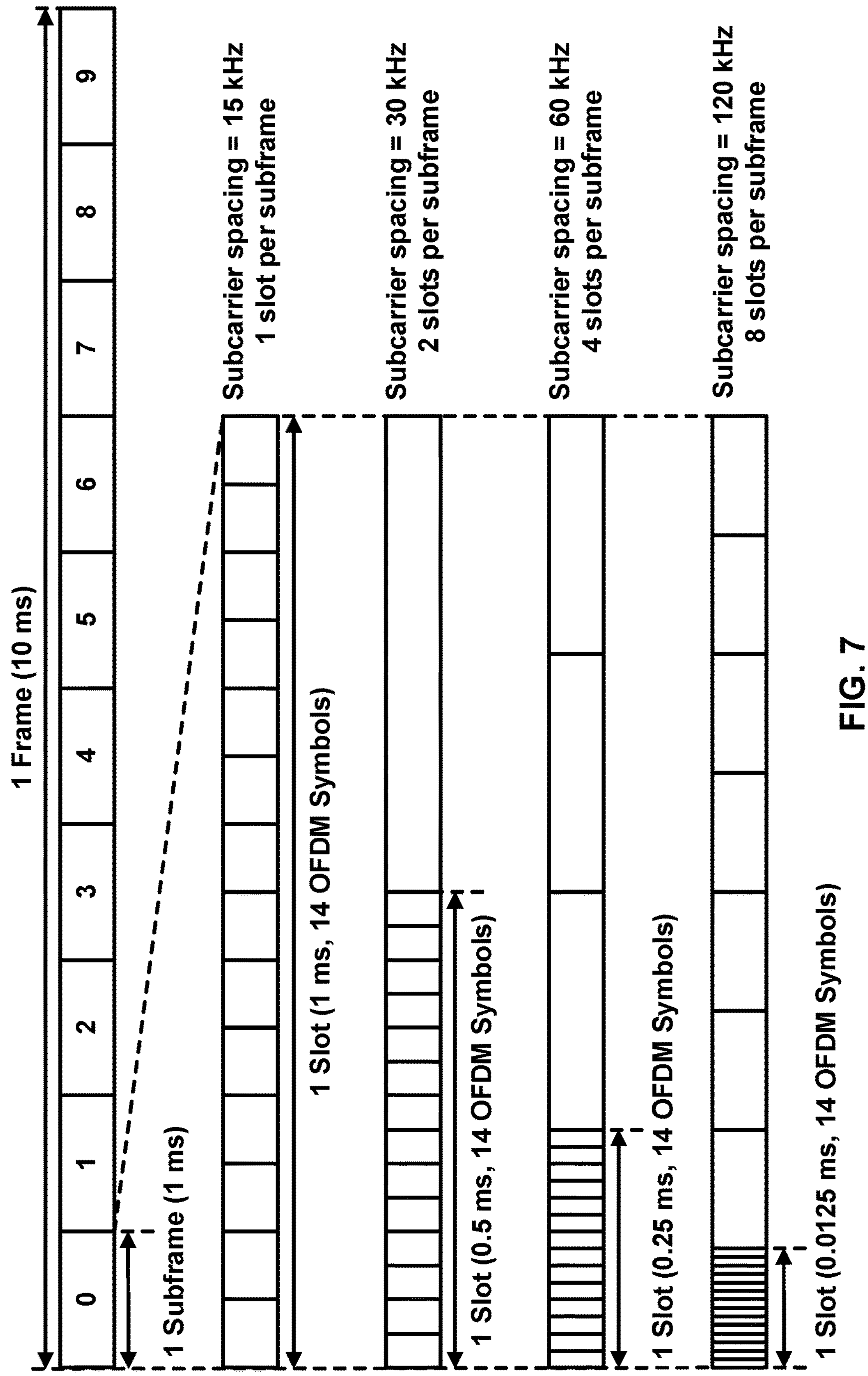
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/cyclic prefix duration combinations: 15 kHz/4.7 μs; 30 kHz/2.3 μs; 60 kHz/1.2 μs; 120 kHz/0.59 μs; 240 kHz/0.29 μs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
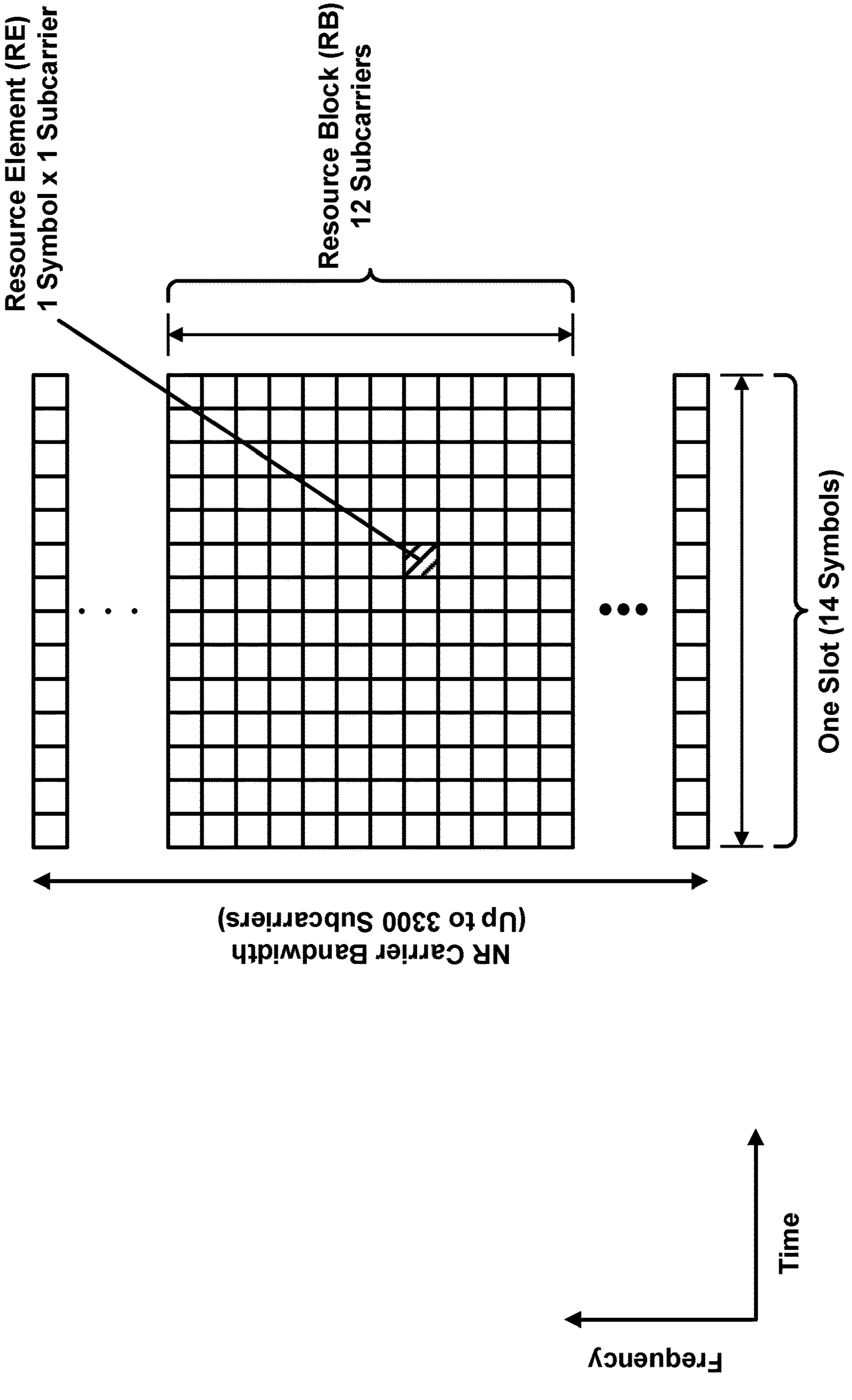
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after (e.g., based on or in response to) receiving DCI indicating the second BWP as an active BWP. A wireless device may switch an active BWP from a first BWP to a second BWP, for example, after (e.g., based on or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
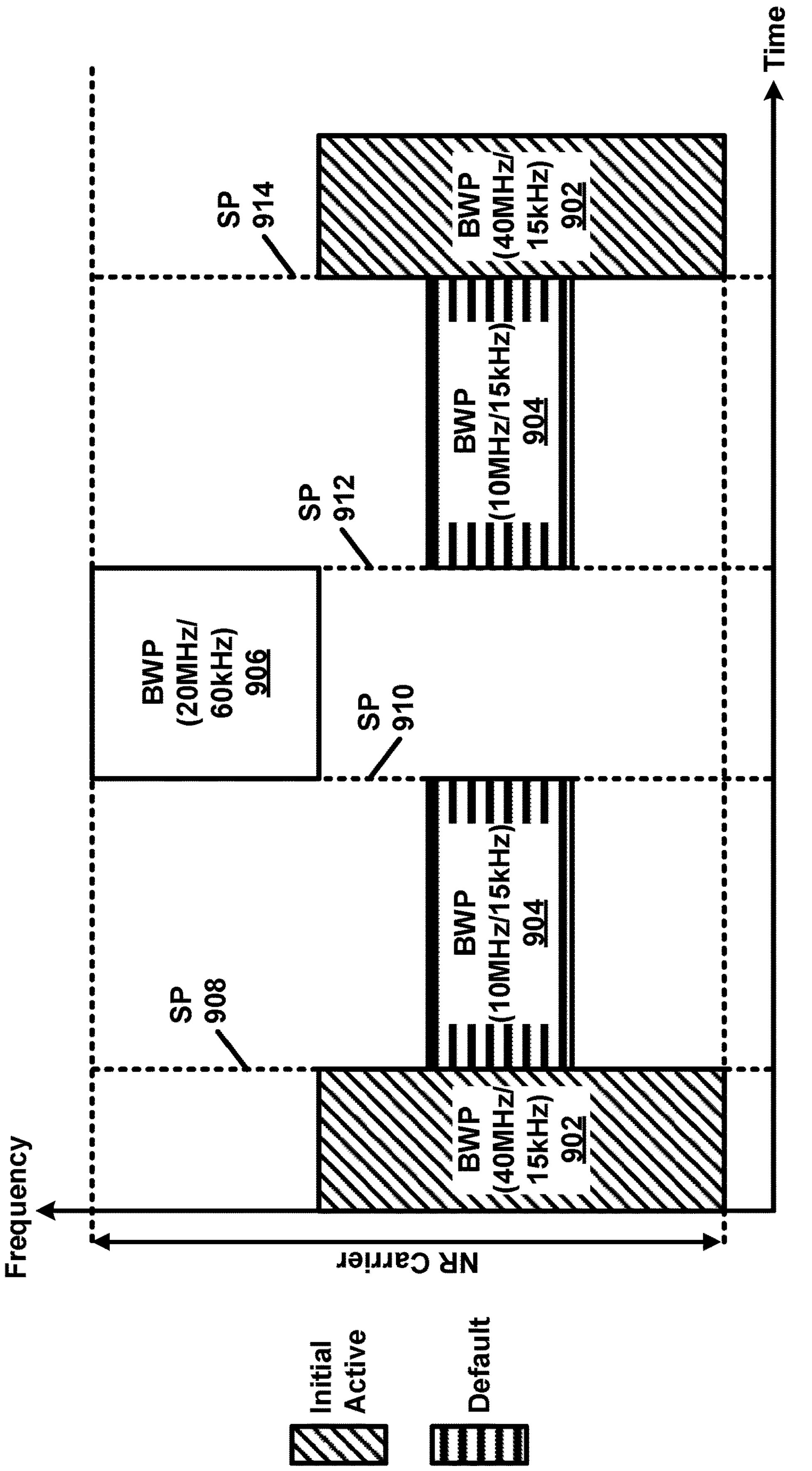
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP

904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after (e.g., based on or in response to) an expiry of a BWP inactivity timer (e.g., indicating switching to the default BWP). The switching at the switching point 908 may occur, for example, after (e.g., based on or in response to) receiving DCI indicating BWP 904 as the active BWP. The wireless device may switch at a switching point 910 from an active BWP 904 to the BWP 906, for example, after or in response to receiving DCI indicating BWP 906 as a new active BWP. The wireless device may switch at a switching point 912 from an active BWP 906 to the BWP 904, for example, after (e.g., based on or in response to) an expiry of a BWP inactivity timer. The wireless device may switch at the switching point 912 from an active BWP 906 to the BWP 904, for example, after or in response to receiving DCI indicating BWP 904 as a new active BWP. The wireless device may switch at a switching point 914 from an active BWP 904 to the BWP 902, for example, after or in response to receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
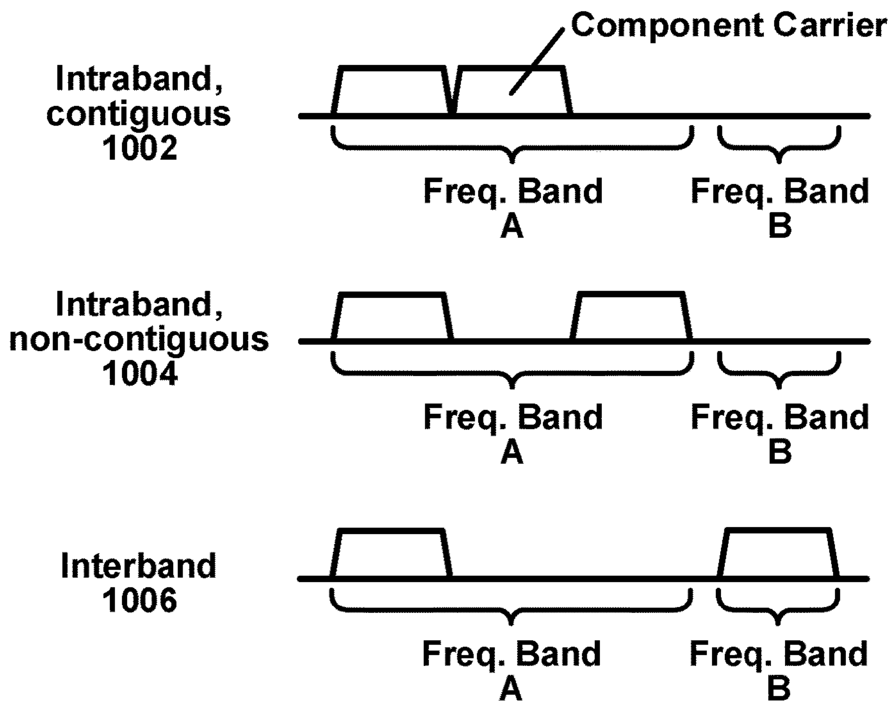
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after (e.g., based on or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
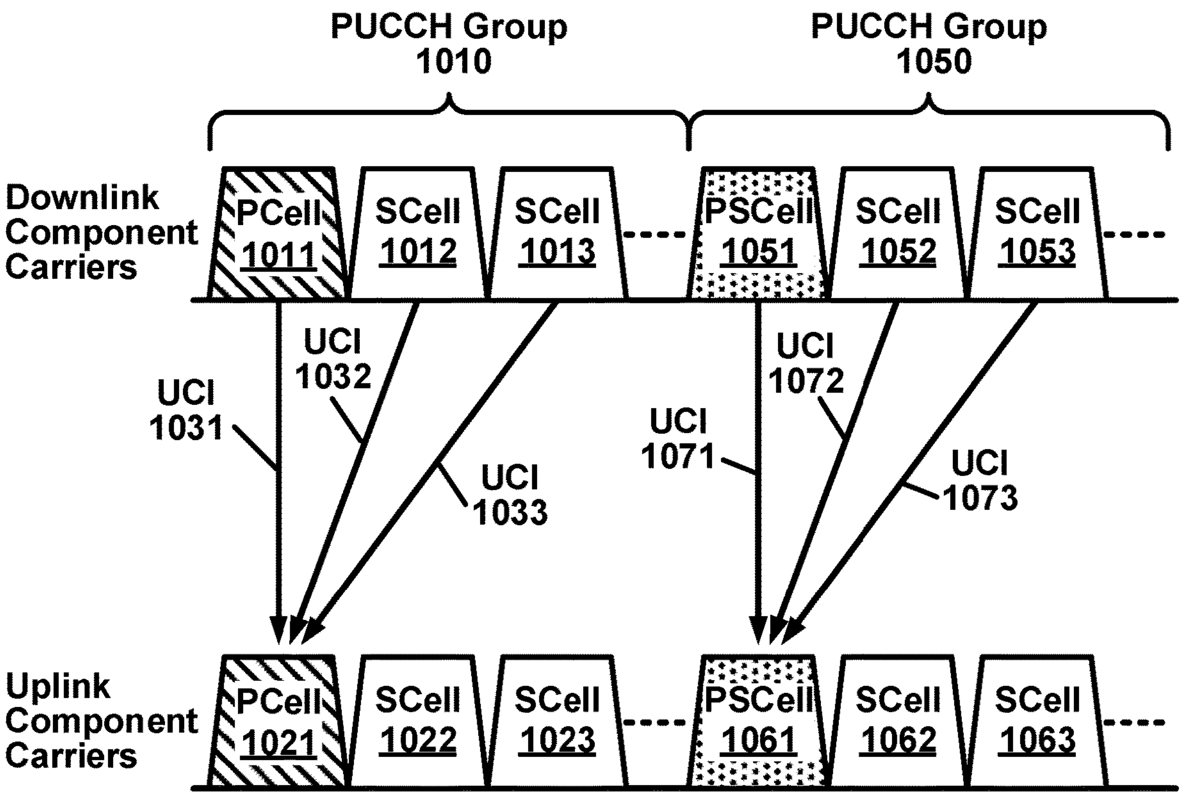
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
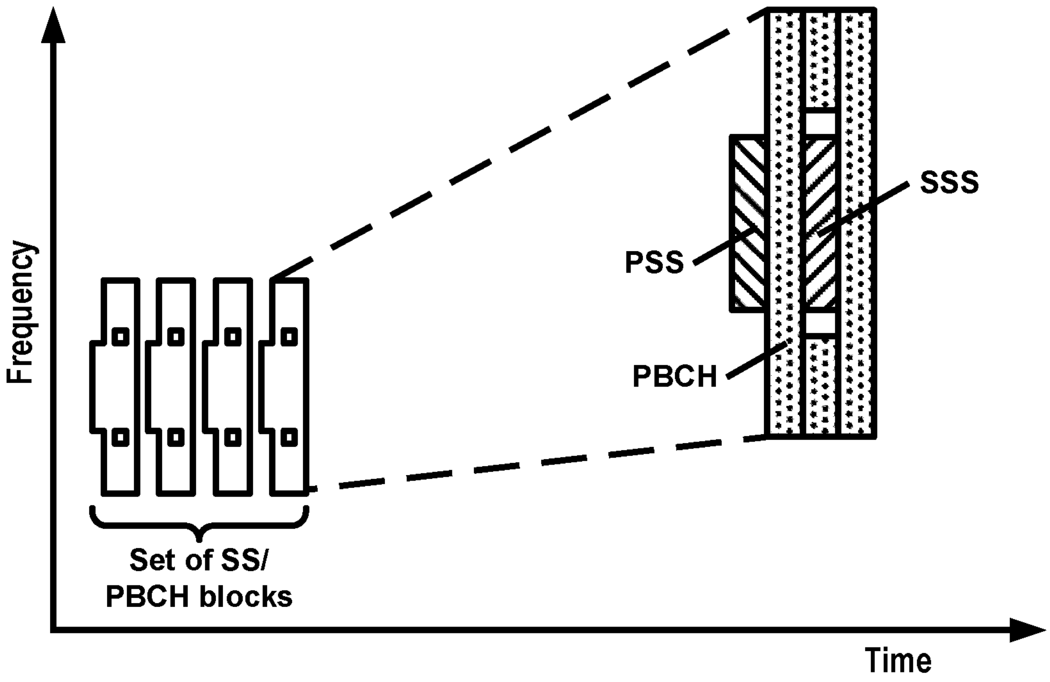
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indexes. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in an SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
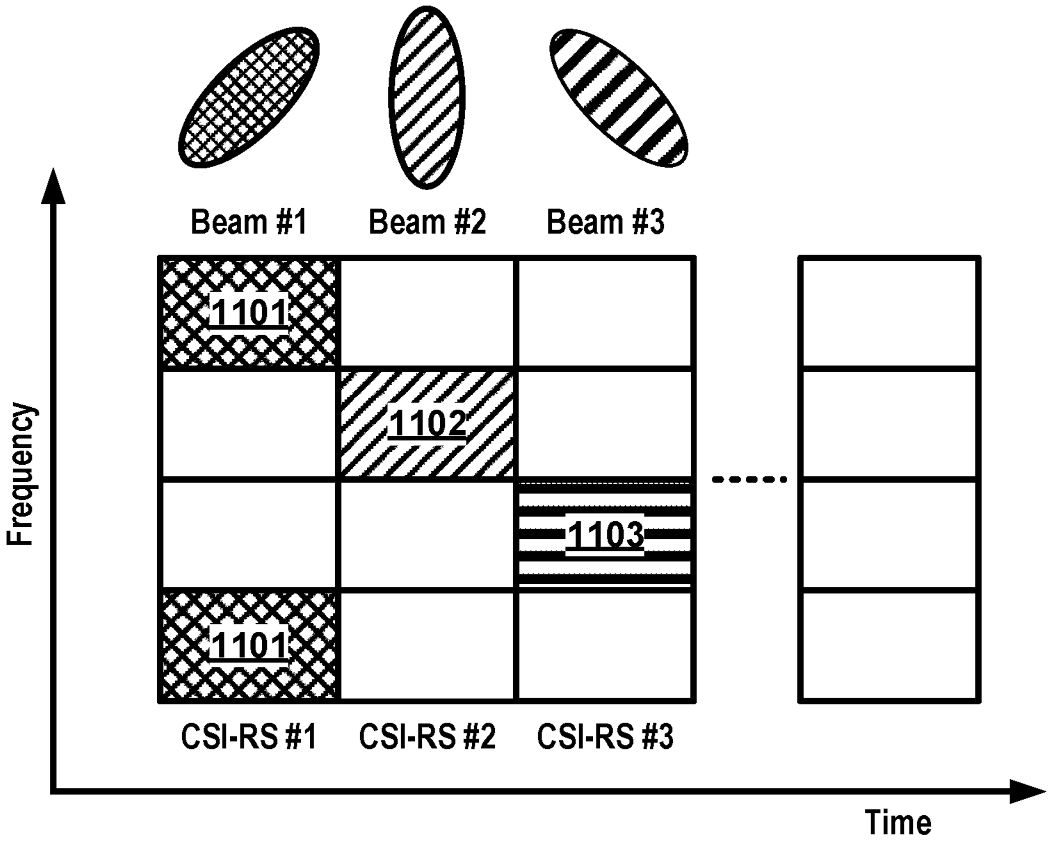
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

Figure 12A:
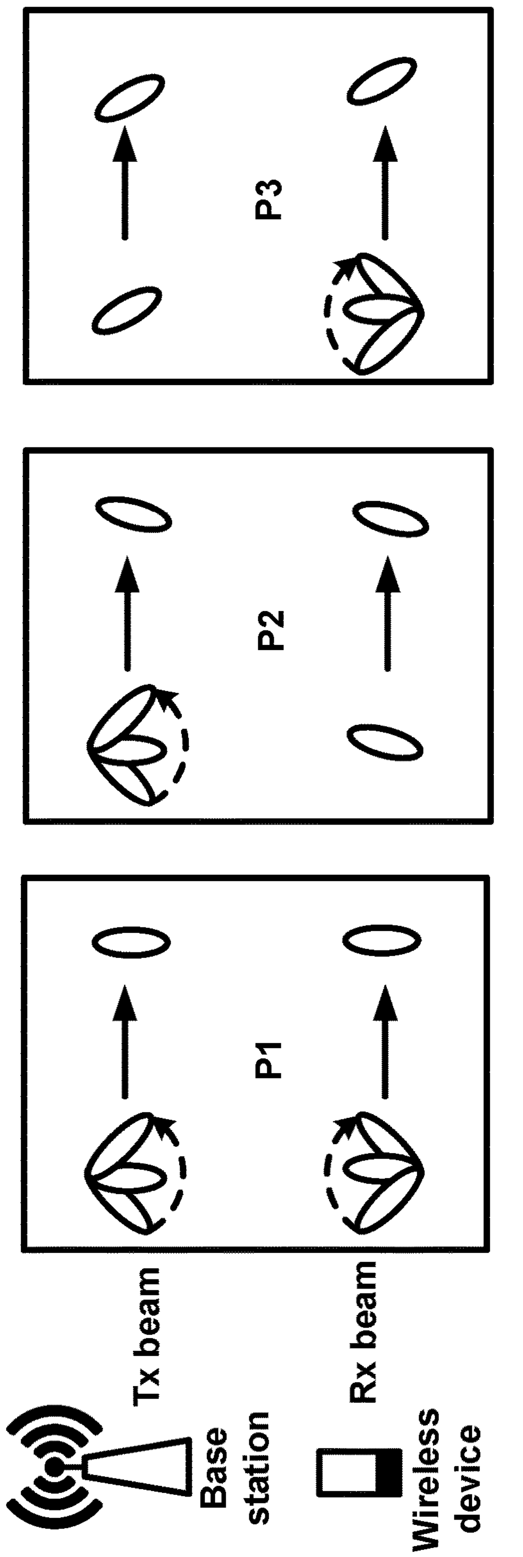
FIG. 12A shows examples of downlink beam management procedures.

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

Figure 12B:
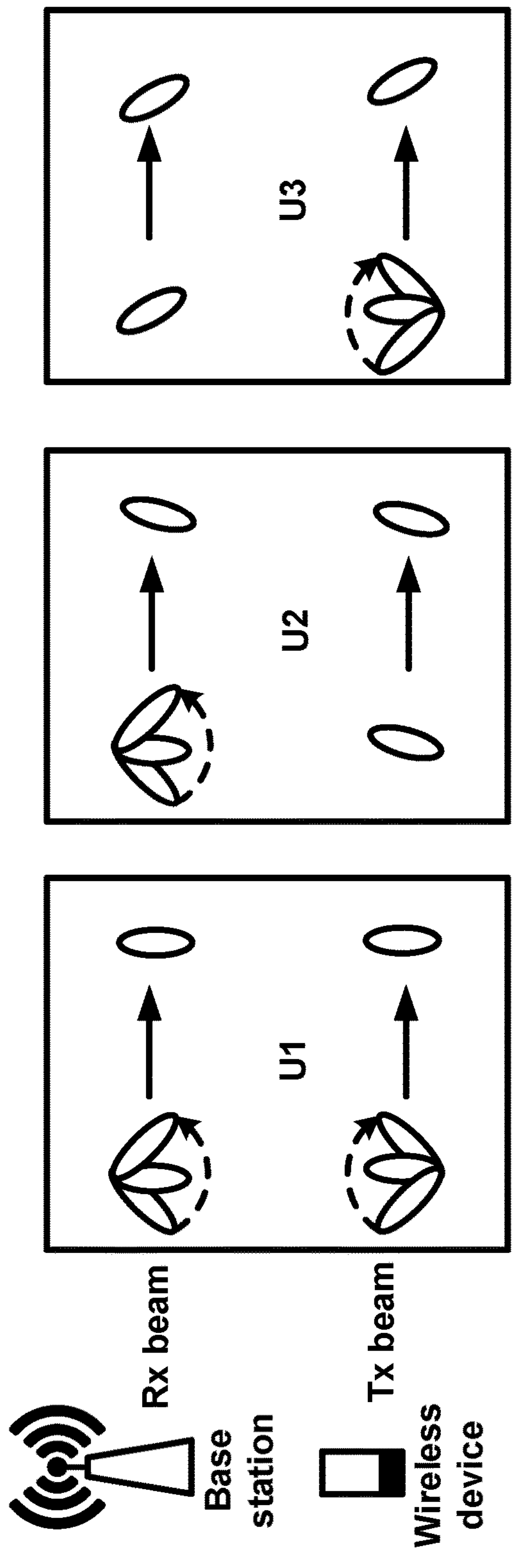
FIG. 12B shows examples of uplink beam management procedures.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the wireless device (e.g., UE) uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figures 13A, 13B, 13C:
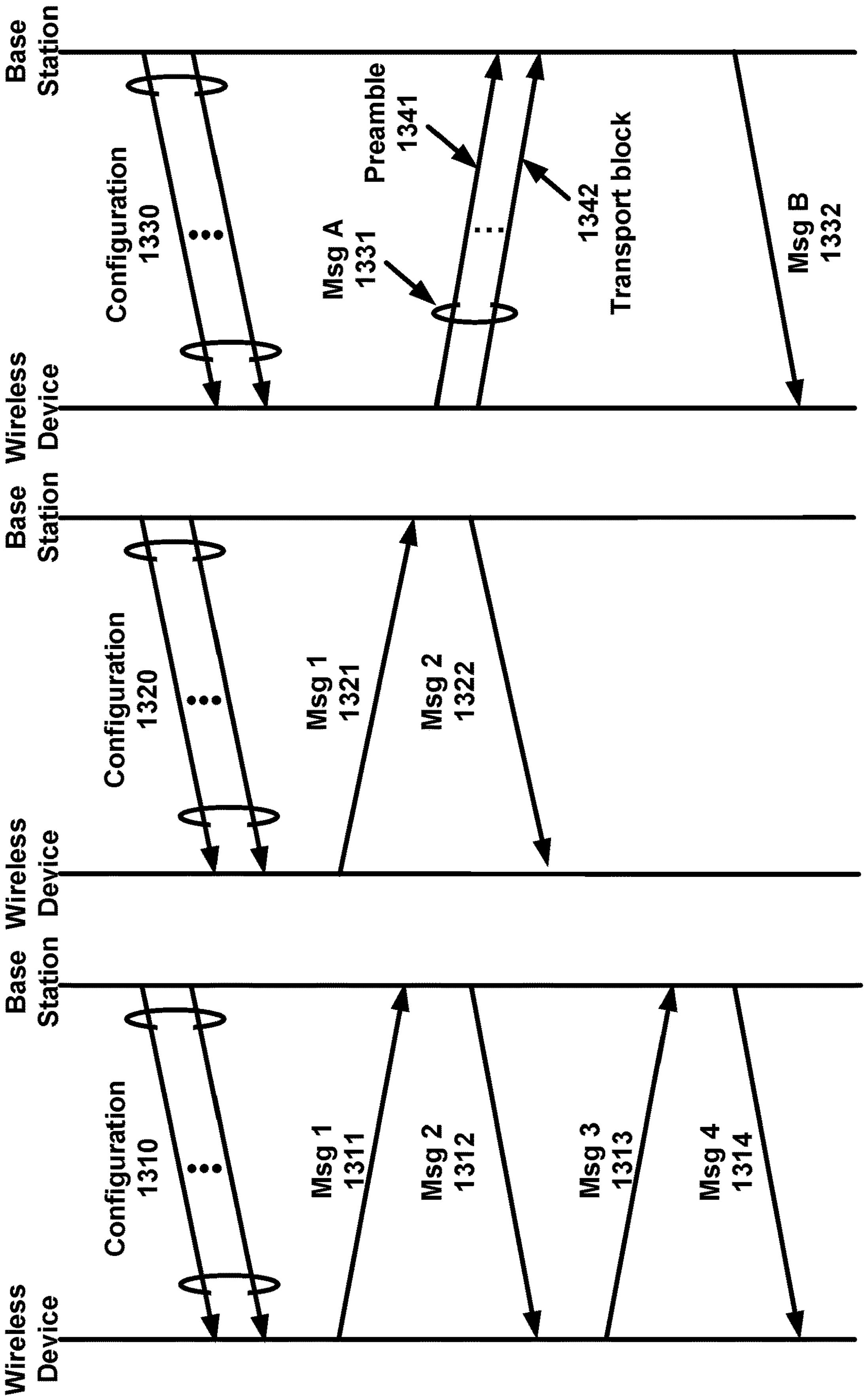
FIG. 13A shows an example four-step random access procedure.
FIG. 13B shows an example two-step random access procedure.
FIG. 13C shows an example two-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-ConfigDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313).

The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after (e.g., based on or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after (e.g., based on or in response to) the sending/sending (e.g., transmitting) of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-Response Window) to monitor a PDCCH for the second message (e.g., Msg 2 1312), for example, after sending/sending (e.g., transmitting) the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., $0 \le s\_id < 14$), t_id may be an index of a first slot of the PRACH occasion in a system frame (e.g., $0 \le t\_id < 80$), f_id may be an index of the PRACH occasion in the frequency domain (e.g., $0 \le f\_id < 8$), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after (e.g., based on or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after (e.g., based on or in response to) the sending (e.g., transmitting) of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). Fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-Response Window) to monitor a PDCCH for the RAR, for example, after (e.g., based on or in response to) sending (e.g., transmitting) the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending (e.g., transmitting) a beam failure recovery request (e.g., the window may start any quantity of symbols and/or slots after sending (e.g., transmitting) the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after (e.g., based on or in response to) sending (e.g., transmitting) first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1331 may be sent/transmitted in an uplink transmission by the wireless device. Msg A 1331 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after (e.g., based on or in response to) sending (e.g., transmitting) the first message (e.g., Msg A 1331). The second message (e.g., Msg B 1332) may comprise contents that are similar and/or equivalent to the contents of the second message (e.g., Msg 2 1312) (e.g., an RAR shown in FIGS. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCI messages may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as “FFFE” in hexadecimal. DCI having CRC parity bits scrambled with a system information RNTI (SI-RNTI) may indicate a broadcast transmission of the system information. The SI-RNTI may be predefined as “FFFF” in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCI messages with one or more DCI formats, for example, depending on the purpose and/or content of the DCI messages. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
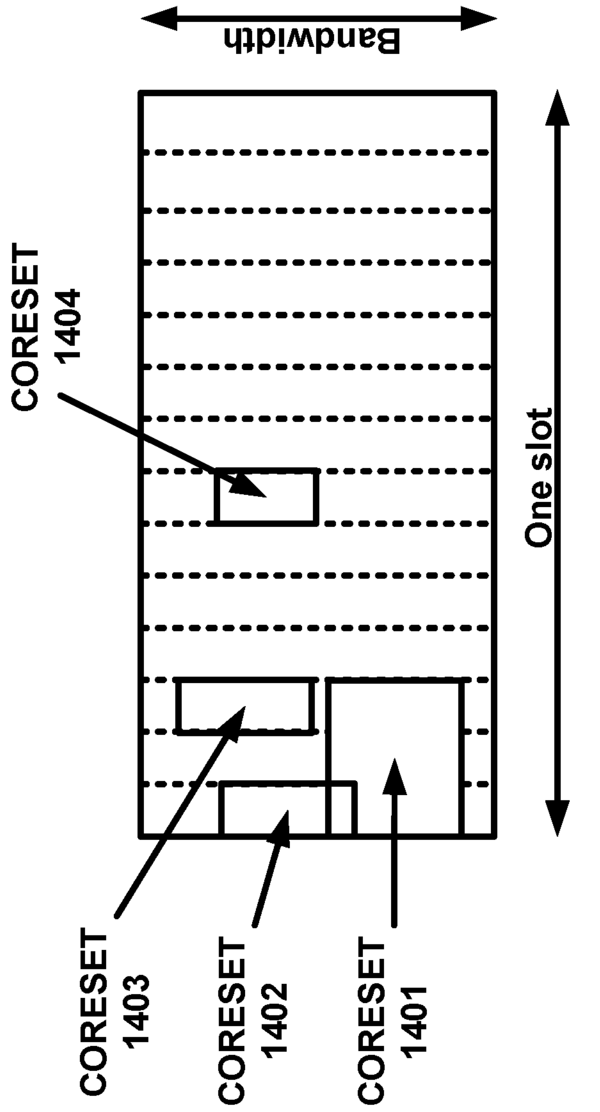
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
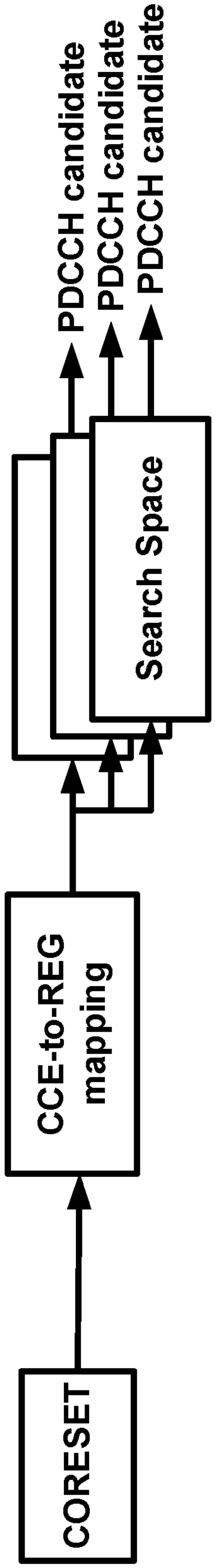
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCI messages. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after (e.g., based on or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after (e.g., based on or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
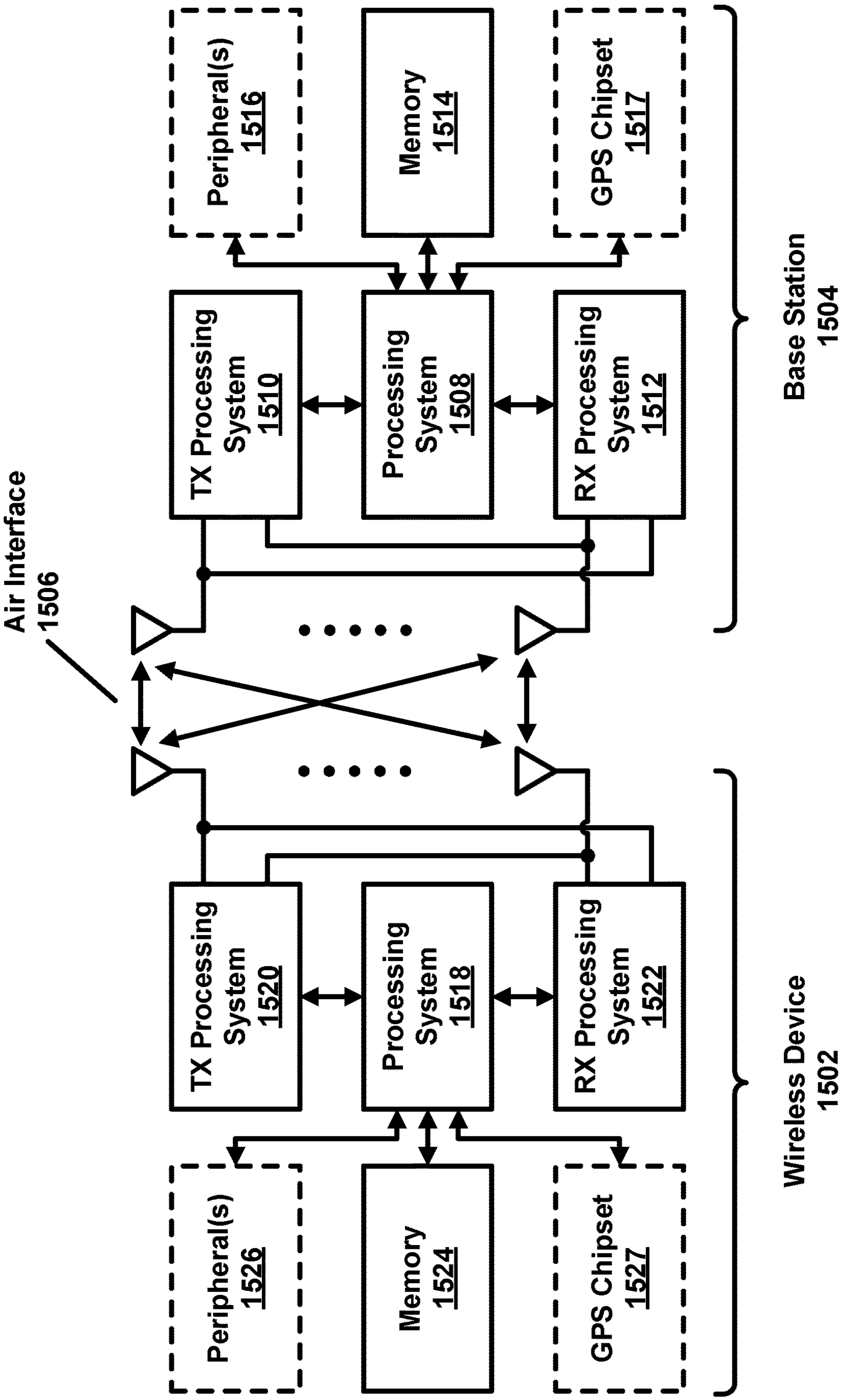
FIG. 15A shows an example of communications between a wireless device and a base station.

FIG. 15A shows example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For sending/transmission processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
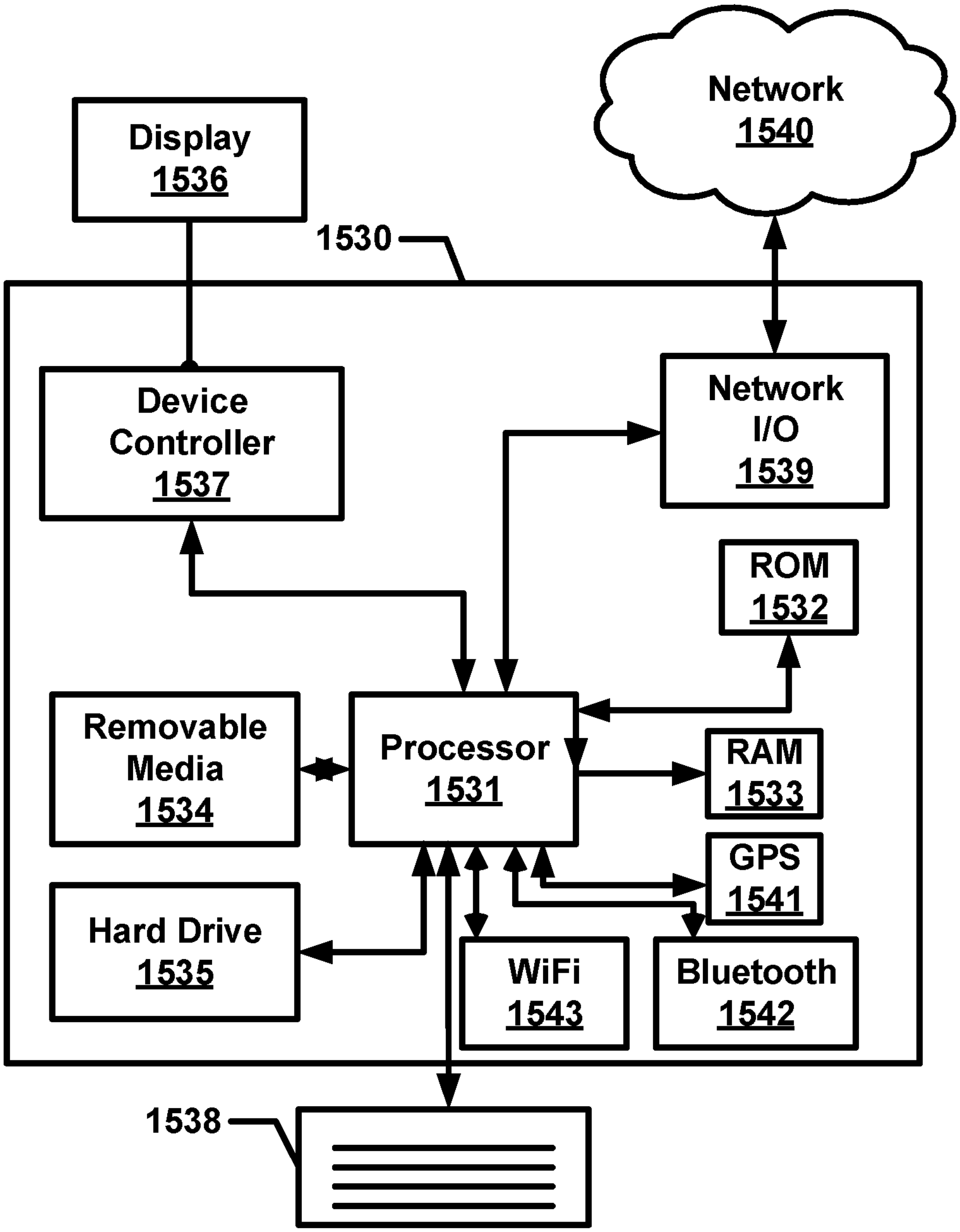
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, 1504, 1801, 1901, 2201, 2301, 2601, and/or 2701, the wireless device 106, 156A, 156B, 210, 1502, 1802, 1902, 2202, 2302, 2602, and/or 2702, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

Figure 16A:
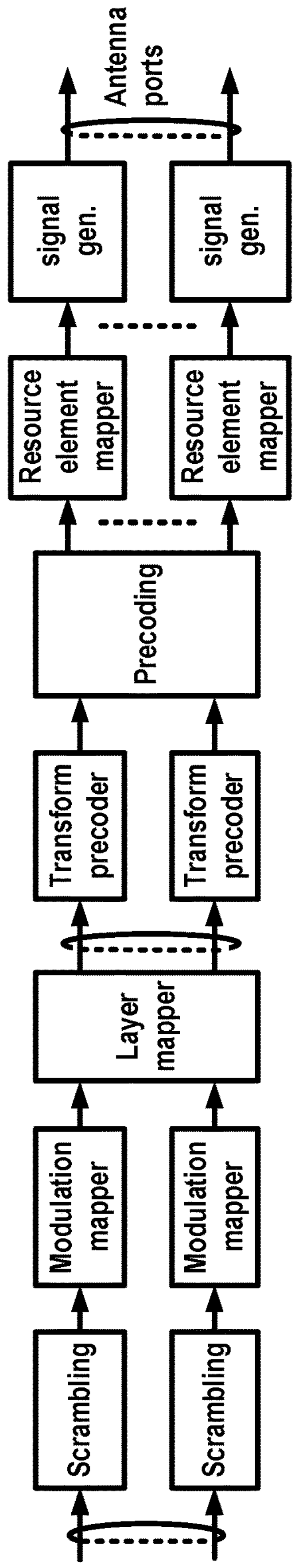
FIG. 16A, FIG. 16B, FIG. 16C, and FIG. 16D show examples of uplink and downlink signal transmission.

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

Figure 16B:
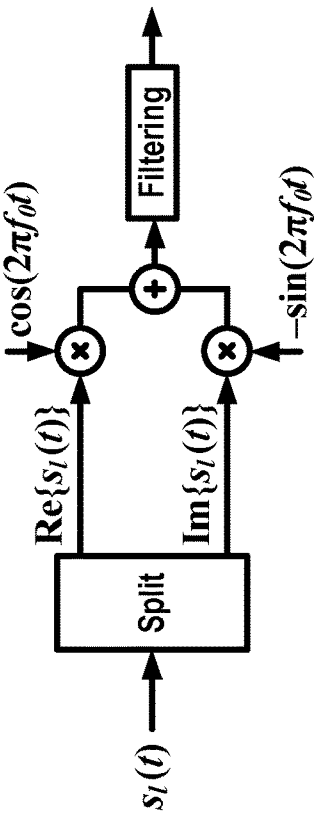

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

Figure 16D:
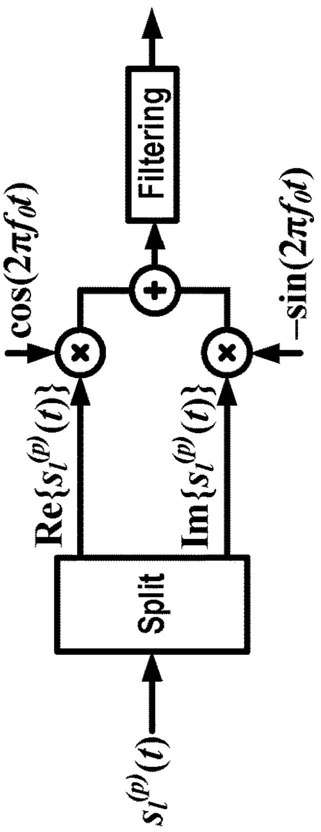
Figure 16C:
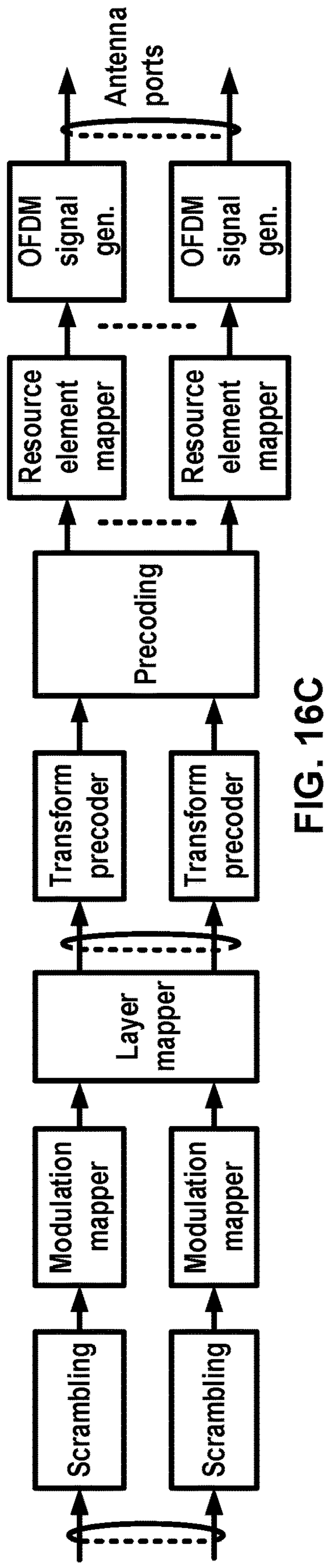

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, if it is started, and continue running until it is stopped or until it expires. A timer may be started, for example, if it is not running or restarted if it is running. A timer may be associated with a value (e.g., the timer may be started or restarted from a value or may be started from zero and expire if it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determining the expiration of the timer. A process for measuring a time window may be restarted, for example, if a timer is restarted. Other example implementations may be configured/provided to restart a measurement of a time window.

A base station may transmit one or more MAC PDUs to a wireless device. A MAC PDU may be a bit string that is byte aligned (e.g., aligned to a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. The bit order of a parameter field within a MAC PDU is represented with the first and most significant bit in the leftmost bit and the last and least significant bit in the rightmost bit. A MAC SDU may be a bit string that is byte aligned (e.g., aligned to a multiple of eight bits) in length. A MAC SDU may be included in a MAC PDU from the first bit onward. A MAC CE may be a bit string that is byte aligned (e.g., aligned to a multiple of eight bits) in length. A MAC subheader may be a bit string that is byte aligned (e.g., aligned to a multiple of eight bits) in length. A MAC subheader may be placed immediately in front of a corresponding MAC SDU, MAC CE, or padding. A MAC entity may ignore a value of reserved bits in a DL MAC PDU.

A MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; a MAC subheader and padding, or a combination thereof. The MAC SDU may be of variable size. A MAC subheader may correspond to a MAC SDU, a MAC CE, or padding.

When a MAC subheader corresponds to a MAC SDU, a variable-sized MAC CE, or padding, the MAC subheader may comprise: a Reserve field (R field) with a one bit length; an Format filed (F field) with a one-bit length; a Logical Channel Identifier (LCID) field with a multi-bit length; a Length field (L field) with a multi-bit length, indicating the length of the corresponding MAC SDU or variable-size MAC CE in bytes, or a combination thereof. In an example, F field may indicate the size of the L field.

A MAC entity of the base station may transmit one or more MAC CEs (e.g., MAC CE commands) to a MAC entity of a wireless device. The one or more MAC CEs may comprise at least one of: a SP ZP CSI-RS Resource Set Activation/Deactivation MAC CE, a PUCCH spatial relation Activation/Deactivation MAC CE, a SP SRS Activation/Deactivation MAC CE, a SP CSI reporting on PUCCH Activation/Deactivation MAC CE, a TCI State Indication for UE-specific PDCCH MAC CE, a TCI State Indication for UE-specific PDSCH MAC CE, an Aperiodic CSI Trigger State Subselection MAC CE, a SP CSI-RS/CSI-IM Resource Set Activation/Deactivation MAC CE, a UE contention resolution identity MAC CE, a timing advance command MAC CE, a DRX command MAC CE, a Long DRX command MAC CE, an SCell activation/deactivation MAC CE (1 Octet), an SCell activation/deactivation MAC CE (4 Octet), and/or a duplication activation/deactivation MAC CE. A MAC CE, such as a MAC CE transmitted by a MAC entity of the base station to a MAC entity of the wireless device, may have an LCID in the MAC subheader corresponding to the MAC CE. A first MAC CE may have a first LCID in the MAC subheader that may be different than the second LCID in the MAC subheader of a second MAC CE. For example, an LCID given by 111011 in a MAC subheader may indicate that the MAC CE associated with the MAC subheader is a long DRX command MAC CE.

The MAC entity of the wireless device may transmit to the MAC entity of the base station one or more MAC CEs. The one or more MAC CEs may comprise at least one of: a short buffer status report (BSR) MAC CE, a long BSR MAC CE, a C-RNTI MAC CE, a configured grant confirmation MAC CE, a single entry PHR MAC CE, a multiple entry PHR MAC CE, a short truncated BSR, and/or a long truncated BSR. A MAC CE may have an LCID in the MAC subheader corresponding to the MAC CE. A first MAC CE may have a first LCID in the MAC subheader that may be different than the second LCID in the MAC subheader of a second MAC CE. For example, an LCID given by 111011 in a MAC subheader may indicate that a MAC CE associated with the MAC subheader is a short-truncated command MAC CE.

In carrier aggregation (CA), two or more component carriers (CCs) may be aggregated. The wireless device may, using the technique of CA, simultaneously receive or transmit on one or more CCs, depending on capabilities of the wireless device. In an example, the wireless device may support CA for contiguous CCs and/or for non-contiguous CCs. CCs may be organized into cells. For example, CCs may be organized into one primary cell (PCell) and one or more secondary cells (SCells). When configured with CA, the wireless device may have one RRC connection with a network. During an RRC connection establishment/re-establishment/handover, a cell providing NAS mobility information may be a serving cell. During an RRC connection re-establishment/handover procedure, a cell providing a security input may be the serving cell. The serving cell may be a PCell. In an example, the base station may transmit, to the wireless device, one or more messages (e.g., one or more downlink signals). The one or more messages may comprise one or more RRC messages, for example, one or more RRC configuration/reconfiguration messages. For example, the one or more RRC messages may comprise one or more configuration parameters (e.g., one or more RRC configuration parameters).

The one or more RRC configuration parameters may comprise configuration parameters of a plurality of one or more SCells, depending on capabilities of the wireless device. When configured with CA, the base station and/or the wireless device may employ an activation/deactivation mechanism of an SCell to improve battery or power consumption of the wireless device. When the wireless device is configured with one or more SCells, the base station may activate or deactivate at least one of the one or more SCells. Upon configuration of an SCell, the SCell may be deactivated unless the SCell state associated with the SCell is set to "activated" or "dormant." The wireless device may activate/deactivate an SCell, for example, based on (e.g., in response to) receiving the SCell Activation/Deactivation MAC CE.

For example, the base station may configure (e.g., via the one or more RRC messages/configuration parameters) the wireless device with uplink (UL) bandwidth parts (BWPs) and downlink (DL) BWPs to enable bandwidth adaptation (BA) on a PCell. If carrier aggregation (CA) is configured, the base station may further configure the wireless device with at least one DL BWP (i.e., there may be no UL BWP in the UL) to enable BA on an SCell. For the PCell, an initial active BWP may be a first BWP used for initial access. In paired spectrum (e.g., FDD), the base station and/or the wireless device may independently switch a DL BWP and an UL BWP. In unpaired spectrum (e.g., TDD), the base station and/or the wireless device may simultaneously switch a DL BWP and an UL BWP.

In an example, the base station and/or the wireless device may switch a BWP between configured BWPs by means of a DCI or a BWP invalidity timer. When the BWP invalidity timer is configured for the serving cell, the base station and/or the wireless device may switch the active BWP to a default BWP, for example, based on (e.g., in response to) the expiry of the BWP invalidity timer associated with the serving cell. The default BWP may be configured by the network. In an example, for FDD systems, when configured with BA, one UL BWP for each uplink carrier and one DL BWP may be active at a time in the active serving cell. In an example, for TDD systems, one DL/UL BWP pair may be active at a time in the active serving cell. Operating on one UL BWP and one DL BWP (or the one DL/UL pair) may improve the wireless device battery consumption. One or more BWPs other than the active UL BWP and the active DL BWP which the wireless device may work on, may be deactivated. On the deactivated one or more BWPs, the wireless device may: not monitor PDCCH; and/or not transmit on PUCCH, PRACH, and UL-SCH. In an example, the MAC entity of the wireless device may apply normal operations on the active BWP for an activated serving cell configured with a BWP comprising: sending (e.g., transmitting) on UL-SCH; sending (e.g., transmitting) on RACH; monitoring a PDCCH; sending (e.g., transmitting) PUCCH; receiving DL-SCH; and/or (re-)initializing any suspended configured uplink grants of configured grant Type 1 according to a stored configuration, if any. On the inactive BWP for each activated serving cell configured with a BWP, the MAC entity of the wireless device may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

A DCI addressed to an RNTI may comprise a CRC of the DCI being scrambled with the RNTI. The wireless device may monitor PDCCH addressed to (or for) the RNTI for detecting the DCI. For example, the PDCCH may carry (or be with) the DCI. The PDCCH may not carry the DCI.

A set of PDCCH candidates for the wireless device to monitor is defined in terms of one or more search space sets. A search space set may comprise a common search space (CSS) set or a UE-specific search space (USS) set. The wireless device may monitor one or more PDCCH candidates in one or more of the following search space sets: a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG, a Type0A-PDCCH CSS set configured by searchSpaceOtherSystemInformation in PDCCH-ConfigCommon for a DCI format with CRC scrambled by the SI-RNTI on the primary cell of the MCG, a Type1-PDCCH CSS set configured by ra-SearchSpace in PDCCH-ConfigCommon for a DCI format with CRC scrambled by a RA-RNTI, a MSGB-RNTI, or a TC-RNTI on the primary cell, a Type2-PDCCH CSS set configured by pagingSearchSpace in PDCCH-ConfigCommon for a DCI format with CRC scrambled by a P-RNTI on the primary cell of the MCG, a Type3-PDCCH CSS set configured by SearchSpace in PDCCH-Config with searchSpaceType=common for DCI formats with CRC scrambled by a INT-RNTI, a SFI-RNTI, a TPC-PUSCH-RNTI, a TPC-PUCCH-RNTI, a TPC-SRS-RNTI, a CI-RNTI, or a power saving RNTI (PS-RNTI) and, only for the primary cell, a C-RNTI, a MCS-C-RNTI, or a CS-RNTI(s), and the USS set configured by SearchSpace in PDCCH-Config with searchSpaceType=ue-Specific for DCI formats with CRC scrambled by the C-RNTI, the MCS-C-RNTI, a SP-CSI-RNTI, the CS-RNTI(s), a SL-RNTI, a SL-CS-RNTI, or a SL-L-CS-RNTI.

In an example, the wireless device may monitor PDCCH (e.g., the one or more PDCCH candidates) according to one or more configuration parameters of the search space set. For example, the search space set may comprise a plurality of search spaces (SSs). The wireless device may monitor the one or more PDCCH candidates in one or more CORESETs for detecting one or more DCIs. Monitoring the one or more PDCCH candidates may comprise decoding at least one PDCCH candidate of the one or more PDCCH candidates according to the monitored DCI formats. For example, monitoring the one or more PDCCH candidates may comprise decoding (e.g., blind decoding) a DCI content of the at least one PDCCH candidate via possible (or configured) PDCCH location(s), possible (or configured) PDCCH format(s) (e.g., number of CCEs, number of PDCCH candidates in CSS set(s), and/or number of PDCCH candidates in the USS(s), and/or possible (or configured) DCI format(s).

The wireless device may receive the C-RNTI (e.g., via one or more previous transmissions) from the base station. For example, the one or more previous transmissions may comprise a Msg2 1312, Msg4 1314, or a MsgB 1332. The wireless device may monitor the one or more PDCCH candidates for DCI format 0_0 and DCI format 1_0 with CRC scrambled by the C-RNTI in the Type1-PDCCH CSS set, for example, if the wireless device is not provided the Type3-PDCCH CSS set or the USS set and if provided the Type1-PDCCH CSS set.

The one or more search space sets may correspond to one or more search parameters. For example, the one or more search space sets may correspond to one or more of searchSpaceZero, searchSpaceSIB1, searchSpaceOtherSystemInformation, pagingSearchSpace, ra-SearchSpace, and the C-RNTI, the MCS-C-RNTI, or the CS-RNTI. The wireless device may monitor the one or more PDCCH candidates for the DCI format 0_0 and the DCI format 1_0 with CRC scrambled by the C-RNTI, the MCS-C-RNTI, or the CS-RNTI in the one or more search space sets in a slot where the wireless device monitors the one or more PDCCH candidates for at least the DCI format 0_0 or the DCI format 1_0 with CRC scrambled by the SI-RNTI, the RA-RNTI, the MSGB-RNTI, or the P-RNTI.

FIG. 17 shows examples of various DCI formats. The various DCI formats may be used, for example, by a base station to send (e.g., transmit) control information (e.g., downlink control information) to, for example, the wireless device. The DCI formats may be used for PDCCH monitoring. Different DCI formats may comprise different DCI fields and/or have different DCI payload sizes. Different DCI formats may have different signaling purposes. As shown in FIG. 17, DCI format 0_0 may be used to schedule PUSCH transmission in one cell. DCI format 0_1 may be used to schedule one or multiple PUSCH transmissions in one cell and/or to indicate configured grant-downlink feedback information (CG-DFI) for configured grant PUSCH transmission, etc.

Semi-persistent scheduling (SPS) may be supported in the downlink. A wireless device may be configured with a periodicity of the data transmission using one or more configuration parameters (e.g., SPS-Config), for example, in the downlink. Activation of semi-persistent scheduling may be done, for example, using PDCCH with CS-RNTI (e.g., receiving the PDCCH transmission addressed to/by the CS-RNTI). The PDCCH may carry necessary information in terms of time-frequency resources and other parameters. A HARQ process number/ID may be derived from a time, for example, when the downlink data transmission starts. The wireless device may receive downlink transmission periodically according to the periodicity of the data transmission using one or more transmission parameters indicated in the PDCCH activating the semi-persistent scheduling, for example, based on (e.g., after or upon) activation of semi-persistent scheduling.

At least two schemes for transmission without a dynamic grant may be supported. At least two schemes for transmission without a dynamic grant may be supported, for example, in the uplink. The at least two schemes may differ in the way they are activated. For example, the two schemes may include: 1) configured grant Type 1 (or type 1 of the configured grant), where an uplink grant is provided by the one or more configuration parameters (e.g., ConfiguredGrantConfig), including activation of the grant; 2) configured grant Type 2 (or type 2 of the configured grant), where the transmission periodicity is provided by the one or more configuration parameters (e.g., ConfiguredGrantConfig) and L1/L2 control signaling is used to activate/deactivate the transmission in a similar way as in the SPS. The at least two schemes may reduce control signaling overhead, and/or the latency before uplink data transmission, as no scheduling request-grant cycle is needed prior to data transmission. In an example of the configured grant Type 2, the one or more configuration parameters may indicate/configure the preconfigured periodicity, and/or PDCCH activation may provide transmission parameters. The wireless device may send (e.g., transmit) according to the preconfigured periodicity, for example, based on (e.g., after or upon) receiving the activation command, if, for example, there are data in the buffer. Similarly to the configured grant Type 1, the wireless device may not send (e.g., transmit) anything, for example, if there are no data to send (e.g., transmit). The wireless device may acknowledge the activation/deactivation of configured grant Type 2, for example, by sending a MAC control element in the uplink. In both schemes, it is possible to configure multiple wireless devices with overlapping time-frequency resources in the uplink. The network may differentiate between transmissions from different wireless devices. For example, PUSCH resource allocation may be semi-statically configured by the one or more configuration parameters (e.g., ConfiguredGrantConfig).

A wireless device may support processing time/capability. For example, the wireless device may support a baseline processing time/capability. For example, the wireless device may support additional aggressive/faster processing time/capability. A wireless device may report to a base station a processing capability, for example, processing capability per sub-carrier spacing. For example, a PDSCH processing time may be considered to determine, by a wireless device, a first uplink symbol of a PUCCH. The PUCCH may comprise HARQ-ACK information of the PDSCH scheduled by DCI. The wireless device may determine the PDSCH processing time, for example, at least based on a HARQ-ACK timing K1 and one or more PUCCH resources to be used and including the effect of the timing advance. For example, the first uplink symbol of the PUCCH may not start earlier than a time gap (e.g., $T_{proc,1}$) after a last symbol of the PDSCH reception associated with the HARQ-ACK information. For example, the first uplink symbol of the PUCCH which carries the HARQ-ACK information may start no earlier than at symbol L1, where L1 is defined as the next uplink symbol with its Cyclic Prefix (CP) starting after the time gap $T_{proc,1}$ after the end of the last symbol of the PDSCH.

A PUSCH preparation/processing time may be considered for determining transmission time of UL data. For example, a wireless device may perform transmitting a PUSCH, for example, if a first uplink symbol in the PUSCH allocation for a transport block (including DM-RS) is no earlier than at symbol L2. For example, a wireless device may determine the symbol L2, for example, at least based on a slot offset (e.g., K2), SLIV of the PUSCH allocation indicated by time domain resource assignment of a scheduling DCI. For example, the symbol L2 may be specified as the next uplink symbol with its CP starting after a time gap with length $T_{proc,2}$ after the end of the reception of the last symbol of the PDCCH carrying the DCI scheduling the PUSCH.

Extended reality (XR) may refer to all real and/or virtual combined environments and human-machine interactions generated by computer technologies and devices (e.g., wearables). XR may be an umbrella term for different types of realities, for example, Virtual reality (VR), Augmented reality (AR), Mixed reality (MR), and/or Cloud Gaming, and the like. XR application(s) may provide a sense of being surrounded by a virtual environment (e.g., immersion) and/or a feeling of being physically and spatially located in a virtual environment (e.g., presence). XR may refer to equipment, application(s), and/or function(s) used for VR, AR, Cloud Gaming, and/or MR. For example, XR may refer to head-mounted displays (HMDs) for VR, optical see-through glasses and/or camera see-through HMDs for AR and MR, and/or mobile devices with positional tracking and camera(s). An XR device may be a wireless device that may run/use/perform one or more XR functions/applications/use cases (e.g., AR). For example, an XR device may be a wireless device that is/has XR equipment to perform one or more XR services.

At least some XR use cases (e.g., Cloud Gaming and/or VR) may be characterized by quasi-periodic traffic, for example, 45/60/90/120 frames per second (FPS), with possible jitter and/or a non-integer periodicity. For example, the frame rate for a XR video may vary from 30 frames per second up to 90 or even 120 frames per second, with a typical minimum frame rate of 60 for VR. In some other cases, a jitter may be up to a few milliseconds (e.g., 4 ms, 8 ms, 10 ms, or higher, depending on application, network delay, and/or video coding standards). XR use cases may require high data rates in DL (e.g., for transmission of video steam and/or audio data) combined with the frequent UL data (e.g., pose/control update or pose information) and/or UL video stream. Both DL and UL traffic are characterized by relatively strict packet delay budget (PDB). For example, PDB of pose/control update may be around 4 ms. In some applications, PDB of DL/UL video steam may be 10 ms or 20 ms or 30 ms. For example, the latency of action of angular or rotational vestibulo-ocular reflex may be in the order of 10 ms or in a range of 7-15 milliseconds. In another example, a motion-to-photon latency of less than 10-20 milliseconds may be required (e.g., PDB of less than 10-20 ms).

Bit rates of XR use cases (or applications) may be between 10 and 200 Mbps, for example, depending on frame rate, resolution and codec efficiency. Volume of DL/UL data (or bit rate) across traffic periods (or burst of data, or data burst, or PDU set) may change. For example, in a first traffic period (or burst of data), the volume of DL video stream may be a first value (e.g., 100 Mbyte). In a second traffic period (or burst of data), the volume of DL video stream may be a second value (e.g., 50 Mbyte). Data burst may comprise a set of multiple PDUs (e.g., PDCP/RLC/MAC PDU) generated and sent by the application in a short period of time (e.g., within a traffic period). For examples, a data burst may comprise one or multiple PDU sets and/or one or more data packets (e.g., IP packets) and/or one or more bundles of PUSCHs/PDSCHs. A PDU set (or PDU bundle/collection) may comprise one or more PDUs carrying the payload of one unit of information generated at the application level (e.g., a frame or video slice for XRM Services). A PDU set information (e.g., corresponding to a PDU) may indicate/comprise at least one of the following: a PDU set identifier; and/or a start (or earliest/starting/initial) PDU and an end (or latest/final/ending) PDU of the PDU set; and/or a PDU serial number (SN) of a PDU within the PDU set; and/or a PDU set size; and/or a PDU set importance; and/or an end of data burst indication (e.g., indicating an end of the data burst).

A network (e.g., a base station) and/or a wireless device may not be aware of (or accurately measure) instantaneous jitter value/range in advance and/or volume of UL/DL traffic (e.g., within each traffic period). A network (e.g., a base station) and/or a wireless device may determine/measure, for example, via statistical measurements and/or AI/ML methods, one or more statistics/characteristics (e.g., average, variance, probability density function, and the like) of the jitter and/or the volume of UL/DL data (or bit rate).

PDU set related assistance information (e.g., provided via control plane to user plane of a wireless device and/or a base station) may define/indicate one or more assistance information corresponding to a PDU set. The PDU set information and/or the PDU set related assistance information may allow an XR aware operation of RAN (e.g., user plane of a base station and/or a wireless device). For example, the PDU set related assistance information may comprise PDU-set QoS parameters and/or a burst (or XR data burst, or data burst, or PDU set) periodicity (e.g., a periodicity of a quasi-periodic traffic (e.g., 45/60/90/120 FPS)). PDU-set QoS parameters (e.g., provided via control plane to user plane of a wireless device and/or a base station) corresponding to a PDU set may comprise at least one of the following: a PDU-set delay budget (PSDB); a PDU-set error rate (PSER); and/or a PDU set integrated indication (PSII). The PDU-set delay budget (PSDB) of a PDU set may indicate/define/measure delay of the PDU set (or PDU-set) between a wireless device and an N6 termination point at the UPF. The value of the PSDB may be the same in UL and DL, for example, for a certain 5QI. The PSDB may be used to support the configuration of scheduling and link layer functions (e.g., the setting of scheduling priority weights and HARQ target operating points), for example, for 3GPP access. The PDU-set may be considered/determined as lost (e.g., if the corresponding QoS Flow is not exceeding the GFBR and/or for GBR QoS Flows using the Delay-critical resource type), for example, if a PDU-set is delayed more than the PSDB. The PSDB of a PDU set may depend on a PDB of a PDU of the PDU set (e.g., smallest/largest PDB or the like).

A PDU-set error rate (PSER) of a PDU set may define/indicate an upper bound for an error rate of the PDU-set. For example, an upper layer (e.g., the RLC/PDCP/SDAP layer) of a sender (e.g., a base station and/or a wireless device) may process a PDU-set to determine whether all of the PDUs in the PDU-set are successfully delivered by a corresponding receiver to the upper layers (e.g., the PDCP/RLC/SDAP layer).

The PDU set integrated indication (PSII) of a PDU set may define/indicate/measure whether all PDUs in the PDU set are needed for the usage of PDU set by an application layer. An application layer may need at least some PDUs in a PDU set, for using the corresponding unit of information. For example, an application layer may need all PDUs in a PDU set. For another example, an application layer may still recover at least part of the information unit, if some PDUs in the PDU set are missing. A PDU set may comprise one or more data packets (e.g., IP packets) or may correspond to a higher layer SDU/PDU (e.g., the PDCP/RLC/SDAP/MAC layer).

Different methods/procedures/alternatives may be used to map PDU sets onto QoS flows (e.g., in the NAS) and/or to map the QoS flows onto data radio bearers (DRBs) (e.g., in the AS). For example, the methods/procedures/alternatives may include: one-to-one mapping between types of PDU sets and QoS flows in the NAS, and/or one-to-one mapping between QoS flows and DRBs in the AS; and/or one-to-one mapping between types of PDU sets and QoS flows in the NAS, and/or multiplexing of QoS flows in one DRB in the AS; and/or a multiplexing of PDU sets in one QoS flow in the NAS, and/or one-to-one mapping between QoS flows and DRBs in the AS; and/or N multiplexing of PDU sets in one QoS flow in the NAS, and/or demultiplexing of PDU sets from one QoS flow on multiple DRBs in the AS. For example, a wireless device and/or a base station may map one or more PDU sets in DRBs to logical channels. For example, a wireless device and/or a base station may perform 1-to-1 mapping in which the PDCP layer maps the one or more PDU sets to one logical channel. A wireless device and/or a base station may perform 1-to-many mapping in which the PDCP layer maps the one or more PDU sets to one or more logical channels.

A base station may configure, for example, via one or more configuration parameters, a wireless device with at least one CG configuration. The at least one CG configuration may comprise a first CG configuration. The first CG configuration may comprise a plurality of CG occasions, for example, per CG period (or periodicity or periodic) of the first CG configuration. At least one (e.g., each) CG occasion of the plurality of CG occasions may correspond to (or be) a PUSCH resource/transmission. For example, the wireless device may be an XR device. The XR device may be configured to communicate (send (e.g., transmit)/receive) XR flows/traffic/data (e.g., PDU sets) with a base station. The arrival of the XR traffic (e.g., at the wireless device, within each XR traffic period) may be uncertain, for example, due to jitter. For example, the jitter range may be [−2 ms, 2 ms], and/or [−4 ms, 4 ms], and/or [−8 ms, 8 ms], for example, depending on XR application. The instantaneous value of the jitter may be unknown or hard to determine (e.g., at the wireless device and/or the base station). The XR traffic size within at least one (e.g., each) XR traffic size may unexpectedly change. Using the CG configuration comprising the plurality of CG occasions (e.g., plurality of CG PUSCH occasions of the CG configuration) for transmission of XR traffic may result in wastage of UL resources (e.g., due to varying XR traffic size and/or jitter PUSCH transmission corresponding to at least one CG occasion being dropped, e.g., no data being available). One solution may be that the wireless device may send (e.g., transmit) a first indication to the base station to inform the base station that at least one CG occasion is unused/unusable. The base station may recycle the at least one CG occasion for a second wireless device. Transmission of the first indication may improve resource efficiency for transmission of XR traffic.

In at least some communications, a wireless device and/or a base station may become unaligned, for example, after the transmission of a first indication by the wireless device. For example, the base station may miss (e.g., fail to decode) the first indication and/or may expect receiving UL data via the at least one CG occasion. For example, the wireless device may not expect to receive a DCI scheduling dynamic PUSCH/PDSCH/CSI-RS in a set of symbols that overlap/collide with the at least one CG occasion. The wireless device may drop the dynamic PUSCH/PDSCH/CSI-RS in the set of symbols. The base station may expect to receive the dynamic PUSCH/PDSCH/CSI-RS in the set of symbols. Improvements may be made to allow the wireless device and/or the base station to resolve collisions of the dynamic PUSCH/PDSCH/CSI-RS with the at least one CG occasion, and may improve alignment between the wireless device and/or the base station, and/or improve UL/DL spectral efficiency of the wireless device.

For example, a wireless device may send (e.g., transmit) a first indication on a first resource (e.g., BWP) of one or more resources (e.g., BWPs). One or more configuration parameters may configure the one or more resources (e.g., BWPs). The wireless device may switch from the first resource to a second resource (e.g., a second BWP) of the one or more resources (e.g., based on expiry of a timer and/or a DCI indication), for example, after the sending (e.g., transmitting) the first indication. A wireless device and/or a base station may become unaligned, for example, after or based on (e.g., in relation to) a first resource switching (e.g., BWP switching) to the second resource (e.g., second BWP). For example, the wireless device may send (e.g., transmit) XR data via/using the at least one CG occasion, for example, while operating in the second resource (e.g., BWP). The base station may not expect to receive UL data (e.g., XR data) from the wireless device via/using the at least one CG occasion (e.g., the base station may recycle the at least one CG occasion for the second wireless device). Improvements of resource operations (e.g., BWP operations) if/when the base station communicates with an XR device may increase and/or better maintain alignment between the wireless device and/or the base station.

For example, a wireless device may, for sending (e.g., transmitting) a first indication, send (e.g., transmit) a first UCI, for example, via a PUSCH transmission of a CG occasion. The first UCI may comprise the first indication (or information related to the first indication). The wireless device may encounter difficulties for transmission of the first UCI. For example, the wireless device may mistakenly multiplex the first UCI with the PUSCH transmission of the CG occasion (e.g., by mistakenly determining resources for multiplexing). For example, the wireless device may mistakenly multiplex the first UCI using/via PUSCH transmission of the CG occasion, for example, if one or more second UCIs (e.g., a CG-UCI, HARQ-ACK, and/or CSI) are available for transmission using/via PUSCH transmission of the CG occasion. For example, each UCI of the one or more second UCIs may have a different priority (e.g., high priority, e.g., priority index 1, or low priority, e.g., priority index 0). For example, the base station may face difficulties in distinguishing the first UCI from the CG-UCI. Solutions described herein for determination of resources for sending (e.g., transmitting) the PUSCH transmission of the CG occasion may improve alignment between the wireless device and/or the base station. Solutions described herein for determining whether to multiplex the first UCI with sending (e.g., transmitting) the PUSCH transmission of the CG occasion may improve alignment between the wireless device and/or the base station.

As described herein, a wireless device may communicate (e.g., receive, send or transmit) with a base station, at/in a first occasion, an indication indicating at least one configured grant (CG) occasion of a CG configuration being unused/unusable/recyclable/suspend-able. The wireless device may receive DCI indicating/scheduling a communication (transmission or reception) of a signal/channel, for example, during a set of symbols. At least one symbol of the set of symbols may overlap/collide with a CG occasion of the at least one CG occasion. The wireless device may communicate (receive or send (e.g., transmit)) with the base station, for example, via the signal during the set of symbols, for example, based on (e.g., in response to) the receiving the DCI after a first offset from the first occasion. For example, the wireless device may determine receiving the DCI is within a second offset from a starting point of the CG occasion. For example, the one or more configuration parameters may indicate a plurality of CG occasions/resources, per CG period, of the CG configuration. At least one CG occasion (e.g., each CG occasion) of the plurality of CG occasions may be a PUSCH transmission occasion.

A wireless device may send (e.g., transmit) a first indication to a base station, for example, for communicating the indication with the base station. The first indication may indicate the at least one configured grant (CG) occasion of the CG configuration being unused/unusable/recyclable/suspend-able. For example, a first occasion may be a last/final/ending symbol of an uplink signal (e.g., PUCCH/PUSCH) carrying/conveying the first indication. The wireless device may send (e.g., transmit) the first indication, for example, based on multiplexing a first UCI (e.g., comprising the first indication) with a PUSCH transmission corresponding to a CG occasion. For example, the wireless device may determine resources for multiplexing the first UCI, for example, based on a first offset (e.g., first beta offset). The first UCI may be a CG-UCI. The first UCI may, for example, be different from the CG-UCI. For example, the one or more configuration parameters may indicate the first beta offset.

A wireless device may receive a second indication from a base station, for example, for communicating the indication with the base station. The second indication may indicate the at least one configured grant (CG) occasion of the CG configuration being unused/unusable/recyclable/suspend-able. The second indication may be based on (e.g., in response to) the first indication. The second indication may be a confirmation of the first indication. The base station may send (e.g., transmit) the second indication to the wireless device without receiving the first indication (e.g., prior to the transmission of the first indication). For example, the first occasion may be a last/final/ending symbol of a downlink signal (e.g., PDCCH/PDSCH) carrying/conveying the second indication.

The signal/channel may be a PUSCH. A wireless device may send (e.g., transmit) the PUSCH, for example, during a set of symbols, by communicating with a base station a signal during the set of symbols. For example, the base station may communicate (receiving or sending (e.g., transmitting)) with the wireless device at/in a first occasion, an indication indicating that at least one configured grant (CG) occasion of the CG configuration is unused/unusable/recyclable/suspend-able. The base station may send (e.g., transmit), to the wireless device, DCI indicating/scheduling a transmission of the PUSCH during the set of symbols. The base station may receive from the wireless device the PUSCH transmission during the at least one CG occasion, for example, based on (e.g., in response to) the sending (e.g., transmitting) the DCI within a second offset prior to the at least one CG occasion. The base station may receive from the wireless device the PUSCH transmission during the at least one CG occasion, for example, based on the communicating the indication indicating the at least one CG occasion being unused.

The signal/channel may comprise and/or be sent via a PDSCH/CSI-RS. A wireless device may receive the PDSCH/CSI-RS, for example, during a set of symbols, by communicating with a base station a signal during the set of symbols. For example, the base station may communicate (receiving or sending (e.g., transmitting)) with the wireless device at/in a first occasion, an indication indicating the at least one configured grant (CG) occasion of the CG configuration is unused/unusable/recyclable/suspend-able. The base station may send (e.g., transmit), to the wireless device, DCI indicating/scheduling a transmission of the PDSCH/CSI-RS during the set of symbols. The base station may send (e.g., transmit) to the wireless device downlink signal reception during the first reception duration, for example, based on (e.g., in response to) the sending (e.g., transmitting) the DCI within a second offset prior to the at least one CG occasion. The base station may send (e.g., transmit) to the wireless device downlink signal reception during the first reception duration, for example, based on the communicating the indication indicating the at least one CG occasion being unused.

A wireless device may send (e.g., transmit), at/in/during a first occasion, a UCI (e.g., the first UCI) indicating that a configured grant (CG) occasion of a plurality of CG occasions of a CG configuration is unused/unusable/suspended. The wireless device may receive, from a base station, DCI scheduling a PUSCH transmission that overlaps in time with the CG occasion. For example, the wireless device may receive the DCI a first offset after the first occasion. The wireless device may send (e.g., transmit) the PUSCH transmission during the CG occasion, for example, based on (e.g., in response to) the receiving the DCI within a second offset prior to the CG occasion. The wireless device may send (e.g., transmit) the PUSCH transmission during the CG occasion, for example, based on the transmission of the UCI indicating the CG occasion being unused. For example, the base station may receive, from the wireless device, the UCI indicating that the CG occasion of the plurality of CG occasions of the CG configuration is unused/unusable/suspended. For example, the base station may send (e.g., transmit), to the wireless device, DCI scheduling a PUSCH transmission that overlaps in time with the CG occasion. For example, the base station may send (e.g., transmit) the DCI the first offset after the receiving the UCI. The base station may receive from the wireless device the PUSCH transmission during the CG occasion, for example, based on (e.g., in response to) the sending (e.g., transmitting) the DCI within the second offset prior to the CG occasion. The base station may receive from the wireless device the PUSCH transmission during the CG occasion, for example, based on the reception of the UCI indicating the CG occasion being unused.

A wireless device may communicate (receive and/or send (e.g., transmit)), at/in the first occasion, an indication indicating that at least one configured grant (CG) occasion of a plurality of CG occasions of a CG configuration is unused/unusable. The wireless device may receive, from the base station, DCI indicating/scheduling a reception of a downlink signal (PDSCH/CSI-RS) during a first reception duration. For example, the first reception duration may overlap in time with the at least one CG occasion. The wireless device may receive the downlink signal reception during the first reception duration, for example, based on (e.g., in response to) the receiving the DCI within a second offset prior to the at least one CG occasion. The wireless device may receive the downlink signal reception during the first reception duration, for example, based on the communicating the indication indicating that the at least one CG occasion is unused. The wireless device may determine the receiving the DCI being after the first offset from the first occasion. The wireless device may receive the downlink signal reception during the first reception duration, for example, based on (e.g., in response to) the receiving the DCI after the first offset from the first occasion.

Examples described herein may allow a wireless device and/or a base station to resolve collision between dynamic UL/DL transmissions/receptions and at least one CG occasion, for example, after the transmission of a first indication and/or after the reception of a second indication (e.g., after communication of the indication). Examples described herein may enhance alignment between the wireless device and the base station.

One or more configuration parameters may indicate one or more bandwidth parts (BWPs). For example, the one or more configuration parameters may configure a CG configuration of a first BWP of the one or more BWPs. A wireless device may communicate with a base station, via/using/on the first BWP, an indication indicating that at least one CG occasion of the CG configuration is unused/unusable/recyclable/suspended. For example, the wireless device may switch to a second BWP of the one or more BWPs, for example, after communicating the first indication. The wireless device may reinitialize the at least one CG occasion of the CG configuration according to the CG configuration, for example, based on (e.g., in response to) the switching from the first BWP to the second BWP. For example, the wireless device may consider the at least one CG occasion being available/allowable for PUSCH transmissions with CG after the switching from the first BWP to the second BWP. For example, the second BWP may comprise the CG configuration. For example, the second BWP may not comprise the CG configuration.

A wireless device may avoid/skip reinitializing at least one CG occasion of a CG configuration according to the CG configuration, for example, based on (e.g., in response to) switching from a first BWP to a second BWP. For example, the wireless device may consider the at least one CG occasion not being available/allowable for PUSCH transmissions with CG after the switching from the first BWP to the second BWP. For example, the second BWP may comprise the CG configuration. For example, the second BWP may not comprise the CG configuration.

Examples described herein may allow a wireless device to determine whether at least one CG occasion of a first CG configuration is suspended/recycled or not, for example, after switching BWP after transmission of a first indication and/or reception of a second indication. Examples described herein may improve alignment between the wireless device and a base station.

A wireless device and/or a base station may communicate (send (e.g., transmit)/receive) a signal/channel (e.g., PUCCH/PDCCH/PDSCH/PUSCH/CSI-RS) at/in/during/via/using an occasion, for example, if the wireless device and/or the base station may communicate (send (e.g., transmit)/receive) the signal/channel at the occasion. The occasion may comprise a set of symbols. The occasion may be an interval/duration in time domain. The occasion may be a slot/subframe/frame. The occasion may comprise one or more slots (e.g., if the transmission of the signal/channel comprises repetition).

Figure 18:
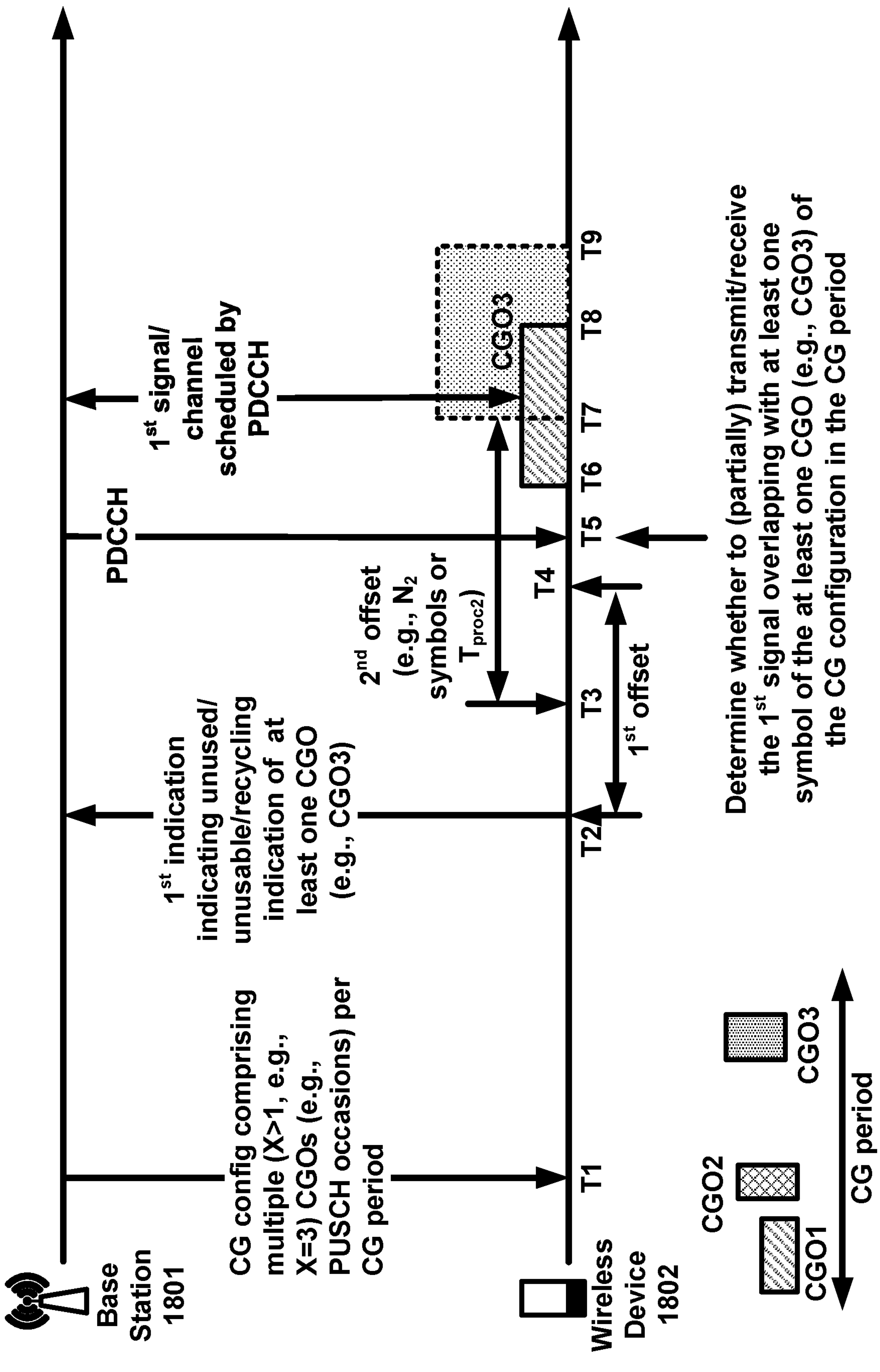
FIG. 18 shows an example of a configured grant (CG) configuration with multiple physical uplink shared channel (PUSCH) occasions per CG period in wireless communications systems.

FIG. 18 shows an example of a CG configuration with multiple PUSCH occasions per CG period in wireless communications systems. For example, FIG. 18 may show examples of the method/procedure for communicating (e.g., sending (e.g., transmitting)/receiving) UL/DL signals/channels/messages at a wireless device 1802 (e.g., an XR device) and/or at a base station 1801. For example, FIG. 18 may show examples for determining whether the wireless device 1802 may communicate (receive/send (e.g., transmit)) UL/DL signals that are dynamically scheduled (e.g., via DCIs), for example, if transmission occasions of the UL/DL signals overlap (in time) with at least one PUSCH occasion of the multiple PUSCH occasions. For example, FIG. 18 may show examples for determining whether at least one PUSCH occasion of the multiple PUSCH occasions is available/allowable for UL transmission with configured grant. For example, the wireless device 1802 may be in an RRC inactive state/mode (e.g., an RRC_INACTIVE/IDLE state), and/or an RRC idle state/mode (e.g., an RRC_IDLE state), and/or an RRC connected state/mode (e.g., an RRC_CONNECTED state).

As shown in FIG. 18, a wireless device 1802 may receive, from a base station 1801, one or more configuration parameters (e.g., one or more RRC configuration parameters), for example, at time/occasion/interval T1. The one or more configuration parameters may comprise, for example, one or more cell (e.g., one or more serving cell) configuration parameters (e.g., ServingCellConfigCommon, ServingCellConfigCommonSIB, and/or ServingCellConfig) for configuring one or more cells (e.g., one or more serving cells). For example, the one or more cells may comprise a master (or primary) cell group (MSG) and/or a secondary cell group (SCG). In some cases, a cell of the one or more cells may be a primary secondary cell (PSCell), or a primary cell (PCell), or a secondary cell (SCell), or a special cell (SpCell). In some other cases, a cell of the one or more cells may belong to a first cell group corresponding to a primary timing advance group (pTAG) or a second cell group corresponding to a secondary timing advance group (sTAG). For example, the one or more configuration parameters may configure the wireless device for multi-cell communication and/or carrier aggregation (CA). The one or more configuration parameters (e.g., the one or more RRC configuration parameters) may comprise one or more BWP configuration parameters (e.g., BWP-DownlinkDedicated IE), for example, of a downlink (DL) BWP (e.g., initial downlink BWP) of a serving cell and/or of an UL BWP of the serving cell. The one or more BWP configuration parameters may configure one or more BWPs (e.g., one or more UL BWPs and/or one or more DL BWPs).

The one or more configuration parameters (e.g., the one or more RRC configuration parameters) may comprise one or more configured grant (CG) configuration parameters (e.g., ConfiguredGrantConfig). For example, the one or more CG configuration parameters may configure at least one CG configuration. The at least one CG configuration may comprise a first CG configuration. The first CG configuration may correspond to (or be associated with) at least one BWP of the one or more BWPs. The wireless device may use the first CG configuration for PUSCH transmissions with the configured grant (e.g., CG-PUSCH transmissions) with the base station on the at least one BWP.

The first CG configuration may correspond to (or be associated with) at least one cell of the one or more cells (e.g., the serving cells). The wireless device may use the first CG configuration for PUSCH transmissions with the configured grant (e.g., CG-PUSCH transmissions) with the base station via/using the at least one cell (e.g., serving cell). For example, the at least one BWP may be configured for the at least one serving cell. The wireless device may perform CG-PUSCH transmissions with the configured grant (e.g., CG-PUSCH transmissions) on the at least one BWP of the at least one cell (e.g., serving cell).

For example, as shown in FIG. 18, the first CG configuration may comprise multiple (e.g., X>1) CG resources/occasions in a CG periodicity/period. For example, the first CG configuration may comprise three CG occasions (e.g., CGO1, CGO2, CGO3). The first CG configuration may be a Type 2 CG configuration (e.g., a configured grant Type 2). The wireless device may receive DCI from the base station activating the CG configuration, for example, if the first CG configuration is the Type 2 CG configuration. For example, the DCI may activate a plurality of CG occasions of the first CG configuration. The (activated) plurality of CG occasions may be a subset of the multiple CG occasions of the first CG configuration.

The first CG configuration may be a Type 1 CG configuration (e.g., a configured grant Type 1). The first CG configuration may comprise the plurality of CG occasions (e.g., the multiple CG occasions).

The CG occasions of the first CG configuration may not overlap in time domain and/or in frequency domain (e.g., in the example of FIG. 18). One or more CG occasions of the first CG configuration may overlap in time domain and/or in frequency domain (e.g., to improve resource efficiency).

For example, the first CG configuration may be exclusive to the wireless device (e.g., not be shared with a second wireless device). In some other examples, one or more CG occasions of the first CG configuration may be shared between the wireless device and one or more wireless devices (e.g., the second wireless device).

The first CG configuration may comprise the (first) plurality of CG resources/occasions in at least one (e.g., each) CG periodicity/period of the first CG configuration. At least one (e.g., each) occasion of the plurality of CG occasions in a CG period may correspond to/for a PUSCH (transmission) resource/occasion (e.g., a CG-PUSCH transmission resource/occasion). For example, a CGO occasion of the first CG configuration in at least one (e.g., each) CG period may correspond to a PUSCH (e.g., a CG-PUSCH) transmission occasion where the wireless device is allowed/configured to send (e.g., transmit) a PUSCH with configured grant. The wireless device may send (e.g., transmit) one or more (new) TBs via/using the PUSCH resource/occasion. For example, the PUSCH resource/occasion may not be used/applicable for a retransmission/repetition of a TB. For example, the wireless device and/or the base station may determine a CG occasion of the plurality of CG occasions in a CG period, for example, based on at least one of: an index (or ID/number/identifier) of the CG occasion of the first CG configuration; and/or a HARQ process number/ID corresponding to the first CG configuration or the CG occasion of the first CG configuration; and/or a resource/occasion number/ID (e.g., symbol/slot/frame number); and/or slot frame number (SFN). For example, the one or more CG configuration parameters may configure a CGO of the first CG configuration (e.g., within a CG period) by corresponding scheduling information (e.g., K2 (slot offset), SLIV (e.g., startSymbolAndLength), a repetition number (e.g., repK), a modulation and coding scheme (e.g., MCS), and/or a PUSCH mapping type).

A wireless device 1802 may send (e.g., transmit) a first indication at a time/occasion (e.g., time/occasion T2 in FIG. 18), for example, on a first BWP of at least one BWP of a serving cell. The first indication may indicate (or correspond to) a first CG configuration. The first indication may indicate/correspond to at least one CGO of a first CG configuration (e.g., on the at least one BWP of the serving cell). For example, the first indication may indicate the at least one CGO of the first CG configuration not being used (or being unused or being unusable) by the wireless device (e.g., being recyclable by a base station). The at least one CGO of the first CG configuration may correspond to one or more logical channels (LCHs) with a first priority (e.g., priority and/or allowedPHY-PriorityIndex-r16). The one or more logical channels may correspond to XR data/traffic.

A wireless device 1802 may send (e.g., transmit) one or more PDU sets (and/or one or more MAC PDUs and/or one or more TBs), for example, after sending (e.g., transmitting) a first indication (e.g., for a first unused duration). The wireless device may send (e.g., transmit) one or more PDU sets (and/or one or more MAC PDUs and/or one or more TBs), for example, during each CG period of a first CG configuration, using one or more CG occasions of the first CG configuration not comprising at least one CG occasion. For example, the wireless device may not use (e.g., for the first unused duration) the at least one CG occasion of the first CG configuration for sending (e.g., transmitting) the one or more PDU sets (and/or one or more MAC PDUs and/or one or more TBs).

A base station 1801 may reallocate at least one CG occasion to other wireless devices (e.g., a second wireless device) in the serving cell. The base station may decrease/reduce/suspend CG occasions of a first CG configuration (for the first wireless device), for example, by removing/deactivating/suspending the at least one CG occasion to the activated CG occasions for the first wireless device. A first indication may inform the base station that the at least one CG occasion is recyclable for other wireless devices. The first indication may indicate to the base station that the at least one CG occasion is suspend-able for the wireless device. For example, the wireless device may request suspending the at least one CG occasion of the first CG configuration, for example, based on sending (e.g., transmitting) the first indication. The first indication may inform the base station that the at least one CG occasion is usable for dynamic PUSCH/PDSCH/CSI-RS transmissions (e.g., for the wireless device or for the other wireless devices). The wireless device may expect receiving DCIs/PDCCHs scheduling dynamic PUSCH/PDSCH/CSI-RS transmissions (e.g., during the at least one CG occasion), for example, based on (e.g., in response to) sending (e.g., transmitting) the first indication.

One or more CG configuration parameters may configure/indicate field/parameter enableConfiguredUL. One or more CG configuration parameters may not configure/indicate field/parameter enableConfiguredUL. For example, the field/parameter enableConfiguredUL may be absent from the one or more CG configuration parameters. For example, the field/parameter enableConfiguredUL may correspond to (or be associated with) a first CG configuration. The field/parameter enableConfiguredUL may correspond to (or be associated with) at least one CG occasion of the first CG configuration. The field/parameter enableConfiguredUL may correspond to (or be associated with) one or more CG occasions of the first CG configuration that are different than the at least one CG occasion.

A wireless device 1802 may send (e.g., transmit) a first indication, for example, via/using a first UCI and/or an UL MAC CE. The first UCI/UL MAC CE may comprise unused/unusable/recyclable/suspend-able information of (at least one CG occasion of) a first CG configuration. The wireless device may send (e.g., transmit) the first UCI (e.g., the first indication), for example, based on/using/via at least one PUCCH resource/occasion corresponding to the first UCI. For example, the at least one PUCCH resource/occasion may belong to a PUCCH group. For example, one or more configuration parameters may configure/indicate the at least one PUCCH resource/occasion for transmission of the first UCI.

A wireless device 1802 may consider at least one CG occasion of a first CG configuration not being available/allowable for PUSCH transmissions with configured grant, for example, based on sending (e.g., transmitting) a first indication and/or receiving a second indication from a base station 1801. The wireless device may determine the at least one CG occasion of the first CG configuration being suspended, for example, based on sending (e.g., transmitting) the first indication and/or receiving the second indication. The wireless device may determine the at least one CG occasion of the first CG configuration being deactivated/recycled, for example, based on sending (e.g., transmitting) the first indication and/or receiving the second indication. For example, a second wireless device may consider the at least one CG occasion of the first CG configuration being available/allowable for PUSCH transmissions with dynamic grant (e.g., indicated/scheduled by DCIs). For example, the first indication may indicate (e.g., to the base station) at least one CGO of the first CG configuration not being used by the wireless device for a first unused duration (comprising a first number of CG periods of the first CG configuration). For example, the wireless device may send (e.g., transmit) the first indication within/during a first CG period. For example, the first unused duration may comprise the first CG period.

The first unused duration may start from (an expiry) of the first CG duration or from a transmission occasion of the first indication.

A base station 1801 may activate/recycle (e.g., via sending (e.g., transmitting) DCI to a second wireless device and/or a fourth indication to the second wireless device) at least one CG occasion for the second wireless device. For example, the base station may increase CG occasions of a first CG configuration (for the second wireless device, e.g., via sending (e.g., transmitting) the fourth indication) by adding/recycling the at least one CG occasion to activated CG occasions for the second wireless device. The base station may deactivate (or make unusable) the at least one CG occasion of the first CG configuration for the wireless device (e.g., via transmission of a second indication to the wireless device).

A base station 1801 may indicate (e.g., via one or more CG configuration parameters) a first value for a first unused duration (e.g., the length of the first unused duration). A wireless device 1802 (and/or the base station) may consider that the first unused duration comprises a next CG period after a first CG period, for example, based on (e.g., in response to) the first value not being indicated/configured (or being absent from the one or more CG configuration parameters). The wireless device (and/or the base station) may consider that the first unused duration comprises the first CG period, for example, based on (e.g., in response to) the first value not being indicated/configured (or being absent from via the one or more CG configuration parameters).

A base station 1801 may indicate (e.g., via one or more CG configuration parameters) a subset of CG occasions of a first CG configuration. For example, a wireless device 1802 may be allowed to select/determine at least one CG occasion from the subset of the CG occasions of the first CG configuration. The wireless device may select/determine the at least one CG occasion from the plurality of (or multiple) the CG occasions of the first CG configuration, for example, based on (e.g., in response to) the subset of the CG occasions of the first CG configuration not being indicated/configured (or being absent from via the one or more CG configuration parameters).

The at least one CG occasion may be within/during a second CG period (or one or more second CG periods) of the first unused duration. In some cases, the second CG period may not be the first CG period. For example, the first indication may indicate that the at least one CG occasion in/during the second CG period is unusable/unused. In some other cases, the second CG period may be the first CG period. For example, the first indication may indicate that the at least one CG occasion in/during the first CG period is unusable/unused. The second CG period may be a next CG period after the first CG period. For example, the second CG period may start a gap/offset after the first CG period (e.g., after an expiry of a first application window with the length of the gap/offset). The gap/offset may be based on a length of the CG period of the first CG configuration. The gap/offset may be based on a processing/delay time at the base station for recycling the at least one CG occasion (e.g., for the second wireless device). The wireless device may expect receiving the second indication, for example, during the first application window after the sending (e.g., transmitting) the first indication to the base station. For example, the wireless device may receive the second indication from the base station, for example, on the first BWP of the at least one BWP of the serving cell.

A wireless device 1802 may indicate a UE-capability message to a base station 1801. The UE-capability message may comprise a capability for transmission/sending a first indication. For example, the capability may correspond to sending (e.g., transmitting) the first indication via a CG-UCI. For example, the capability may correspond to sending (e.g., transmitting) the first indication via the first UCI. The first UCI may be different than CG-UCI. The first UCI may be based on the CG-UCI. The capability may correspond to sending (e.g., transmitting) the first indication via an UL MAC CE, for example, with a first LCID/eLCID. For example, the first UCI may indicate/comprise at least one CG occasion of a plurality of CG occasions, for example, via indicating index(s)/ID(s) of the at least one CG occasion and/or via indicating HARQ process numbers/IDs of the at least one CG occasion. For example, the first UCI may comprise an index/ID of the wireless device (e.g., C-RNTI or the like). For example, the first UCI may comprise an index/ID of the CG configuration (e.g., for identifying the first CG configuration). For example, the first UCI may indicate a length of an unused window of the at least one CG occasion. The unused window may indicate for how long the at least one CG occasion is unused/unusable/recyclable.

A base station 1801 may configure a wireless device 1802 (e.g., via one or more configuration parameters) with a parameter. The wireless device may send (e.g., transmit) the first UCI to the base station, for example, based on (e.g., in response to) the parameter being enabled/configured/indicated. The wireless device may send (e.g., transmit) the first UCI to the base station, for example, based on determining the at least one CGO of the first CG configuration being unusable/unused/recyclable, for example, within/during the first CG period and/or after the first CG period. The wireless device may determine one or more resources (e.g., PUCCH) being configured (e.g., via the one or more configuration parameters) for transmission of the first UCI. The wireless device may refrain from sending (e.g., determine to not transmit) the first UCI to the base station, for example, based on (e.g., in response to) the parameter being disabled (or being absent from the one or more configuration parameters or not being configured/indicated).

A wireless device 1802 may receive a first PDCCH (e.g., PDCCH in FIG. 18) from a base station 1801 at a time/occasion (e.g., T5), for example, after sending (e.g., transmitting) a first indication to the base station. An example may be shown in FIG. 18. The wireless device may determine (e.g., a last/final/ending/latest symbol of) the first PDCCH being received outside of a first window, with the length of a first offset, from a first occasion. For example, the first PDCCH may be received after the first offset from the first indication. The first PDCCH may schedule communication of a first signal/channel/message, for example, on the serving cell, during a first communication (transmission/reception) interval (e.g., from time/occasion/symbol T6 to time/occasion/symbol T8 in FIG. 18).

The first communication interval may comprise a first set of symbols (e.g., a first set of UL symbols or a first set of DL symbols or a first set of flexible symbols, or a combination thereof). For example, one or more configuration parameters (e.g., tdd-UL-DL-ConfigurationCommon and/or tdd-UL-DL-ConfigurationDedicated), may configure the first set of symbols as DL symbols, UL symbols, flexible symbols, or a combination thereof. For example, a DCI format 2_0 (e.g., carried/conveyed via/using the first PDCCH) may indicate/configure the first set of symbols as DL symbols, UL symbols, flexible symbols, or a combination thereof.

The first set of symbols (e.g., of a slot) may be indicated to the wireless device as flexible (e.g., by tdd-UL-DL-ConfigurationCommon and tdd-UL-DL-ConfigurationDedicated if provided, or when tdd-UL-DL-ConfigurationCommon and tdd-UL-DL-ConfigurationDedicated are not provided to the wireless device). For example, the DCI format 2_0 (e.g., carried/conveyed via/using the first PDCCH) may provide a format for the slot using a slot format value other than 255. The wireless device may not expect (or consider an error) to detect an SFI-index field value in the DCI format 2_0 indicating the first set of symbols of the slot as downlink or flexible, for example, if the first set of symbols of the slot may comprise symbols corresponding to any repetition of a PUSCH transmission corresponding to the at least one CG occasion.

As shown in FIG. 18 as an example, the first communication interval may overlap in time domain with at least one CGO (e.g., the CGO 3 in FIG. 18). For example, the first communication interval (e.g., one or more symbols of the first set of symbols) may overlap/collide (in time) with at least one symbol of the at least one CGO (e.g., from time/occasion/symbol T7 to time/occasion/symbol T8 in FIG. 18). For example, the wireless device may receive the first PDCCH during/within the first application window/period/duration. For example, the wireless device may receive the first PDCCH after the expiry of the first application window/period/duration.

The first PDCCH may schedule/indicate a transmission of a first UL signal/message/channel (e.g., a first PUSCH). For example, the first signal/message/channel may be the first UL signal/message/channel. The first PUSCH may be a dynamic PUSCH.

The first PDCCH may schedule/indicate a transmission/reception of a first DL signal/message/channel (e.g., a first PDSCH or a first CSI-RS). For example, the first signal/message/channel may be the first DL signal/message/channel. The first PDSCH/CSI-RS may be a dynamic PDSCH/CSI-RS.

The base station 1801 may receive, from the wireless device 1802, the first indication. The base station may send (e.g., transmit), to the wireless device, the first PDCCH indicating/scheduling the transmission of the first PUSCH (and/or the first PDSCH/CSI-RS) during the first set of symbols (e.g., the first communication interval). As shown in FIG. 18, the base station may send (e.g., transmit) the first PDCCH, for example, based on the receiving the first indication. The base station may send (e.g., transmit) the first PDCCH, for example, after the first offset from the reception of the first indication. The base station may send (e.g., transmit) the first PDCCH, for example, within the second offset prior to the at least one CG occasion (e.g., the CGO3 in FIG. 18).

The base station 1801 may receive, from the wireless device 1802, the first PUSCH transmission. The base station 1801 may receive, from the wireless device 1802, the first PUSCH transmission, for example, based on (e.g., in response to) the sending (e.g., transmitting) the first PDCCH being within the second offset prior to the at least one CG occasion (and/or the sending (e.g., transmitting) the first PDCCH after the first offset after the reception of the first indication). The base station 1801 may receive, from the wireless device 1802, the first PUSCH transmission, for example, during the at least one CG occasion (or the first communication interval), based on the receiving the first indication (e.g., indicating the at least one CG occasion is unused/unusable/recyclable). The base station may send (e.g., transmit), to the wireless device, the first PDSCH/CSI-RS transmission, for example, based on (e.g., in response to) the sending (e.g., transmitting) the first PDCCH being within the second offset prior to the at least one CG occasion (and/or the sending (e.g., transmitting) the first PDCCH after the first offset after the reception of the first indication). The base station may send (e.g., transmit), to the wireless device, the first PDSCH/CSI-RS transmission, for example, during the at least one CG occasion (or the first communication interval) based on the receiving the first indication.

A wireless device 1802 may send (e.g., transmit) a first UCI (e.g., a first indication) to a base station 1801, for example, at/in/during a first occasion (e.g., time/occasion T2 in FIG. 18). The wireless device may receive from the base station a first PDCCH. The first PDCCH may schedule/indicate a first PUSCH transmission (and/or a first PDSCH/CSI-RS reception) that may overlap in time with at least one CG occasion (e.g., a first communication interval). As shown in FIG. 18, the wireless device may receive the first PDCCH, for example, after a first offset from the first occasion. As shown in FIG. 18, the wireless device may receive the first PDCCH within a second offset from the at least one CG occasion. The wireless device may send (e.g., transmit) the first PUSCH transmission, for example, based on (e.g., in response to) receiving the first PDCCH within the second offset prior to the at least one CG occasion (and/or receiving the first PDCCH after the first offset after the transmission of the first UCI). The wireless device may send (e.g., transmit) the first PUSCH transmission, for example, during the at least one CG occasion (e.g., the first communication interval), based on the transmission of the first UCI indicating that the at least one CG occasion is unused. The wireless device may receive the first PDSCH/CSI-RS reception, for example, based on (e.g., in response to) receiving the first PDCCH within the second offset prior to the at least one CG occasion (and/or receiving the first PDCCH after the first offset after the transmission of the first UCI). The wireless device may receive the first PDSCH/CSI-RS reception, for example, during the at least one CG occasion (e.g., the first communication interval), based on the transmission of the first UCI indicating that the at least one CG occasion is unused.

A base station 1801 may receive, from a wireless device 1802, a first UCI. As shown in FIG. 18 as an example, the base station may send (e.g., transmit) to the wireless device a first PDCCH scheduling a first PUSCH transmission (and/or a first PDSCH/CSI-RS reception) that may overlap in time with a CG occasion (e.g., a first communication interval). The base station may send (e.g., transmit) the first PDCCH, for example, based on the receiving the first UCI. The base station may send (e.g., transmit) the first PDCCH, for example, after the first offset from the reception of the first UCI. The base station may receive, from the wireless device, the PUSCH transmission, for example, based on (e.g., in response to) sending (e.g., transmitting) the first PDCCH within a second offset prior to at least one CG occasion (and/or sending (e.g., transmitting) the first PDCCH after a first offset after the reception of the first UCI). The base station may receive, from the wireless device, the PUSCH transmission, for example, during the at least one CG occasion based on the reception of the first UCI. The base station may send (e.g., transmit), to the wireless device, the first PDSCH/CSI transmission, for example, based on (e.g., in response to) sending (e.g., transmitting) the first PDCCH within the second offset prior to the at least one CG occasion (and/or sending (e.g., transmitting) the first PDCCH after the first offset after the reception of the first UCI). The base station may send (e.g., transmit), to the wireless device, the first PDSCH/CSI transmission, for example, during the at least one CG occasion based on the reception of the first UCI.

A wireless device 1802 (and/or a base station 1801) may determine communicating a first PUSCH with the base station (e.g., sending (e.g., transmitting) the first PUSCH to the base station, e.g., during the first communication interval), for example, based on at least one UL rule being satisfied. The wireless device (and/or the base station) may determine avoiding/skipping communicating the first PUSCH with the base station, for example, by not transmitting (or skipping/dropping transmission of) the first PUSCH to the base station, for example, during the first communication interval, for example, based on the at least one UL rule not being satisfied.

A wireless device 1802 (and/or a base station 1801) may determine communicating a first PUSCH (e.g., transmitting the first PUSCH transmission) with the base station, for example, by partially sending (e.g., transmitting) the first PUSCH transmission to the base station (e.g., during at least one non-overlapping symbol of the first communication interval). For example, the wireless device may indicate a UE-capability message (to the base station). The UE-capability message may comprise a first capability for partially sending (e.g., transmitting) UL signals (e.g., the first PUSCH). The at least one non-overlapping symbol of the first communication interval (e.g., from time/occasion/symbol T6 to time/occasion/symbol T7 in FIG. 18) may not comprise at least one symbol of at least one CGO.

A wireless device 1802 may determine communicating a first PDSCH/CSI-RS with a base station 1801, for example, by receiving the first PDSCH/CSI-RS from the base station (e.g., during a first communication interval), for example, based on at least one DL rule being satisfied. The wireless device may determine skipping/voiding communicating the first PDSCH/CSI-RS with the base station, for example, by not receiving (or skipping/dropping reception of) the first PDSCH/CSI-RS from the base station (e.g., during the first communication interval), for example, based on the at least one DL rules not being satisfied.

A wireless device 1802 (and/or a base station 1801) may determine communicating a first PDSCH/CSI-RS with the base station, for example, by partially receiving the first PDSCH/CSI-RS from the base station (e.g., during at least one non-overlapping symbol of a first communication interval). For example, the wireless device may indicate a UE-capability message (to the base station). The UE-capability message may comprise a second capability for partially receiving DL signals (e.g., the first DL signal). The second capability may be the first capability. The second capability may be different from the first capability. For example, the second capability may be a partialCancellation capability. In other examples, the second capability may be different from the partialCancellation capability.

The first PDCCH may indicate a slot format value other than 255. For example, the first PDCCH may carry/be with a DCI format 2_0. The slot format value may indicate a slot format with the first set of symbols as downlink or flexible.

A base station 1801 may configure (e.g., via one or more configuration parameters) a wireless device 1802 with a first offset. The first offset may be pre-defined (e.g., hardcoded) for the wireless device. The wireless device may determine the first offset, for example, based on a UE processing capability (e.g., PUSCH preparation time for PUSCH timing capability 1 or 2, e.g., $T_{proc2}$, and/or $T_{proc1}$) and one or more subcarrier spacings (SCSs). For example, the one or more SCSs may correspond to an SCS of a PUSCH with configured grant (e.g., a PUSCH occasion of the at least one CGO, or a PUSCH occasion of the first CG) and/or an SCS of a first PDCCH indicating the communication of a first signal. The first offset may be based on a processing delay of the base station, for example, the processing delay for decoding UCI/PUSCH (e.g., the processing delay of PUSCH) and/or the UL MAC CE. The first offset may be based on PHY layer (e.g., $T_{proc2}/T_{proc1}$) and/or MAC layer processing time (e.g., 3 ms) of the wireless device. A symbol duration (e.g., of the first offset) may be, for example, based on a minimum of a subcarrier spacing corresponding to the PUSCH with configured grant (e.g., the at least one CG occasion). The symbol duration (e.g., of a second offset) may be, for example, based on a minimum of a subcarrier spacing corresponding to the PUSCH with configured grant (e.g., the at least one CG occasion) and a subcarrier spacing of the first PDCCH scheduling the first PUSCH. $T_{proc,2}$ may be the PUSCH preparation time for the corresponding UE processing capability, for example, assuming $d_{2,1}=1$. The first offset may be a gap/offset (e.g., the length of a first application window). For example, the base station may configure the first offset to send (e.g., transmit) a second indication (e.g., a confirmation for a first indication) to the wireless device. The first offset may be, for example, based on processing time/delay of the base station.

The first occasion may correspond to a transmission time/occasion of the first indication (e.g., time/occasion/symbol T2 in FIG. 18) and/or the at least one CG occasion. The first occasion may be a last/final/ending/latest symbol of a PUCCH resource/occasion used, by the wireless device, for sending (e.g., transmitting) the first indication to the base station. For example, the first occasion may be a last/final/ending/latest symbol of a CG occasion of the plurality of the CG occasions. For example, the CG occasion may be a first/starting/initial CG occasion of the plurality of the CG occasions. For example, The CG occasion may be a last/final/ending CG occasion of the plurality of the CG occasions. The CG occasion may be used, by the wireless device, for sending (e.g., transmitting) the first indication to the base station. The first occasion may be a last/final/ending symbol of the first CG period. The first occasion may be a first/starting/initial symbol of the first CG period. For example, the first occasion may be an occasion/time corresponding to the expiry of the application window/period. For example, the first occasion may be the gap/offset from the transmission occasion of the first indication.

A wireless device 1802 may communicate a first signal to a base station 1801, for example, based on (e.g., in response to) at least one DL rule being satisfied and/or at least one UL rule being satisfied. The wireless device may determine the at least one DL (and/or UL) rule being satisfied, for example, based on first PDCCH being received after a first offset from a first occasion. The wireless device may determine the at least one DL (and/or UL) rule being satisfied, for example, if the first PDCCH schedules/indicates the transmission of a first PUSCH. The wireless device may determine the at least one DL (and/or UL) rule being satisfied, for example, based on first PDCCH being received after the first offset from the first occasion. For example, the wireless device may determine a last/final/ending/latest symbol of the first PDCCH being after the first offset from the first occasion. The wireless device may determine a last/final/ending/latest symbol of a CORESET where the wireless device detects a first DCI format (or a first DCI) corresponding to the first PDCCH after the first offset from the first occasion.

A wireless device 1802 may determine at least one DL (and/or UL) rule being satisfied, for example, based on a first PDCCH being received during/within a first application window/period. A base station 1801 may reuse/recycle at least one CG occasion for scheduling dynamic UL/DL transmissions for the wireless device (and/or for a second wireless device), for example, during the first application window. The wireless device may, for example, during the first application window, consider the at least one CG occasion being not available/allowable for PUSCH transmissions with configured grant.

A wireless device 1802 may determine at least one DL (and/or UL) rule being satisfied, for example, based on a first PDCCH being received after the expiry of a first application window/period. A base station 1801 may reuse/recycle at least one CG occasion for scheduling dynamic UL/DL transmissions for the wireless device (and/or for a second wireless device), for example, after the expiry of the first application window. The wireless device may, for example, during the first application window, consider the at least one CG occasion being available/allowable for PUSCH transmissions with configured grant.

In the example of FIG. 18, a wireless device 1802 may send (e.g., transmit) a first UL signal (e.g., a first PUSCH) during a first communication interval, for example, based on (e.g., in response to) at least one UL rule being satisfied. The wireless device 1802 may send (e.g., transmit) a first UL signal (e.g., a first PUSCH) during a first communication interval, for example, on a serving cell. As shown in FIG. 18, the last/final/ending/latest symbol of a first PDCCH may be within a second offset from a starting/first/initial symbol of the CGO3 (e.g., at least one CG occasion). The second offset may be different from the first offset. The second offset may, for example, be the first offset. For example, the second offset may be based on (or equal to) $N_2$ symbols. The wireless device may determine the value $N_2$ in symbols according to a UE processing capability (e.g., PUSCH preparation time for PUSCH timing capability 1 or 2). A symbol duration (e.g., of the second offset) may be, for example, based on a minimum of a subcarrier spacing corresponding to the PUSCH with configured grant (e.g., the at least one CG occasion) and a subcarrier spacing of the first PDCCH scheduling the first PUSCH.

A wireless device 1802 may determine that a HARQ process number indicated by a first PDCCH (e.g., for transmission of a first PUSCH) is the same as a HARQ process number corresponding to CGO3 (or at least one CG occasion). In some other examples, a wireless device may determine that a HARQ process number indicated by a first PDCCH (e.g., for transmission of a first PUSCH) is different from a HARQ process number corresponding to CGO3 (or at least one CG occasion).

A wireless device 1802 may determine a priority index of a first PUSCH being larger (or alternatively smaller) than a priority index of a PUSCH corresponding to CGO3 (or at least one CG occasion). A wireless device may determine a priority index of a first PUSCH being equal to a priority index of a PUSCH corresponding to CGO3 (or at least one CG occasion).

A wireless device 1802 may determine that one or more configuration parameters do not provide/indicate/configure a first configuration parameter (e.g., prioLowDG-HighCG or prioHighDG-LowCG). The first configuration may enable PHY prioritization for the case where high-priority dynamic grant PUSCH (e.g., the first PUSCH) collides with low-priority configured grant PUSCH (e.g., corresponding to the at least one CG occasion), for example, on a BWP of the serving cell. For example, the wireless device may determine the first PUSCH having a higher priority index than a priority index of and a PUSCH corresponding to the CGO3 (or the at least one CG occasion) having a same (physical layer) priority index. A wireless device may determine that one or more configuration parameters provide/indicate/configure the first configuration parameter (e.g., prioLowDG-HighCG or prioHighDG-LowCG) and/or that the first PUSCH and a PUSCH corresponding to the CGO3 (or the at least one CG occasion) having a same (physical layer) priority index.

A wireless device 1802 may expect to be scheduled by a first PDCCH (e.g., ending in symbol i) to send (e.g., transmit) a first PUSCH (e.g., a DG-PUSCH) on a serving cell overlapping in time with a first communication interval. The first communication interval may be, for example, a transmission occasion (e.g., CGO3 of a first CG configuration) where the wireless device is allowed to send (e.g., transmit) a CG-PUSCH with configured grant, starting in a symbol j on the same serving cell based on the first PDCCH being received after the first offset from the first occasion and the end of symbol i not being at least the second offset (e.g., $N_2$ symbols) before the beginning of symbol j. For example, one or more configuration parameters may not comprise/provide the prioLowDG-HighCG or prioHighDG-LowCG. For example, the one or more configuration parameters may comprise/provide prioLowDG-HighCG or prioHighDG-LowCG, and the first PUSCH (e.g., the DG-PUSCH) and the CG-PUSCH may have the same priority index.

A wireless device 1802 may expect to be scheduled by a first PDCCH (e.g., ending in symbol i) to send (e.g., transmit) a first PUSCH (e.g., a DG-PUSCH) on a serving cell for a given HARQ process during a first communication interval (e.g., a transmission occasion where the wireless device is allowed to send (e.g., transmit) a CG-PUSCH corresponding to at least one CG occasion of a first CG configuration) with configured grant with the same HARQ process on the serving cell starting in a symbol j after symbol i based on the first PDCCH being received after the first offset from the first occasion and a gap between the end of the first PDCCH and the beginning of symbol j being less than the second offset (e.g., $N_2$ symbols).

A wireless device 1802 may determine transport blocks for both DG-PUSCH (e.g., a first PUSCH) and CG-PUSCH (e.g., a PUSCH corresponding to the CGO3 being generated). A wireless device may not generate a transport block for the CG-PUSCH, for example, based on sending (e.g., transmitting) a first indication. For example, the wireless device may determine at least one UL/DL rule being satisfied, for example, based on the transport block for the CG-PUSCH not being generated. The wireless device may determine the at least one UL/DL rule not being satisfied, for example, based on the transport block for the CG-PUSCH being generated.

In the example of FIG. 18, the wireless device 1802 may receive the first DL signal (e.g., the first PDSCH/CSI-RS) during the first communication interval, for example, based on (e.g., in response to) the at least one DL rule being satisfied. The wireless device may, for example, based on the at least one DL rule being satisfied, ignore a first capability and/or a second capability (e.g., partialCancellation for receiving PDSCH/CSI-RS or for transmitting UL signals) for example, for operation on a single carrier in unpaired spectrum.

Examples may allow a wireless device to resolve collision between dynamic UL/DL transmissions/receptions and the at least one CG occasion, for example, after the transmission of the first indication. Examples may enhance alignment between the wireless device and a base station.

Figure 19:
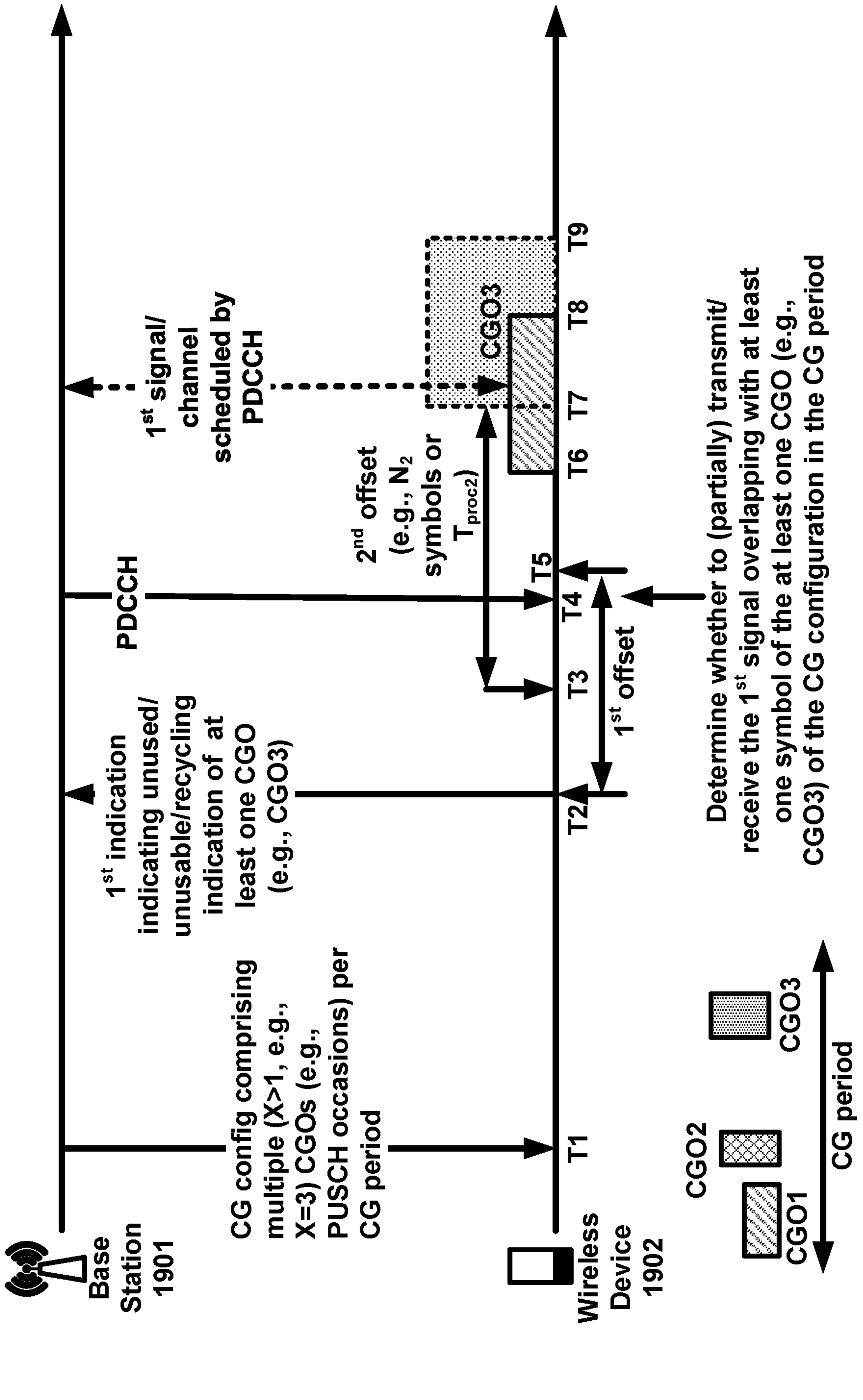
FIG. 19 shows an example of a CG configuration with multiple PUSCH occasions per CG period in wireless communications systems.

FIG. 19 shows an example of a CG configuration with multiple PUSCH occasions per CG period in wireless communications systems. For example, FIG. 19 may show examples of the method/procedure for communicating (e.g., sending (e.g., transmitting)/receiving) UL/DL signals/channels/messages at a wireless device 1902 (e.g., an XR device) and/or at a base station 1901. For example, FIG. 19 may show examples for determining whether the wireless device 1902 may communicate (receive/send (e.g., transmit)) UL/DL signals that are dynamically scheduled (e.g., via DCIs), for example, if transmission occasions of the UL/DL signals overlap (in time) with at least one PUSCH occasion of the multiple PUSCH occasions. For example, FIG. 19 may show examples for determining whether at least one PUSCH occasion of the multiple PUSCH occasions is available/allowable for UL transmission with configured grant. For example, the wireless device 1902 may be in an RRC inactive state/mode (e.g., an RRC_INACTIVE/IDLE state), and/or an RRC idle state/mode (e.g., an RRC_IDLE state), and/or an RRC connected state/mode (e.g., an RRC_CONNECTED state).

Similar to discussions described herein with respect to FIG. 18, as shown in FIG. 19, a wireless device 1902 may receive, from a base station 1901, one or more configuration parameters (e.g., one or more RRC configuration parameters), for example, at time/occasion/interval T1. The one or more configuration parameters (e.g., the one or more RRC configuration parameters) may comprise one or more CG configuration parameters (e.g., ConfiguredGrantConfig). For example, the one or more CG configuration parameters may comprise a first CG configuration. As shown in FIG. 19, the first CG configuration may comprise multiple (e.g., X>1) CG resources/occasions in at least one (e.g., each) CG periodicity/period of the first CG configuration.

A wireless device 1902 may send (e.g., transmit) a first indication, for example, at a time/occasion (e.g., T2 in FIG. 19). The wireless device may receive a first PDCCH (e.g., PDCCH in FIG. 19) from the base station at a time/occasion (e.g., T4), for example, after sending (e.g., transmitting) the first indication to the base station. For example, as shown in FIG. 19, the wireless device may determine (e.g., a last/final/ending/latest symbol of) the first PDCCH being received within/in a first window, with the length of a first offset, from a first occasion. For example, the first PDCCH may be received before the first offset from the first indication. The first PDCCH may schedule communication of a first signal/channel/message, for example, on the serving cell, during a first communication interval (e.g., from time/occasion/symbol T6 to time/occasion/symbol T8 in FIG. 19). As shown in FIG. 19, the first communication interval may overlap in time domain with at least one CGO (e.g., the CGO 3 in FIG. 19).

A wireless device 1902 may refrain from communicating (e.g., not communicate or avoid/skip communicating) a first signal to a base station, for example, based on (e.g., in response to) at least one DL (and/or UL) rule not being satisfied. The wireless device may determine the at least one DL (and/or UL) rule not being satisfied, for example, based on first PDCCH being received within/in/during a first offset from a first occasion. The wireless device may determine the at least one DL (and/or UL) rule not being satisfied, for example, based on the first PDCCH being received during/within a first application window/period. The base station may avoid reusing/recycling the at least one CG occasion for scheduling dynamic UL/DL transmissions for the wireless device (and/or for a second wireless device), for example, during the first application window. The wireless device may, for example, during the first application window, consider the at least one CG occasion being available/allowable for PUSCH transmissions with configured grant.

In the example of FIG. 19, the wireless device 1902 may refrain from sending (e.g., transmitting) the first UL signal (e.g., the first PUSCH) during the first communication interval, for example, based on (e.g., in response to) the at least one UL rule not being satisfied. As shown in FIG. 19, the last/final/ending/latest symbol of the first PDCCH may be within the second offset from a starting/first/initial symbol of the CGO3 (e.g., the at least one CG occasion).

The wireless device 1902 may send (e.g., transmit) the first UL signal (e.g., the first PUSCH) during the first communication interval, for example, based on (e.g., in response to) the at least one UL rule not being satisfied. For example, the starting/first/initial symbol of the CGO3 (e.g., the at least one CG occasion) may be after the second offset from the last/final/ending/latest symbol of the first PDCCH.

A wireless device 1902 may not expect (or consider an error) to be scheduled by a first PDCCH (e.g., ending in symbol i, e.g., the last/final/ending/latest symbol of the first PDCCH) to send (e.g., transmit) a first PUSCH (e.g., on the serving cell) overlapping in time with a CGO occasion (e.g., the CGO3 in FIG. 19) of at least one CG occasion of a CG configuration. For example, the CGO occasion may correspond to a transmission occasion where the wireless device is allowed/configured (e.g., via the first CG configuration) to send (e.g., transmit) a PUSCH with configured grant. For example, the transmission occasion may start in a symbol j (e.g., time/occasion T7 in FIG. 19) on the (same) serving cell or a different serving cell. In one example, the wireless device may receive the first PDCCH within/during a first offset from a first occasion. In another example, the wireless device may receive the first PDCCH after the first offset from the first occasion. For example, the wireless device may determine an end of the symbol i not being at least a second offset (e.g., $N_2$ symbols) before a beginning/starting of the symbol j. The wireless device may determine that one or more configuration parameters do not provide/indicate/configure a first configuration parameter (e.g., prioLowDG-HighCG or prioHighDG-LowCG). The wireless device may determine that the one or more configuration parameters provide/indicate/configure the first configuration parameter (e.g., prioLowDG-HighCG or prioHighDG-LowCG) and the first PUSCH and a PUSCH corresponding to the CGO3 (or the at least one CG occasion) having a same priority index.

A wireless device 1902 may avoid/skip (or refrain from) receiving a first DL signal during a first communication interval, for example, based on at least one DL (and/or UL) rule not being satisfied. For example, for operation on a single carrier in unpaired spectrum, the wireless device may not expect (or consider an error) to receive (or may not receive) the first DL signal/channel (or may not expect to cancel/may not cancel a PUSCH transmission corresponding to at least one CG occasion) in a first set of symbols (e.g., in a slot) of the first communication interval, for example, based on a first/starting/earliest/initial symbol in the first set of symbols occurring within/during a second offset (e.g., $T_{proc,2}$) relative to the last/final/ending/latest symbol of the first PDCCH (or a last/final/ending/latest symbol of a CORESET where the wireless device detects the first DCI format). The wireless device may receive the first DL signal/message/channel (or may cancel a PUSCH transmission corresponding to the at least one CG occasion, or an actual repetition of the PUSCH) in the first set of symbols (or the first transmission interval), for example, based on a first/starting/earliest/initial symbol in the first set of symbols occurring after the second offset (e.g., $T_{proc,2}$) relative to the last/final/ending/latest symbol of the first PDCCH (or a last/final/ending/latest symbol of a CORESET where the wireless device detects the first DCI format). For example, the UE-capability message may not comprise/indicate a capability of partial cancelation (e.g., partialCancellation).

A wireless device capability message (e.g., UE-capability message) may comprise/indicate a capability of partial cancelation (e.g., partialCancellation). For example, a wireless device 1902 may partially receive a first DL signal/message and/or may partially send (e.g., transmit) a PUSCH transmission corresponding to at least one CG occasion. The wireless device may not expect (or consider an error) to receive (or may not receive) the first DL signal/channel (or may not expect to cancel/may not cancel the PUSCH transmission corresponding to the at least one CG occasion) in a first subset of symbols of a first set of symbols (e.g., in a slot) of a first communication interval, for example, based on a first/starting/earliest/initial symbol in the first set of symbols occurring within/during a second offset (e.g., $T_{proc,2}$) relative to the last/final/ending/latest symbol of the first PDCCH (or a last/final/ending/latest symbol of a CORESET where the wireless device detects the first DCI format). The first subset of symbols of the first set of symbols may occur within/during the second offset (e.g., $T_{proc,2}$) relative to the last/final/ending/latest symbol of the first PDCCH. For example, the wireless device may receive the first DL signal/channel (or may cancel a PUSCH transmission corresponding to the at least one CG occasion), for example, during a second subset of symbols of the first set of symbols. The second subset of symbols of the first set of symbols may correspond to the first communication interval that occurs after the second offset (e.g., $T_{proc,2}$) relative to the last/final/ending/latest symbol of the first PDCCH (or a last/final/ending/latest symbol of a CORESET where the wireless device detects the first DCI format).

Examples may allow a wireless device to resolve collision between dynamic UL/DL transmissions/receptions and at least one CG occasion, for example, after the transmission of a first indication. Examples may enhance alignment between the wireless device and a base station.

Figure 20:
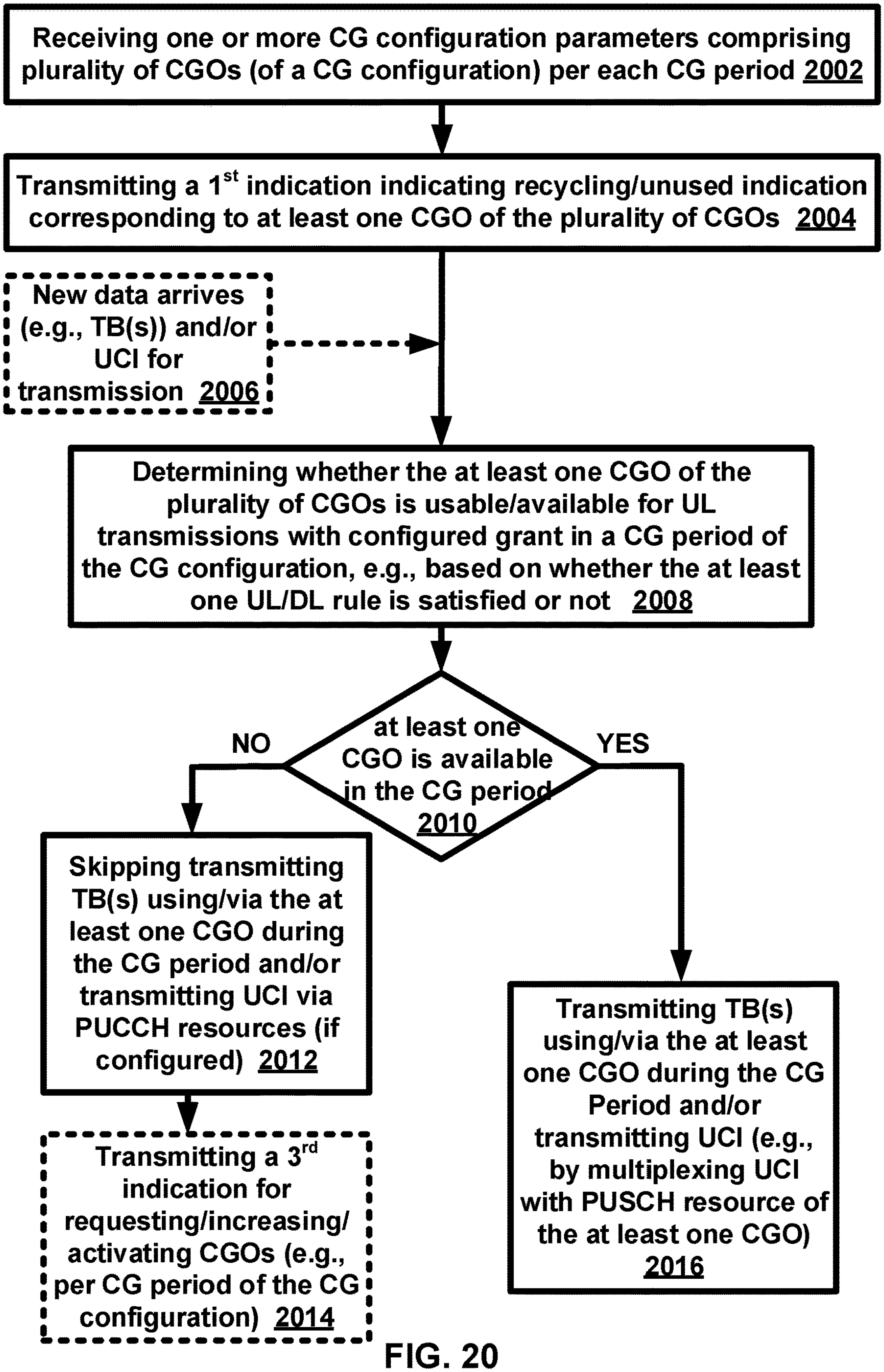
FIG. 20 shows an example method/procedure for uplink/downlink (UL/DL) transmissions in wireless communications systems.
Figure 21:
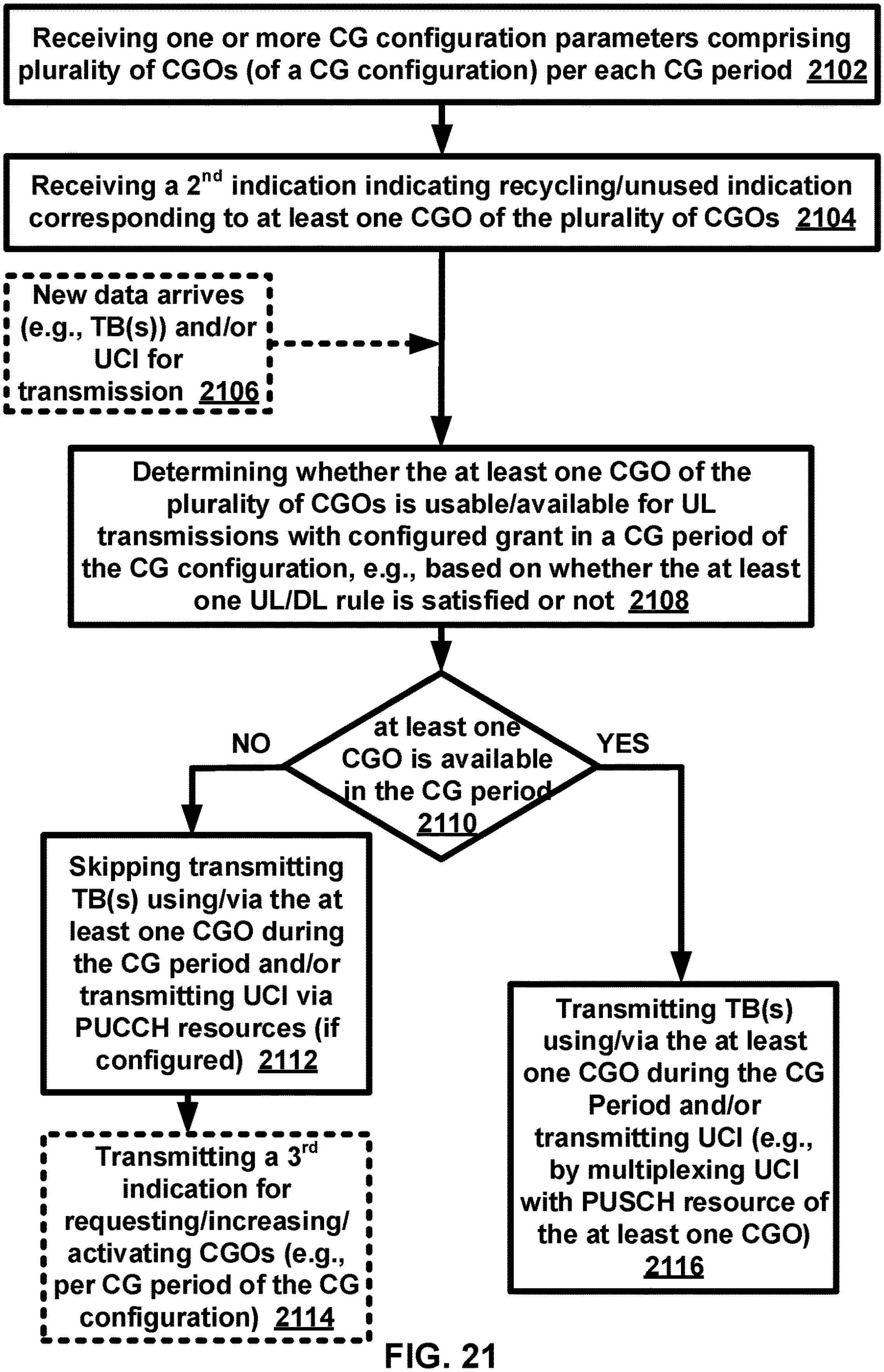
FIG. 21 shows an example method/procedure for UL/DL transmissions in wireless communications systems.

FIG. 20 shows an example method/procedure for UL/DL transmissions in wireless communications systems. FIG. 21 shows an example method/procedure for UL/DL transmissions in wireless communications systems. For example, the method/procedure of the FIG. 20 and FIG. 21 may be based on using a CG configuration with multiple PUSCH occasions per CG period. For example, FIG. 20 and FIG. 21 may show examples of the method/procedure for communicating (e.g., sending (e.g., transmitting)/receiving) UL/DL signals/channels/messages at a wireless device (e.g., an XR device) and/or at a base station. For example, FIG. 20 and FIG. 21 may show examples for determining whether the wireless device may send (e.g., transmit) UL data using at least one PUSCH occasion of the multiple PUSCH occasions. For example, FIG. 20 and FIG. 21 may show examples for determining whether to multiplex UCI (e.g., HARQ-ACK information) with CG-PUSCH transmission corresponding to a PUSCH occasion of the multiple PUSCH occasions. For example, the wireless device may be in an RRC inactive state/mode (e.g., an RRC_INACTIVE/IDLE state), and/or an RRC idle state/mode (e.g., an RRC_IDLE state), and/or an RRC connected state/mode (e.g., an RRC_CONNECTED state). UL data may correspond to one or more PDU sets (e.g., XR data).

Similar to discussions herein with respect to FIG. 18 and/or FIG. 19, as shown in step 2002 of FIG. 20 and/or step 2102 of FIG. 21, a wireless device may receive, from a base station, one or more configuration parameters (e.g., one or more RRC configuration parameters). The one or more configuration parameters (e.g., one or more RRC configuration parameters) may comprise one or more CG configuration parameters (e.g., ConfiguredGrantConfig). For example, the one or more CG configuration parameters may comprise/configure a first CG configuration. The first CG configuration may comprise multiple (e.g., X>1) CG resources/occasions in at least one (e.g., each) CG periodicity/period of the first CG configuration.

As shown in step 2004 of FIG. 20 and/or step 2104 of FIG. 21, the wireless device may communicate one or more indications with the base station. For example, the one or more indications may comprise a first (or $1^{st}$) indication. The wireless device may send (e.g., transmit) the first indication to the base station. For example, the first indication may indicate (or inform the base station) at least one CG occasion of the first CG configuration (comprising the multiple CG occasions) being unused/unusable/recyclable (e.g., for a first unused duration). For example, the one or more indications may comprise a second (or $2^{nd}$) indication. The wireless device may receive from the base station the second indication. For example, the second indication may indicate (or inform the wireless device) at least one CG occasion of the first CG configuration (comprising the multiple CG occasions) being unused/unusable/recyclable (e.g., for the first unused duration).

As shown in step 2006 of FIG. 20 and/or step 2106 of FIG. 21, the wireless device may determine (new) data (e.g., UL data) being available for transmission (e.g., UL transmission, e.g., one or more TBs/PDU sets/PDUs corresponding to XR service/traffic), for example, after the communication of the one or more indications (e.g., the transmission of the first indication and/or the reception of the second indication). For example, the wireless device may trigger a BSR (e.g., an enhanced BSR), for example, based on (e.g., in response to) UL data being available for UL transmission. The BSR (e.g., an enhanced BSR) may comprise remaining time(s)/delay budget(s) (e.g., PSDB) of one or more PDU sets (or one or more PDUs of a PDU set) of the UL data.

The wireless device may receive UL data (e.g., the one or more PDU sets) corresponding to one or more logical channels, for example, due to jitter. For example, the wireless device may receive the UL data earlier than an expected arrival time. For another example, the wireless device may determine UCI being available for transmission. The UCI may comprise a first UCI and/or at least one HARQ-ACK information and/or CSI report and/or CG-UCI. For example, the wireless device may determine available CG occasions of the first CG configuration not being enough for transmission of the UL data (e.g., as a result of LCP procedure) and/or UCI. The at least one CG occasion of the first CG configuration may not belong to the available CG occasions of the first CG configuration.

Following the discussions with respect to FIG. 18 and/or FIG. 19, as shown in step 2008 of FIG. 20 and/or step 2108 of FIG. 21, the wireless device may determine whether the at least one CGO of the plurality of CGOs is usable/available for UL transmissions with configured grant in a CG period of the first CG configuration, for example, based on whether the at least one UL/DL rule is satisfied or not. The wireless device may determine the at least one UL/DL rule being satisfied, for example, based on (e.g., in response to) receiving the one or more indications (e.g., the first indication and/or the second indication).

As shown in step 2010 of FIG. 20 and/or step 2110 of FIG. 21, the wireless device may determine at least one CGO of the plurality of CGOs being usable/available (e.g., for UL transmissions with configured grant in the CG period of the first CG configuration). For example, the wireless device may determine the at least one UL/DL rule being satisfied. The CG period may be the first offset after the first occasion. For example, the CG period may be the first offset after the transmission occasion of the first indication. For example, the CG period may be within/during the first unused duration after/from the first occasion.

As shown in step 2016 of FIG. 20 and/or step 2116 of FIG. 21, the wireless device may send (e.g., transmit) one or more TBs via/using the at least one CGO of the plurality of CGOs, for example, based on (e.g., in response to) the at least one CGO of the plurality of CGOs being usable/available (e.g., for UL transmissions with configured grant in the CG period of the first CG configuration). The wireless device may multiplex the UCI, for example, with a PUSCH occasion corresponding to the at least one CGO of the first CG configuration.

As shown in step 2010 of FIG. 20 and/or step 2110 of FIG. 21, the wireless device may determine the at least one CGO of the plurality of CGOs being unusable/unavailable or not being usable/available (e.g., for UL transmissions with configured grant in the CG period of the first CG configuration). For example, the wireless device may determine the at least one UL/DL rule not being satisfied. The CG period may be prior to the first offset after the first occasion. For example, the CG period may be prior to the first offset after the transmission occasion of the first indication. For example, the CG period may be prior to (or alternatively after) the first unused duration after/from the first occasion.

As shown in step 2012 of FIG. 20 and/or step 2112 of FIG. 21, the wireless device may refrain from/avoid/skip sending (e.g., transmitting) (e.g., not send or transmit) the one or more TBs via/using the at least one CGO of the plurality of CGOs, for example, based on (e.g., in response to) the at least one CGO of the plurality of CGOs not being usable/available (e.g., for UL transmissions with configured grant in the CG period of the first CG configuration). For example, the wireless device may not multiplex the UCI with a PUSCH occasion corresponding to the at least one CGO of the first CG configuration. For example, the wireless device may send (e.g., transmit) the UCI using one or more PUCCH occasions/resources (e.g., configured via the one or more configuration parameters).

As shown in step 2014 of FIG. 20 and/or step 2114 of FIG. 21, the wireless device may send (e.g., transmit) a third indication to the base station, for example, based on the at least one CGO of the plurality of CGOs not being usable/available (e.g., for UL transmissions with configured grant in the CG period of the first CG configuration) and the UL data being available for UL transmission (e.g., the triggered BSR). For example, the wireless device may determine delay budget of the UL data (e.g., a PSDB of a PDU set of the one or more PDU sets or delay budget/remaining time of a PDU of the PDU set) being smaller than a threshold. For example, the wireless device may determine delay budget/remaining time of the PDU of the PDU set being violated. The wireless device may determine the PSDB of a PDU set being violated. The third indication may be for requesting/increasing/activating one or more CG occasions (CGOs). The third indication may be for requesting unsuspension/unsuspending the at least one CG occasion of the first CG configuration.

The third indication may be a UCI (e.g., a second UCI, a CG-UCI) and/or a MAC CE. The third indication may comprise/indicate buffer information of one or more logical channels and/or the one or more PDU sets and/or the one or more PDUs. The third indication may be a BSR MAC CE (e.g., an enhanced BSR MAC CE). The third indication may comprise/indicate delay budget information (or remaining time information) of one or more PDU sets and/or one or more PDU sessions. Methods and procedures discussed related to FIG. 18 regarding the transmission of the first UCI may be applicable for the transmission of the second UCI. The second UCI may correspond to the one or more CG occasions. For example, the wireless device may produce contents of the second UCI similar to the contents of the first UCI.

For example, the one or more CG occasions may comprise the at least one CG occasion of the first CG configuration. The one or more CG occasions may comprise at least one CG occasion of the second CG configuration. For example, the third indication may be for informing the base station regarding the pending UL data. The third indication may be an SR. The SR may correspond to the one or more LOGICAL CHANNELS and/or the one or more PDU sets and/or the one or more PDUs.

The base station may send (e.g., transmit) a fourth indication for activating/recycling/adding the one or more CG occasions (e.g., via DCI or a MAC CE or an RRC message, e.g., RRC reconfiguration message), for example, based on receiving the third indication from the wireless device. The base station may send (e.g., transmit) the fourth indication, for example, after a decoding delay/latency (e.g., a fourth offset). The fourth offset may correspond to decoding of the second UCI or the third indication. For example, the fourth offset may be 4 ms or any other duration. The fourth offset may correspond to an activation delay and/or a recycling delay and/or the like. The fourth indication may be an acknowledgment (ACK) corresponding/associated with the third indication. The wireless device may activate the third CG configuration, for example, based on (e.g., in response to) the fourth indication indicating a third CG configuration (e.g., configured by the one or more CG configuration parameters). The wireless device may reinitialize suspended CG occasions (e.g., the at least one CG occasion) of the first CG configuration, for example, based on (e.g., in response to) the fourth indication. For example, the base station may indicate (e.g., via sending (e.g., transmitting) the fourth indication to the wireless device) that the at least one CG occasion of the first CG configuration is available/usable for the wireless device (e.g., during the CG period and/or for CG periods after the reception of the fourth indication). For example, the wireless device may consider the at least one CG occasion of the first CG configuration (and/or the one or more CG occasions) being available/usable for a period of time (e.g., the first unused window/duration and/or a first used window/duration), for example, based on receiving the fourth indication. The DCI may be a group-common DCI. For example, the DCI may be a DCI dedicated to the wireless device (e.g., with a CRC scrambled by the CS-RNTI or C-RNTI). The base station may receive the UL data and/or UCI via/using the one or more CG occasions.

The wireless device may resend (e.g., retransmit) the third indication, for example, based on (e.g., in response to) not receiving the fourth indication. For example, the wireless device may send (e.g., transmit) the BSR MAC CE (e.g., an enhanced BSR MAC CE). For example, the wireless device may send (e.g., transmit) a MAC CE comprising the remaining time/delay budget information (e.g., PSDB) of one or more PDU sets of the UL data. In some examples, the wireless device may (re)send (e.g., (re)transmit) the SR or trigger a new SR.

The wireless device may activate/increase/add/use the one or more CG occasions, for example, based on receiving the fourth indication. The wireless device may consider the one or more CG occasions being available for PUSCH transmissions with configured grants (e.g., for transmission of the UL data). The wireless device may, for example, after a third offset, consider the one or more CG occasions being available for PUSCH transmissions with configured grants. The third offset may be based on the fourth offset. For example, the third offset may be obtained/determined similar to the first offset (e.g., the third offset is the first offset) and/or the second offset (e.g., the third offset is the second offset). For example, the third offset may be $N_2$ symbols. For example, the third offset may depend on the processing capability of the wireless device (e.g., preparation time of PUSCH/PDSCH/HARQ-ACK, e.g., $T_{proc2}/T_{proc1}$).

As shown in step 2104 of FIG. 21, the wireless device may receive a second indication from the base station. The wireless device may receive the second indication within/during a first CG period of the first CG configuration.

The second indication may be based on (e.g., in response to) the transmission of the first indication. The wireless device may expect receiving the second indication, for example, after the sending (e.g., transmitting) the first indication. One or more configuration parameters may configure the wireless device (e.g., via configuring/enabling a parameter) to expect/enable receiving the second indication, for example, after the sending (e.g., transmitting) the first indication.

The wireless device may ignore the first indication, for example, based on (e.g., in response to) the parameter being enabled/configured and not receiving the second indication after the transmission of the first indication. The wireless device may consider the at least one CG occasion of the first CG configuration being available CG-PUSCH transmissions. The wireless device may consider the at least one CG occasion of the first CG configuration not being available/allowable for CG-PUSCH transmissions, for example, based on (e.g., in response to) the parameter not being enabled/configured (or being disabled or being absent from the one or more configuration parameters) and not receiving the second indication after the transmission of the first indication.

The second indication may be a confirmation/acknowledgement corresponding to the first indication. For example, the second indication may comprise one bit indicating confirming the at least one CG occasion being unusable/recyclable, for example, if the one bit is equal to a first value (e.g., '0'). The one bit may refuse/ignore the at least one CG occasion being unusable/recyclable, for example, if the one bit is equal to a second value (e.g., '1').

The second indication may not be based on the first indication. For example, the base station may send (e.g., transmit) the second indication, without receiving the first indication. For example, the second indication may be based on (e.g., in response to) receiving a third indication from a second wireless device (e.g., the second wireless device requesting CG occasions).

The second indication may indicate a subset of CG occasions of the first CG configuration as unusable/recyclable. For example, the subset of the CG occasions may be the at least one CG occasion. The subset of the CG occasions may be different from the at least one CG occasion.

The wireless device may consider the at least one CG occasion not being available/allowable for PUSCH transmission with configured grant, for example, based on (e.g., in response to) the second indication indicating the at least one CG occasion being unusable/recyclable. For example, the wireless device may consider the at least one CG occasion not being available/allowable for PUSCH transmission with configured grant, for example, after the first offset (or the third offset) from a second occasion. The second occasion may correspond to a reception time/occasion of the second indication.

The second indication may comprise/indicate at least one configuration parameter of the first CG configuration. For example, at least one configuration parameter may be at least one of the following: frequency hopping (e.g., frequencyHopping); and/or DM-RS configuration (e.g., cg-DMRS-Configuration); and/or uci-OnPUSCH; and/or resourceAllocation; and/or repK; and/or mcs-Table; and/or the like. The wireless device may update the at least one configuration parameter of the first CG configuration, for example, based on (e.g., in response to) receiving the second indication comprising the at least one configuration parameter of the first CG configuration. For example, the wireless device may update MCS value of the first CG configuration based on the new value of the MCS indicated by the second indication, for example, if the second indication indicates a new value for MCS.

Examples may allow the wireless device to determine availability of CG occasions for transmission of UL data and/or UCI. Examples described herein may allow the wireless device to timely request activation/increment of the one or more CG occasions.

Figure 22:
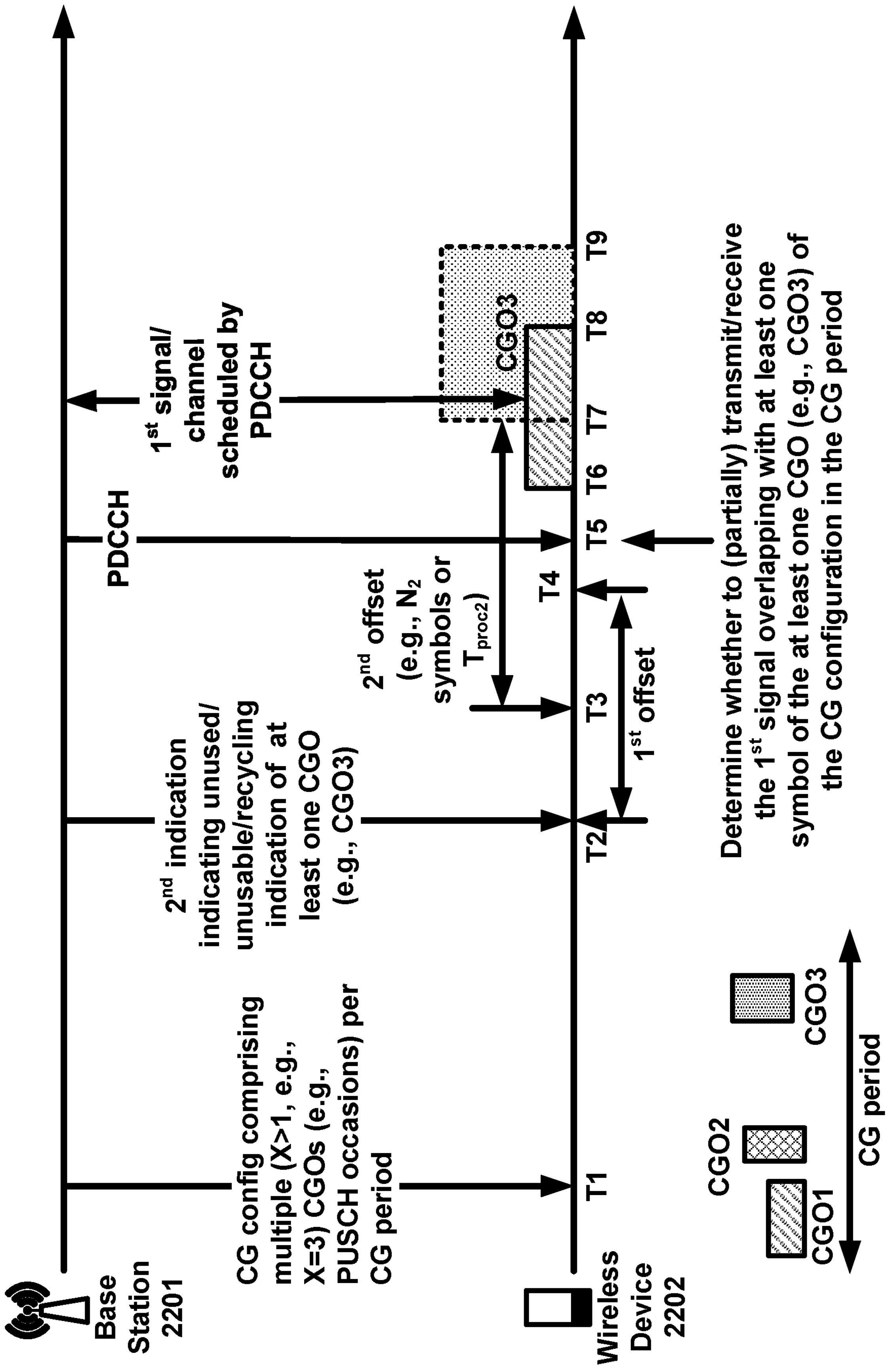
FIG. 22 shows an example of a CG configuration with multiple PUSCH occasions per CG period in wireless communications systems.

FIG. 22 shows an example of a CG configuration with multiple PUSCH occasions per CG period in wireless communications systems. For example, FIG. 22 may show examples of the method/procedure for communicating (e.g., sending (e.g., transmitting)/receiving) UL/DL signals/channels/messages at a wireless device 2202 (e.g., an XR device) and/or at a base station 2201. For example, FIG. 22 may show examples for determining whether the wireless device 2202 may communicate (receive/send (e.g., transmit)) UL/DL signals that are dynamically scheduled (e.g., via DCIs), for example, if transmission occasions of the UL/DL signals overlap (in time) with at least one PUSCH occasion of the multiple PUSCH occasions. For example, FIG. 22 may show examples for determining whether at least one PUSCH occasion of the multiple PUSCH occasions is available/allowable for UL transmission with configured grant. For example, the wireless device 2202 may be in an RRC inactive state/mode (e.g., an RRC_INACTIVE/IDLE state), and/or an RRC idle state/mode (e.g., an RRC_IDLE state), and/or an RRC connected state/mode (e.g., an RRC_CONNECTED state).

Similar to discussions herein with respect to FIG. 21, as shown in FIG. 22, a wireless device 2202 may receive, from a base station 2201, one or more configuration parameters (e.g., one or more RRC configuration parameters), for example, at time/occasion/interval T1. The one or more configuration parameters (e.g., the one or more RRC configuration parameters) may comprise one or more CG configuration parameters (e.g., ConfiguredGrantConfig). For example, the one or more CG configuration parameters may comprise a first CG configuration. As shown in FIG. 22, the first CG configuration may comprise multiple (e.g., X>1)

CG resources/occasions in at least one (e.g., each) CG periodicity/period of the first CG configuration.

As shown in FIG. 22, the wireless device 2202 may receive, from the base station 2201, a second indication, for example, within/during a first CG period of the first CG configuration. For example, the wireless device may receive the second indication at/on/during/in time/occasion T2. The wireless device may receive a first PDCCH (e.g., PDCCH in FIG. 22) from the base station, for example, after receiving the second indication from the base station. For example, the wireless device may receive the first PDCCH at/on/during/in time/occasion T5. For example, as shown in FIG. 22, the wireless device may determine that (e.g., a last/final/ending/latest symbol of) the first PDCCH is received within/in a second window, with the length of a fifth offset, from a second occasion. For example, the first PDCCH may be received before the fifth offset from the second indication. The first PDCCH may schedule communication of a first signal/channel/message, for example, on the serving cell, during a first communication interval (e.g., from time/occasion/symbol T6 to time/occasion/symbol T8 in FIG. 22). As shown in FIG. 22, the first communication interval may overlap in time domain with the at least one CGO (e.g., the CGO 3 in FIG. 22). For example, the fifth offset may be the first offset. For example, the second window may be the first window. For example, the fifth offset may be different from the first offset. For example, the base station may configure (e.g., via the one or more configuration parameters) the wireless device with the fifth offset. The fifth offset may be pre-defined (e.g., hardcoded) for the wireless device. Similar to discussions herein regarding determination of the first offset, the wireless device may determine the fifth offset, for example, based on UE processing capability (e.g., PUSCH preparation time for PUSCH timing capability 1 or 2, e.g., $T_{proc2}$, and/or $T_{proc1}$) and one or more subcarrier spacings (SCSs).

The second occasion may correspond to a reception time/occasion of the first indication (e.g., time/occasion/symbol T2 in FIG. 22) and/or at least one CG occasion. The second occasion may be a last/final/ending/latest symbol of a PDSCH/PDCCH resource/occasion used, by the wireless device, for receiving the second indication from the base station. A first occasion may be a first/starting/initial symbol of the first CG period. For example, the first occasion may be an occasion/time corresponding to the expiry of an application window/period. For example, the second occasion may be a gap/offset from the reception occasion/time of the second indication.

The wireless device 2202 may communicate (e.g., during the first communication interval) the first signal to the base station 2201, for example, based on (e.g., in response to) at least one DL rule being satisfied and/or at least one UL rule being satisfied. For example, as discussed in FIG. 18, the wireless device may send (e.g., transmit) the first PUSCH to the base station and/or receive the first PDSCH/CSI-RS from the base station. The wireless device may determine the at least one DL (and/or UL) rule being satisfied, for example, based on first PDCCH being received after the fifth offset from the second occasion. The wireless device may determine the at least one DL (and/or UL) rule being satisfied, for example, if the first PDCCH schedules/indicates the transmission of the first PUSCH. The wireless device may determine the at least one DL (and/or UL) rule being satisfied, for example, based on first PDCCH being received after the fifth offset from the second occasion. For example, the wireless device may determine a last/final/ending/latest symbol of the first PDCCH being after the fifth offset from the second occasion. The wireless device may determine a last/final/ending/latest symbol of a CORESET where the wireless device detects a first DCI format (or a first DCI) corresponding to the first PDCCH after the fifth offset from the second occasion.

The wireless device 2202 may refrain from communicating (e.g., not communicate or avoid/skip communicating) the first signal to the base station 2201, for example, based on (e.g., in response to) the at least one UL (and/or DL) rule not being satisfied. The wireless device may determine the at least one DL (and/or UL) rule not being satisfied, for example, based on first PDCCH being received within/in/during the fifth offset from the second occasion. For example, the wireless device may refrain from sending (e.g., transmitting) the first UL signal (e.g., the first PUSCH) during the first communication interval, for example, based on (e.g., in response to) the at least one UL rule not being satisfied. For example, the wireless device may avoid/skip (or refrain from) receiving the first DL signal during the first communication interval, for example, based on the at least one DL (and/or UL) rule not being satisfied.

Examples may allow a wireless device to resolve collision between dynamic UL/DL transmissions/receptions and the at least one CG occasion, for example, after the reception of the second indication. Examples may enhance alignment between the wireless device and a base station.

Figure 23:
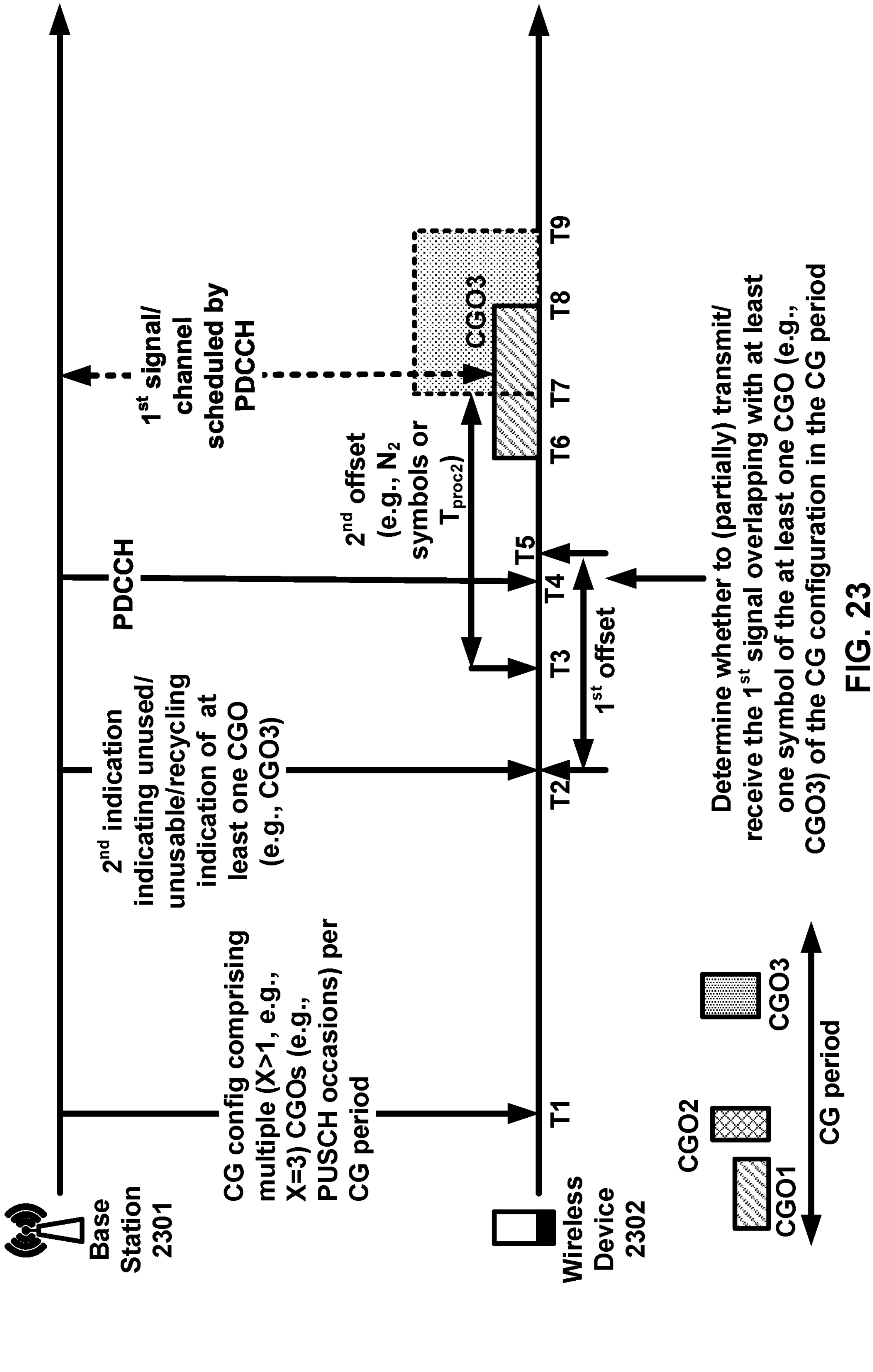
FIG. 23 shows an example of a CG configuration with multiple PUSCH occasions per CG period in wireless communications systems.

FIG. 23 shows an example of a CG configuration with multiple PUSCH occasions per CG period in wireless communications systems. For example, FIG. 23 may show examples of the method/procedure for communicating (e.g., sending (e.g., transmitting)/receiving) UL/DL signals/channels/messages at a wireless device 2302 (e.g., an XR device) and/or at a base station 2301. For example, FIG. 23 may show examples for determining whether the wireless device 2302 may communicate (receive/transmit) UL/DL signals that are dynamically scheduled (e.g., via DCIs), for example, if transmission occasions of the UL/DL signals overlap (in time) with at least one PUSCH occasion of multiple PUSCH occasions. For example, FIG. 23 may show examples for determining whether at least one PUSCH occasion of the multiple PUSCH occasions is available/allowable for UL transmission with configured grant. For example, the wireless device 2302 may be in an RRC inactive state/mode (e.g., an RRC_INACTIVE/IDLE state), and/or an RRC idle state/mode (e.g., an RRC_IDLE state), and/or an RRC connected state/mode (e.g., an RRC_CONNECTED state).

Similar to discussions herein with respect to FIG. 21 and FIG. 22, as shown in FIG. 23, the wireless device 2302 may receive, from the base station 2301, one or more configuration parameters (e.g., one or more RRC configuration parameters), for example, at time/occasion/interval T1. The one or more configuration parameters (e.g., the one or more RRC configuration parameters) may comprise one or more CG configuration parameters (e.g., ConfiguredGrantConfig). For example, the one or more CG configuration parameters may comprise a first CG configuration. As shown in FIG. 23, the first CG configuration may comprise the multiple (e.g., X>1) CG resources/occasions in at least one (e.g., each) CG periodicity/period of the first CG configuration.

As shown in FIG. 23, the wireless device 2302 may receive, from the base station 2301, a second indication, for example, at/on/during/in time/occasion T2. The wireless device may receive a first PDCCH (e.g., PDCCH in FIG. 23) from the base station, for example, at/on/during/in time/occasion T4, for example, after receiving the second indication from the base station. For example, as shown in FIG. 23, the wireless device may determine that (e.g., a last/final/ ending/latest symbol of) the first PDCCH is received within/in a second window, with the length of a fifth offset, from a second occasion. For example, the first PDCCH may be received before the fifth offset from the second indication. The first PDCCH may schedule communication of a first signal/channel/message, for example, on the serving cell, during a first communication interval (e.g., from time/occasion/symbol T6 to time/occasion/symbol T8 in FIG. 23). As shown in FIG. 23, the first communication interval may overlap in time domain with at least one CGO (e.g., the CGO 3 in FIG. 23).

The wireless device 2302 may refrain from communicating (e.g., not communicate or avoid/skip communicating) the first signal to the base station 2301, for example, based on (e.g., in response to) at least one UL (and/or DL) rule not being satisfied. The wireless device may determine the at least one DL (and/or UL) rule not being satisfied, for example, based on first PDCCH being received within/in/during the third offset from the second occasion. The wireless device may refrain from sending (e.g., transmitting) the first UL signal (e.g., a first PUSCH) during the first communication interval, for example, based on (e.g., in response to) the at least one UL rule not being satisfied. As shown in FIG. 23, the last/final/ending/latest symbol of the first PDCCH may be within a second offset from a starting/first/initial symbol of the CGO3 (e.g., at least one CG occasion). The wireless device may send (e.g., transmit) the first UL signal (e.g., the first PUSCH) during the first communication interval, for example, based on (e.g., in response to) the at least one UL rule not being satisfied. For example, the starting/first/initial symbol of the CGO3 (e.g., the at least one CG occasion) may be after the second offset from the last/final/ending/latest symbol of the first PDCCH.

The wireless device 2302 may avoid/skip (or refrain from) receiving the first DL signal during the first communication interval, for example, based on the at least one DL (and/or UL) rule not being satisfied. For example, for operation on a single carrier in unpaired spectrum, the wireless device may not expect (or consider an error) to receive (or may not receive) the first DL signal/channel or may not expect to cancel/may not cancel a PUSCH transmission corresponding to the at least one CG occasion, in the first set of symbols (e.g., in a slot) of the first communication interval, for example, based on a first/starting/earliest/initial symbol in the first set of symbols occurring within/during the second offset (e.g., $T_{proc,2}$) relative to the last/final/ending/latest symbol of the first PDCCH (or a last/final/ending/latest symbol of a CORESET where the wireless device detects the first DCI format). The wireless device may receive the first DL signal/message/channel (or may cancel a PUSCH transmission corresponding to the at least one CG occasion, or an actual repetition of the PUSCH) in the first set of symbols (or the first transmission interval), for example, based on a first/starting/earliest/initial symbol in the first set of symbols occurring after the second offset (e.g., $T_{proc,2}$) relative to the last/final/ending/latest symbol of the first PDCCH (or a last/final/ending/latest symbol of a CORESET where the wireless device detects the first DCI format). For example, a UE-capability message may not comprise/indicate a capability of partial cancelation (e.g., partialCancellation).

Examples may allow a wireless device to resolve collision between dynamic UL/DL transmissions/receptions and the at least one CG occasion, for example, after the transmission of the first indication. Examples may enhance alignment between the wireless device and a base station.

Figure 24:
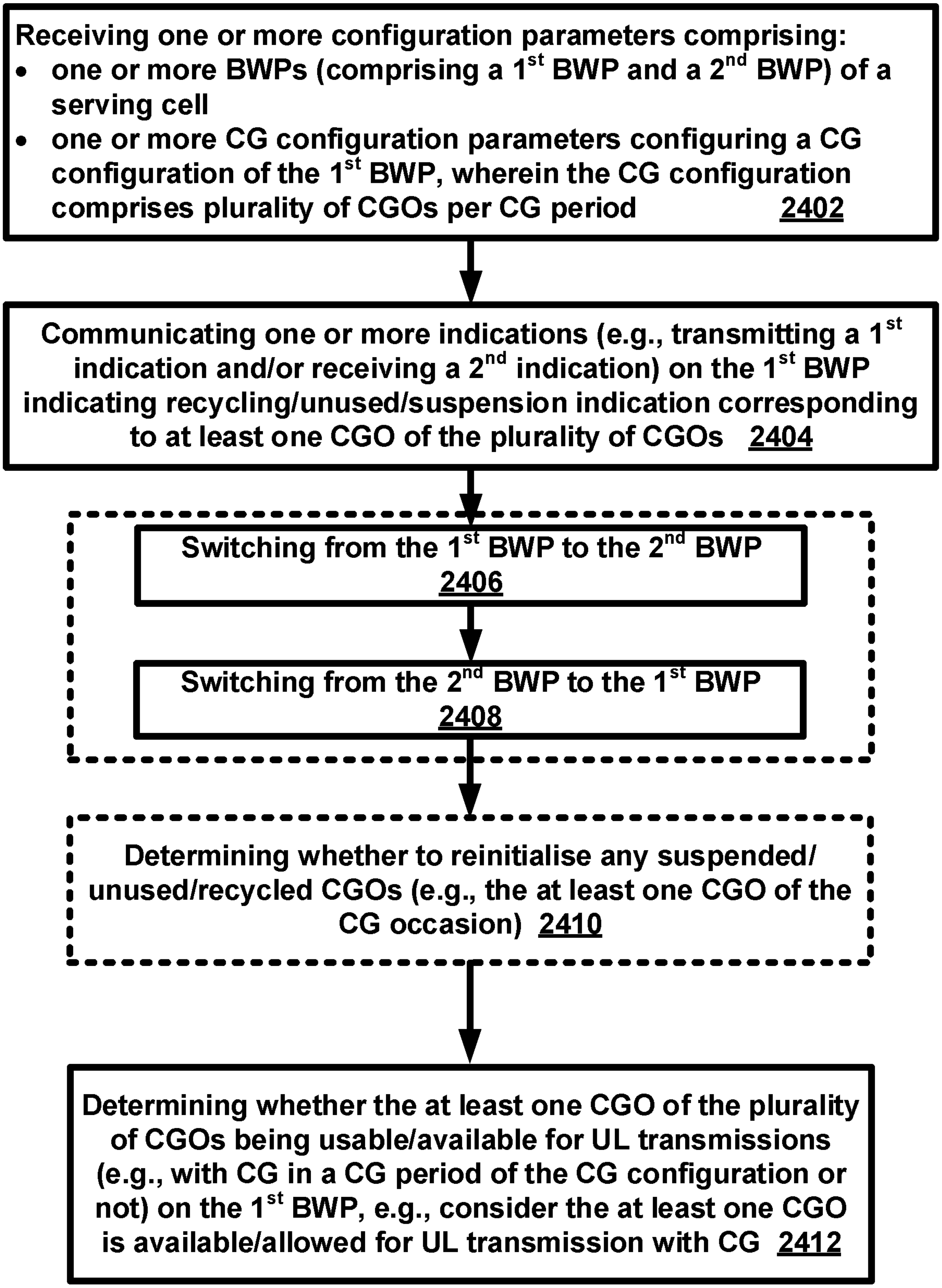
FIG. 24 shows an example method/procedure for UL/DL transmissions in wireless communications systems.

FIG. 24 shows an example method/procedure for UL/DL transmissions in wireless communications systems. For example, the method/procedure of the FIG. 24 may be based on using a CG configuration with multiple PUSCH occasions per CG period. For example, FIG. 24 may show examples of the method/procedure BWP operation at a wireless device (e.g., an XR device) and/or at a base station. For example, FIG. 24 may show examples for determining whether the wireless device may send (e.g., transmit) UL data using at least one PUSCH occasion of multiple PUSCH occasions. For example, the wireless device may be in an RRC inactive state/mode (e.g., an RRC_INACTIVE/IDLE state), and/or an RRC idle state/mode (e.g., an RRC_IDLE state), and/or an RRC connected state/mode (e.g., an RRC_CONNECTED state).

Similar to discussions herein with respect to FIGS. 18-23, as shown in step 2402 of FIG. 24, the wireless device may receive, from the base station, one or more configuration parameters (e.g., one or more RRC configuration parameters). The one or more configuration parameters (e.g., one or more RRC configuration parameters) may comprise one or more CG configuration parameters (e.g., ConfiguredGrantConfig). For example, the one or more CG configuration parameters may comprise/configure a first CG configuration. The first CG configuration may comprise multiple (e.g., X>1) CG resources/occasions in at least one (e.g., each) CG periodicity/period of the first CG configuration.

The one or more configuration parameters may configure/indicate one or more BWPs (e.g., one or more DL BWPs and/or one or more UL BWPs). The one or more BWPs may be used by the wireless device to communicate with the base station on one or more cells (e.g., one or more serving cells). The one or more BWPs may comprise at least one BWP. A first BWP of the at least one BWP may comprise the first CG configuration. For example, the one or more CG configurations may configure the first CG configuration for at least one BWP. The at least one BWP may comprise a first UL/DL BWP.

As shown in step 2404 of FIG. 24, the wireless device may communicate one or more indications with the base station. For example, the wireless device may send (e.g., transmit) a first indication (e.g., recycling/unused/suspension indication corresponding to at least one CGO of the first CG configuration) of the one or more indications to the base station on the first BWP of the serving cell. For example, the wireless device may receive a second indication (e.g., recycling/unused/suspension indication corresponding to at least one CGO of the first CG configuration) of the one or more indications from the base station. The wireless device may communicate the one or more indications with the base station on the first BWP of the one or more BWPs.

The wireless device may determine the first indication being sent (e.g., transmitted) on a first (UL) BWP (e.g., of the serving cell) of the one or more BWPs. The first BWP may be an initial BWP and/or a dedicated BWP and/or a default BWP. In another example, the wireless device may receive the second indication via a first (DL) BWP (e.g., of the serving cell) of the one or more BWPs. For example, for unpaired operation (e.g., TDD), the first DL BWP may be (or be associated with, e.g., by a BWP id/index) the first UL BWP. In paired operation (e.g., FDD), the first DL BWP may correspond to (or may be linked to, e.g., by a BWP id/index) the first UL BWP.

As shown in step 2406 of FIG. 24, the wireless device may (e.g., automatically) switch the first BWP to a second BWP of the one or more BWPs. For example, the wireless device may (e.g., automatically) switch the first UL BWP to a second UL BWP of the one or more BWPs, for example, if the wireless device switches the first DL BWP to a second DL BWP of the one or more BWPs (e.g., due to an expiry of BWP inactivity timer and/or receiving DCI indicating the BWP switching). For example, the wireless device may (automatically) switch the first DL BWP to the second DL BWP, for example, if the wireless device switches the first UL BWP to the second UL BWP (e.g., due to an expiry of BWP inactivity timer and/or receiving DCI indicating BWP switching).

The wireless device may determine at least one UL/DL rule being satisfied, for example, based on the first BWP not being switched (e.g., the first BWP being an active BWP), for example, after the transmission of the first indication and/or reception of the second indication. The wireless device may determine the BWP not being switching, for example, prior to a first unused duration. The wireless device may determine a BWP inactivity timer not being expired. For example, the first (DL) BWP and/or the second (DL) BWP may not be a dormant BWP.

As shown in step 2406 and step 2408 of FIG. 24, the wireless device may switch from the first BWP to the second BWP of the one or more BWPs (e.g., due to an expiry of BWP inactivity timer and/or receiving DCI indicating BWP switching), for example, after the transmission of the first indication and/or the reception of the second indication. The wireless device may further switch from the second BWP to the first BWP (e.g., due to an expiry of BWP inactivity timer and/or receiving DCI indicating BWP switching). The wireless device may determine the at least one UL/DL rule not being satisfied, for example, after the wireless device switches from the second BWP to the first BWP. For example, the wireless device may determine the at least one BWP not comprising the second BWP (e.g., corresponding to the second DL BWP). For example, the second BWP may not comprise the first CG configuration. For example, the wireless device may determine that switching to the second BWP from the first BWP is occurred during the first unused duration. The wireless device may determine switching to the first BWP from the second BWP is occurred during the first unused duration. The wireless device may determine switching to the first BWP from the second BWP is occurred after an expiry of the first unused duration.

As shown in step 2410 of FIG. 24, the wireless device may determine whether to (re-)initialize any suspended/unused/recycled CGOs. The wireless device may (re-)initialize the at least one CG occasion of the first CG configuration (e.g., any suspended configured uplink grants of configured grant Type 1/2) on the first BWP, for example, according to the first CG configuration, for example, based on (e.g., in response to) switching from the second BWP to the first BWP. The wireless device may consider the at least one CG occasion of the first CG configuration not being suspended/deactivated/unused for UL transmission with configured grant on the first BWP, for example, after switching to the first BWP from the second BWP. For example, the one or more configuration parameters may configure/enable (e.g., by configuring/indicating/enabling a configured parameter) the wireless device to (re-)initialize the at least one CG occasion of the first CG configuration, for example, after switching to the first BWP from the second BWP.

The wireless device may determine the at least one UL/DL rule being satisfied, for example, after/in response to the wireless device switching from the second BWP to the first BWP. The wireless device may determine that switching to the first BWP from the second BWP is occurred during the first unused duration. The wireless device may determine the configured parameter (of the one or more configuration parameters) not being configured or being disabled. The wireless device may avoid/skip (re-)initializing the at least one CG occasion of the first CG configuration (e.g., any suspended configured uplink grants of configured grant Type 1/2) on the first BWP, for example, according to the first CG configuration, for example, based on (e.g., in response to) switching from the second BWP to the first BWP. As shown in step 2412 of FIG. 24, the wireless device may consider the at least one CG occasion (e.g., of the first CG configuration) not being suspended/deactivated/unused (or being usable/available/allowed) for UL transmission with configured grant on the first BWP, for example, after switching to the second BWP from the first BWP.

Examples may allow the wireless device to determine whether the at least one CG occasion of the first CG configuration is suspended/recycled or not, for example, after switching BWP after the transmission of the first indication and/or reception of the second indication. Examples may improve alignment between the wireless device and the base station.

Figure 25:
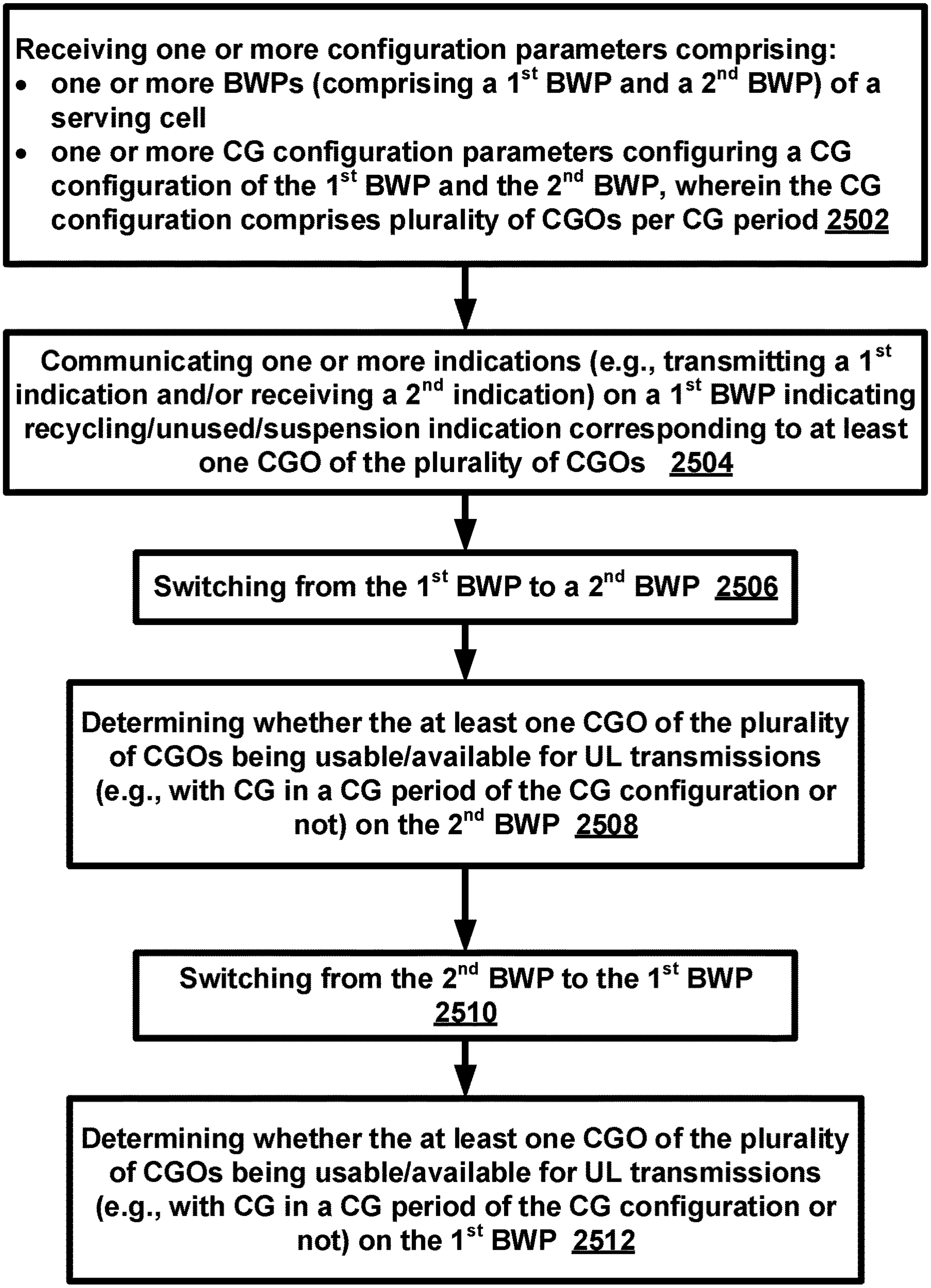
FIG. 25 shows an example method/procedure for UL/DL transmissions in wireless communications systems.

FIG. 25 shows an example method/procedure for UL/DL transmissions in wireless communications systems. For example, the method/procedure of the FIG. 25 may be based on using a CG configuration with multiple PUSCH occasions per CG period. For example, FIG. 25 may show examples of the method/procedure BWP operation at a wireless device (e.g., an XR device) and/or at a base station. For example, FIG. 25 may show examples for determining whether the wireless device may send (e.g., transmit) UL data using at least one PUSCH occasion of multiple PUSCH occasions. For example, the wireless device may be in an RRC inactive state/mode (e.g., an RRC_INACTIVE/IDLE state), and/or an RRC idle state/mode (e.g., an RRC_IDLE state), and/or an RRC connected state/mode (e.g., an RRC_CONNECTED state).

Similar to discussions herein with respect to FIG. 24, as shown in step 2502 of FIG. 25, the wireless device may receive, from the base station, one or more configuration parameters (e.g., one or more RRC configuration parameters). The one or more configuration parameters (e.g., one or more RRC configuration parameters) may comprise one or more CG configuration parameters (e.g., ConfiguredGrantConfig). For example, the one or more CG configuration parameters may comprise/configure a first CG configuration. The first CG configuration may comprise multiple (e.g., X>1) CG resources/occasions in at least one (e.g., each) CG periodicity/period of the first CG configuration. The one or more configuration parameters may configure/indicate one or more BWPs (e.g., one or more DL BWPs and/or one or more UL BWPs). A first BWP of the at least one BWP and a second BWP of the at least one BWP may comprise the first CG configuration.

As shown in step 2504 of FIG. 25 and similar to discussion of FIG. 24, the wireless device may communicate one or more indications with the base station via/on the first BWP. The communication of one or more indications may comprise sending (e.g., transmitting) a first indication, and/or receiving a second indication. The one or more indications may indicate recycling/unused/suspension indication corresponding to at least one CGO of the multiple CGOs.

As shown in step 2506 of FIG. 25, the wireless device may switch from the first BWP to the second BWP (e.g., due to an expiry of BWP inactivity timer and/or receiving DCI indicating BWP switching), for example, after the transmission of the first indication and/or the reception of the second indication. For example, the wireless device may determine at least one UL/DL rule not being satisfied, for example, after the wireless device switches from the first BWP to the second BWP. For example, the wireless device may determine that switching to the second BWP from the first BWP is occurred during a first unused duration. The wireless device may determine that switching from the first BWP to the second BWP is occurred during the first unused duration. The wireless device may determine that switching the first BWP to the second BWP is occurred, for example, after an expiry of the first unused duration. The wireless device may (re-)initialize the at least one CG occasion of the first CG configuration (e.g., any suspended configured uplink grants of configured grant Type 1/2) on the first BWP, for example, according to the first CG configuration, for example, based on (e.g., in response to) switching the first BWP to the second BWP. As shown in step 2508 of FIG. 25, the wireless device may determine whether the at least one CG occasion of the multiple CG occasions being usable/available for UL transmissions (e.g., with CG in a CG period of the CG configuration or not) on the second BWP. The wireless device may consider the at least one CG occasion of the first CG configuration not being suspended/deactivated/unused for UL transmission with configured grant on the second BWP, for example, after switching to the second BWP from the first BWP. For example, the one or more configuration parameters may configure/enable (e.g., by configuring/indicating/enabling a configured parameter) the wireless device to (re-)initialize the at least one CG occasion of the first CG configuration after switching from the first BWP to the second BWP.

The wireless device may determine at least one UL/DL rule being satisfied, for example, based on (e.g., after or in response to) the wireless device switching from the first BWP to the second BWP. The wireless device may determine that switching from the first BWP to the second BWP is occurred during the first unused duration. The wireless device may determine the configured parameter (of the one or more configuration parameters) not being configured or being disabled. The wireless device may avoid/skip (re-) initializing the at least one CG occasion of the first CG configuration (e.g., any suspended configured uplink grants of configured grant Type 1/2) on the second BWP, for example, according to the first CG configuration, for example, based on (e.g., in response to) switching from the second BWP to the first BWP. The wireless device may consider the at least one CG occasion of the first CG configuration not being suspended/deactivated/unused for UL transmission with configured grant on the second BWP, for example, after switching from the first BWP to the second BWP.

As shown in step 2510 of FIG. 25, the wireless device may further switch from the second BWP to the first BWP (e.g., due to an expiry of BWP inactivity timer and/or receiving DCI indicating BWP switching). For example, the at least one CG occasion of the first CG configuration may be suspended/deactivated/unused for UL transmission with configured grant on the second BWP. Alternatively, the at least one CG occasion of the first CG configuration may not be suspended/deactivated/unused for UL transmission with configured grant on the second BWP.

The wireless device may determine the at least one UL/DL rule not being satisfied, for example, after the wireless device switches from the second BWP to the first BWP. For example, the wireless device may determine that switching to the first BWP from the second BWP is occurred during the first unused duration. The wireless device may determine that switching to the first BWP from the second BWP is occurred during the first unused duration. The wireless device may determine that switching to the first BWP from the second BWP is occurred after an expiry of the first unused duration. The wireless device may (re-)initialize the at least one CG occasion of the first CG configuration (e.g., any suspended configured uplink grants of configured grant Type 1/2) on the first BWP, for example, according to the first CG configuration, for example, based on (e.g., in response to) switching from the second BWP to the first BWP. As shown in step 2512 of FIG. 25, the wireless device may determine whether the at least one CG occasion of the multiple CG occasions being usable/available for UL transmissions (e.g., with CG in a CG period of the CG configuration or not) on the first BWP. The wireless device may consider the at least one CG occasion of the first CG configuration not being suspended/deactivated/unused for UL transmission with configured grant on the first BWP, for example, after switching to the second BWP from the first BWP. For example, the one or more configuration parameters may configure/enable (e.g., by configuring/indicating/enabling a configured parameter) the wireless device to (re-)initialize the at least one CG occasion of the first CG configuration, for example, after switching to the first BWP from the second BWP.

The wireless device may determine the at least one UL/DL rule being satisfied, for example, based on (e.g., after or in response to) the wireless device switching from the second BWP to the first BWP. The wireless device may determine that switching to the first BWP from the second BWP is occurred during the first unused duration. The wireless device may determine that switching to the first BWP from the second BWP is occurred after an expiry of the first unused duration. The wireless device may determine the configured parameter (of the one or more configuration parameters) not being configured or being disabled. The wireless device may avoid/skip (re-)initializing the at least one CG occasion of the first CG configuration (e.g., any suspended configured uplink grants of configured grant Type 1/2) on the first BWP, for example, according to the first CG configuration, for example, based on (e.g., in response to) switching from the second BWP to the first BWP. The wireless device may consider the at least one CG occasion of the first CG configuration not being suspended/deactivated/unused for UL transmission with configured grant on the first BWP, for example, after switching to the second BWP from the first BWP.

Examples may allow the wireless device to determine whether the at least one CG occasion of the first CG configuration is suspended/recycled or not, for example, after switching BWP after the transmission of the first indication and/or reception of the second indication. Examples may improve alignment between the wireless device and the base station.

Figure 26:
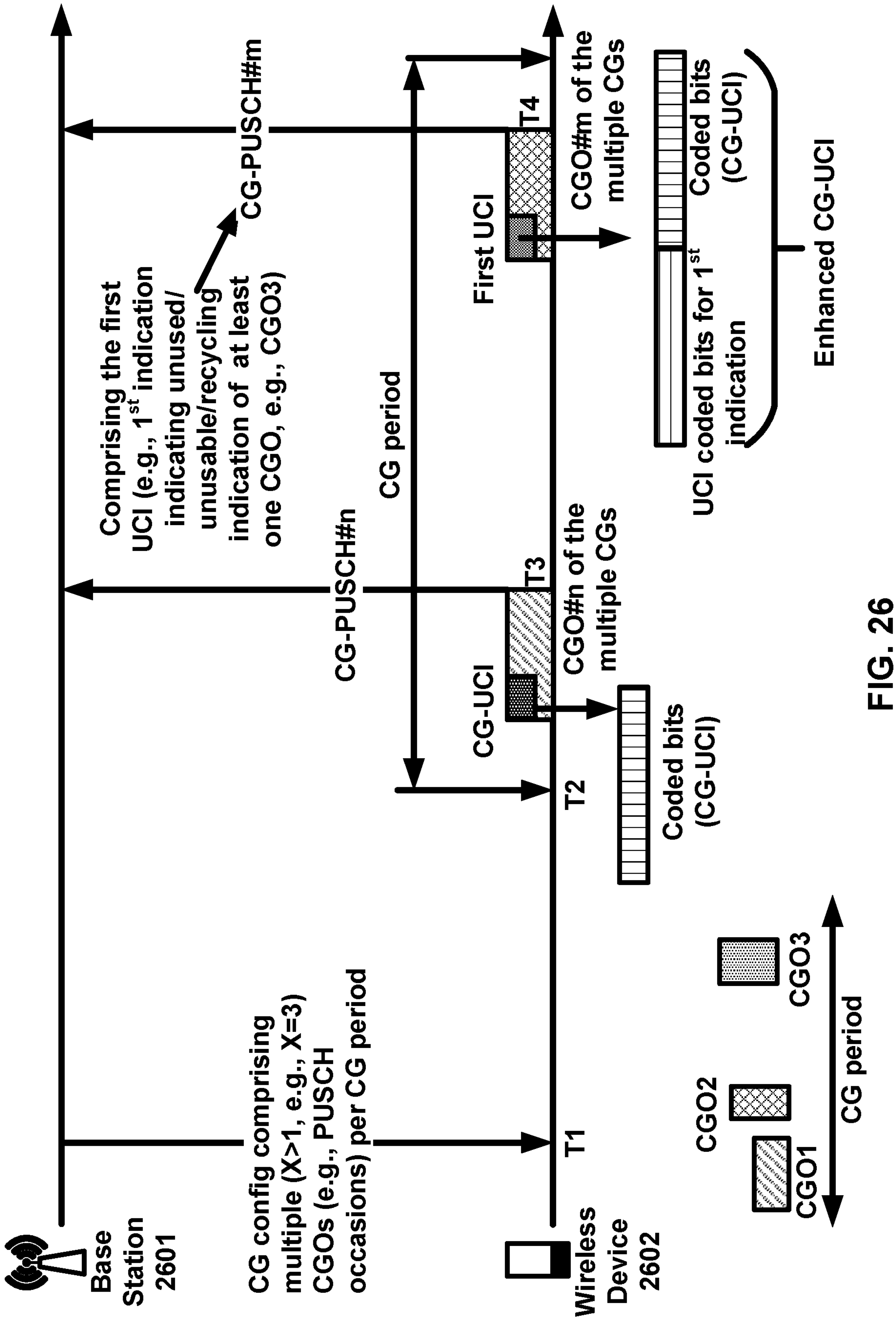
FIG. 26 shows an example of a CG configuration with multiple PUSCH occasions per CG period in wireless communications systems.

FIG. 26 shows an example of a CG configuration with multiple PUSCH occasions per CG period in wireless communications systems. For example, FIG. 26 may show examples of the method/procedure for sending (e.g., transmitting) a first indication by a wireless device 2602 to inform a base station 2601 that at least one PUSCH occasion of a CG configuration is unused/unusable/recyclable/suspend-able. For example, FIG. 26 may show examples of the method/procedure for sending (e.g., transmitting) a third indication by the wireless device 2602 to request from the base station 2601 one or more CGOs of a first CG configuration. For example, FIG. 26 may show examples for multiplexing the first indication (and/or the third indication)

with a CG-PUSCH transmission occasion/resource of a CG configuration. For example, the wireless device 2602 may be in an RRC inactive state/mode (e.g., an RRC_INACTIVE/IDLE state), and/or an RRC idle state/mode (e.g., an RRC_IDLE state), and/or an RRC connected state/mode (e.g., an RRC_CONNECTED state).

As shown in FIG. 26, the wireless device 2602 may receive, from the base station 2601, one or more configuration parameters (e.g., one or more RRC configuration parameters), for example, at time/occasion/interval T1. The one or more configuration parameters (e.g., the one or more RRC configuration parameters) may comprise one or more CG configuration parameters (e.g., ConfiguredGrantConfig).

For example, as shown in FIG. 26, a first UCI may be different from a CG-UCI. For example, the wireless device 2602 may send (e.g., transmit) via a CG-PUSCH #n (e.g., corresponding to a CGO #n of a CG configuration of the at least one CG configuration) the CG-UCI, for example, at time/occasion/interval T3. The wireless device may send (e.g., transmit) via a CG-PUSCH #m (e.g., corresponding to a CGO #m of a CG configuration of the at least one CG configuration) the first indication (e.g., the first UCI), for example, at time/occasion/interval T4. For example, the CGO #n and CGO #m may belong to the same CG configuration (e.g., the first CG configuration). In other examples, the CGO #n and CGO #m may belong to different CG configuration.

As shown in FIG. 26, the wireless device 2602 may prepare/determine the first UCI, for example, based on an enhanced/new/release-18 CG-UCI (e.g., for the base station 2601 to distinguish the enhanced CG-UCI from the legacy release-16/17 CG-UCI sent (e.g., transmitted) via the CGO #n). The CG-UCI may comprise at least one of the following: NDI field (e.g., corresponding to the CGO #n); and/or RV field (e.g., corresponding to the CGO #n); and/or HARQ number field (e.g., corresponding to the CGO #n); and/or COT sharing field.

An enhanced CG-UCI may comprise at least one of the following: NDI field (e.g., corresponding to the CGO #m); and/or RV field (e.g., corresponding to the CGO #m); and/or HARQ number field (e.g., corresponding to the CGO #m); and/or COT sharing field; and/or one or more fields corresponding to the first indication (e.g., for indicating the at least one CG occasion of the first CG configuration). For example, the one or more fields may indicate HARQ process numbers corresponding to the at least one CG occasion. The one or more fields may indicate indexes/numbers corresponding to the at least one CG occasion.

The enhanced CG-UCI field may not comprise at least one of the following: the NDI field (e.g., corresponding to the CGO #m); and/or the RV field (e.g., corresponding to the CGO #m); and/or the HARQ number field (e.g., corresponding to the CGO #m); and/or COT sharing field. The enhanced CG-UCI field may comprise at least one of the following: the NDI field (e.g., corresponding to the CGO #m); and/or the RV field (e.g., corresponding to the CGO #m); and/or the HARQ number field (e.g., corresponding to the CGO #m); and/or COT sharing field. The wireless device/base station may reinterpret one or more fields (e.g., the NDI field; and/or the RV field; and/or the HARQ number field; and/or COT sharing field) to determine information indicated by the first indication (or the enhanced CG-UCI).

The wireless device 2602 and/or the base station 2601 may determine whether a UCI is a CG-UCI or an enhanced CG-UCI. For example, the wireless device may scramble the CG-UCI with a second CRC and the enhanced CG-UCI by a first CRC. The wireless device may use a first DM-RS pattern/sequence number/DMRS ports (of DM-RS associated with the CG-PUSCH) for transmission of the enhanced CG-UCI and may use a second DM-RS pattern/sequence number/DMRS ports (of DM-RS associated with the CG-PUSCH) for transmission of the CG-UCI. The base station may determine whether the CG-UCI comprises the first indication or not, for example, based on the CRC of the UCI and/or DM-RS pattern/sequence number/DMRS ports of the UCI received on the CG-PUSCH. For example, the UCI may be the CG-UCI or the enhanced CG-UCI (e.g., whether the UCI comprises the first indication). For example, the base station may reinterpret one or more fields of the enhanced CG-UCI (e.g., NDI filed, and/or RV filed, and/or HARQ number filed, and/or COT sharing filed).

The base station 2601 may determine the CG-UCI not comprising the first indication (e.g., information regarding unused/recyclable CG occasions), for example, based on (e.g., in response to) the CG-UCI being scrambled with the first CRC (or being scrambled by a second CRC) or the first DM-RS pattern/sequence number/port not being used for transmission of the DM-RS associated with the CG-PUSCH. For example, the CG-UCI may comprise legacy UCI information, e.g., HARQ information, RV, NDI, and the COT sharing).

The wireless device 2602 may determine whether the CG-UCI is present or not, for example, if the first UCI is present for transmission on the CG-PUSCH (e.g., with UL-SCH, e.g., CGO #m), as shown in FIG. 26. The wireless device may combine the first UCI with the CG-UCI and consider the combination of the first UCI and the CG-UCI as the enhanced CG-UCI, for example, if the CG-UCI is present/available/exist. The wireless device may combine the first UCI with the CG-UCI and consider the combination of the first UCI and the CG-UCI as the enhanced CG-UCI, for example, by concatenating the coded bits of the first UCI (e.g., the first indication) with coded bits of the CG-UCI. In the example of FIG. 26, the wireless device may start with coded bits of the first UCI to attach/concatenate/combine the coded bits of the CG-UCI. In some other examples, the wireless device may start with the coded bits of the CG-UCI and attach/concatenate/combine the coded bits of the enhanced CG-UCI.

The wireless device 2602 may concatenate the coded bits of the first UCI with coded bits of the CG-UCI, for example, if uci-MuxWithDiffPrio is configured. The wireless device 2602 may concatenate the coded bits of the first UCI with coded bits of the CG-UCI, for example, based on the first UCI and the CG-UCI being associated with similar/same priority index x (x=1 or 0). The wireless device may concatenate the coded bits of the first UCI with coded bits of the CG-UCI, for example, if uci-MuxWithDiffPrio is not configured. The wireless device may concatenate the coded bits of the first UCI with coded bits of the CG-UCI, for example, based on the first UCI and the CG-UCI being associated with different priority indexes.

The wireless device 2602 may not multiplex the first UCI with the CG-UCI, for example, based on determining the CG-UCI being available for transmission/multiplexing with a CG-PUSCH transmission. The wireless device may multiplex the first UCI with a CG-PUSCH transmission, for example, based on (e.g., in response to) no CG-UCI being available/present. For example, the wireless device 2602 may consider/determine the enhanced CG-UCI comprising the first UCI bits as a CG-UCI associated with priority index 1 or priority index 0. The base station may configure the wireless device for concatenating coded bits of the first UCI with the coded bits of the CG-UCI (e.g., via a configured parameter in the one or more CG configuration parameters).

Examples may allow multiplexing of the first UCI (e.g., corresponding to the first indication) into the CG-PUSCH transmission. Examples described herein may allow multiplexing of the first UCI and the CG-UCI (e.g., by determining the enhanced CG-UCI).

Figure 27:
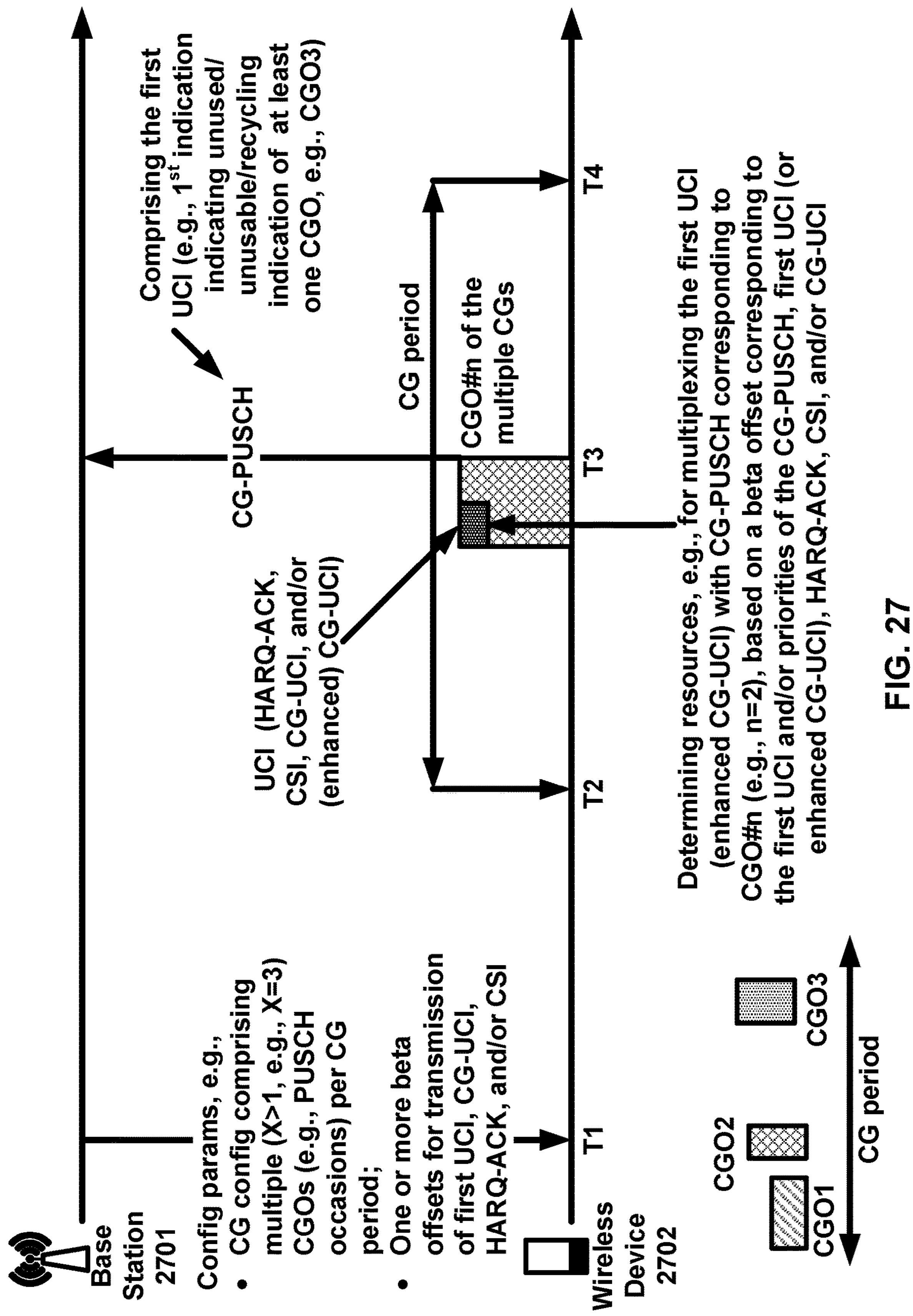
FIG. 27 shows an example of a CG configuration with multiple PUSCH occasions per CG period in wireless communications systems.

FIG. 27 shows an example of a CG configuration with multiple PUSCH occasions per CG period in wireless communications systems. For example, FIG. 27 may show examples of the method/procedure for sending (e.g., transmitting) a first indication by a wireless device 2702 to inform a base station 2701 that at least one PUSCH occasion of a CG configuration is unused/unusable/recyclable/suspend-able. For example, FIG. 27 may show examples of the method/procedure for sending (e.g., transmitting) a third indication by the wireless device 2702 to request from the base station 2701 one or more CGOs of a first CG configuration. For example, FIG. 27 may show examples for multiplexing the first indication (and/or the third indication) with a CG-PUSCH transmission occasion/resource of a CG configuration. For example, the wireless device 2702 may be in an RRC inactive state/mode (e.g., an RRC_INACTIVE/IDLE state), and/or an RRC idle state/mode (e.g., an RRC_IDLE state), and/or an RRC connected state/mode (e.g., an RRC_CONNECTED state).

As shown in FIG. 27, the wireless device 2702 may receive, from the base station 2701, one or more configuration parameters (e.g., one or more RRC configuration parameters), for example, at time/occasion/interval T1. The one or more configuration parameters (e.g., one or more RRC configuration parameters) may comprise one or more CG configuration parameters (e.g., ConfiguredGrant-Config).

For example, as shown in FIG. 27, the one or more configuration parameters may indicate one or more beta offsets. For example, the one or more configuration parameters may indicate/configure/define one or more values/indexes. The one or more values may comprise at least one of the following:

$$I_{offset}^{XX\text{-}UCI} \text{ or } I_{offset,0}^{HARQ\text{-}ACK} \text{ or } I_{offset,1}^{HARQ\text{-}ACK} \text{ or } I_{offset,2}^{HARQ\text{-}ACK} \text{ or } I_{offset}^{CG\text{-}UCI} \text{ or } I_{offset,0}^{HARQ\text{-}ACK,0} \text{ or } I_{offset,1}^{HARQ\text{-}ACK,0} \text{ or } I_{offset,2}^{HARQ\text{-}ACK,0} \text{ or } I_{offset,0}^{HARQ\text{-}ACK,1} \text{ or } I_{offset,1}^{HARQ\text{-}ACK,1} \text{ or } I_{offset,2}^{HARQ\text{-}ACK,1}.$$

The wireless device may obtain/determine the one or more beta offsets from the one or more values/indexes (e.g., via a predefined mapping table in 3GPP TS 38.213-release 17 Table 9.3.1).

The one or more beta offsets may comprise a first beta offset $$\beta_{offset}^{XX\text{-}UCI}$$

for transmission/multiplexing of the first indication (e.g., a first UCI) with/via/using a CG-PUSCH transmission (e.g., a PUSCH transmission occasion of the at least one CG configuration, e.g., the first CG configuration). For example, the wireless device may (e.g., via a predefined mapping) determine/obtain the first beta offset from a first index/value of the one or more values/indexes $$I_{offset}^{XX\text{-}UCI}.$$

For example, $$I_{offset}^{XX\text{-}UCI} \geq 21$$

(e.g., one or more reserved values in 3GPP TS 38.213-release 17 Table 9.3.1).

The one or more beta offsets may comprise a second beta offset $$\beta_{offset}^{CG\text{-}UCI}$$

(e.g., betaOffsetCG-UCI-r16) for transmission/multiplexing of a CG-UCI with/via/using the CG-PUSCH transmission. For example, the wireless device may (e.g., via a predefined mapping such as in 3GPP TS 38.213 Table 9.3.1) determine/obtain the second beta offset from a second index/value of the one or more values/indexes $$I_{offset}^{CG\text{-}UCI}.$$

For example, one or more beta offsets may comprise a set of beta offsets (e.g., BetaOffsets in the ConfiguredGrantConfig and/or BetaOffsetsCrossPri-r17) for transmission/multiplexing of HARQ-ACK (e.g., $$\beta_{offset}^{HARQ\text{-}ACK}$$

and/or $$\beta_{offset}^{HARQ\text{-}ACK,1}$$

and/or $$\beta_{offset}^{HARQ\text{-}ACK,0})$$

and/or CSI (e.g., $$\beta_{offset}^{CSI\text{-}1}$$

and/or $$\beta_{offset}^{CSI\text{-}2}).$$

with/via/using the CG-PUSCH transmission. For example, the wireless device may (e.g., via a predefined mapping in 3GPP TS 38.213 Table 9.3.1) determine the set of beta offsets of the one or more beta offsets from a set of indexes/values of the one or more values/indexes (e.g., $$I_{offset,0}^{HARQ\text{-}ACK} \text{ or } I_{offset,1}^{HARQ\text{-}ACK} \text{ or } I_{offset,2}^{HARQ\text{-}ACK} \text{ or } I_{offset,0}^{HARQ\text{-}ACK,0} \text{ or } I_{offset,1}^{HARQ\text{-}ACK,0} \text{ or } I_{offset,2}^{HARQ\text{-}ACK,0} \text{ or } I_{offset,0}^{HARQ\text{-}ACK,1} \text{ or } I_{offset,1}^{HARQ\text{-}ACK,1} \text{ or } I_{offset,2}^{HARQ\text{-}ACK,1}).$$

For example, the wireless device may determine a first beta offset (e.g., from the one or more configuration parameters, e.g., betaOffsetCG-UCI or the like). The first beta offset may be different from betaOffsetCG-UCI (e.g., the first beta offset may be determined from betaOffsetCG-UCI-r18) or (alternatively) may be the betaOffsetCG-UCI. For example, the wireless device may determine the first beta offset from the first index/value of the one or more values/indexes $$I_{offset}^{XX\text{-}UCI}$$

and/or the second index/value of the one or more values/indexes (e.g., $$I_{offset}^{CG\text{-}UCI}).$$

In one example, the first index $$I_{offset}^{XX\text{-}UCI}$$

may be different from the second index $$I_{offset}^{CG-UCI}.$$

In some other examples, the first index may be the same as the second index.

The wireless device 2702 may determine resources (e.g., in time/frequency and/or RBs and/or coded modulation symbols) for multiplexing the first UCI in the CG-PUSCH transmission occasion/resource, for example, via/based on the one or more beta offset values, as shown in FIG. 27. The wireless device may determine a number of resources for multiplexing/sending (e.g., transmitting) the first UCI in the CG-PUSCH. For example, the wireless device may determine a set of resource elements $$\Phi_1^{UCI},$$

for example, corresponding to an OFDM symbol l $$(l = 0, 1, 2, \ldots, N_{symbol,all}^{PUSCH} - 1)$$

and/or a subcarrier index k of the CG-PUSCH. The wireless device may determine a set of resource elements $$\Phi_1^{UCI},$$

for example, based on a set of resource elements of $$\Phi_1^{UL-SCH}$$

available for transmission of data in OFDM symbol l. The wireless device may determine a number of resources for multiplexing at least one HARQ-ACK information in the CG-PUSCH transmission occasion/resource and/or for multiplexing CSI reports in the CG-PUSCH transmission occasion/resource and/or for multiplexing CG-UCI in the CG-PUSCH transmission occasion/resource, for example, via/based on the one or more beta offset values. For example, the wireless device may determine a number of elements in UCI (e.g., comprising the first UCI, CG-UCI, HARQ-ACK, and/or the CSI). The wireless device may perform a rate matching, for example, to send (e.g., transmit) the CG-PUSCH transmission comprising the UCI (e.g., comprising the first UCI, CG-UCI, HARQ-ACK, and/or the CSI). The wireless device may perform a rate matching, for example, based on the coded modulation bits/symbols (e.g., coded bits).

The wireless device 2702 may determine the resources and/or the number of coded modulation symbols per layer of the CG-PUSCH transmission for the first UCI transmission, for example, based on at least one of the following: a number of the first UCI bits (and/or the CG-UCI/enhanced CG-UCI bits and/or the HARQ-ACK bits and/or the CSI bits); and/or a number of CRC bits (e.g., the first CRC and/or the second CRC) for the first UCI (and/or the CG-UCI/enhanced CG-UCI bits and/or the HARQ-ACK bits and/or the CSI bits); and/or the one or more beta offsets (e.g., the first beta offset and/or the second beta offset); and/or a number of code blocks for UL-SCH of the CG-PUSCH transmission; and/or a code block size for UL-SCH of the CG-PUSCH transmission; and/or number of subcarriers corresponding to the CG-PUSCH transmission (e.g., scheduled band width of the CG-PUSCH transmission); and/or a number of subcarriers in OFDM symbol l (e.g., that carries PTRS) in the CG-PUSCH transmission; and/or a number of resource elements for carrying the first UCI (and/or the CG-UCI/enhanced CG-UCI and/or the HARQ-ACK and/or the CSI or the like) in OFDM symbol l, for $$l = 0, 1, 2, \ldots, N_{symb,all}^{PUSCH} - 1,$$

in the PUSCH transmission and $$N_{symb,all}^{PUSCH}$$

is the total number of OFDM symbols of the PUSCH, including all OFDM symbols used for DM-RS.

The wireless device 2702 may determine that numberOfSlotsTBoMS is not present in the resource allocation table of the first CG configuration, for example, for determining the resources and/or the number of coded modulation symbols. The wireless device may determine that the numberOfSlotsTBoMS is present in the resource allocation table of the first CG configuration and that the value of numberOfSlotsTBoMS in the row indicated by the Time domain resource assignment field in DCI (e.g., for activating the first CG configuration) is equal to 1, for example, for determining the resources and/or the number of coded modulation symbols. The wireless device may determine that the numberOfSlotsTBoMS is present in the resource allocation table of the first CG configuration and that the value of numberOfSlotsTBoMS in the row indicated by the Time domain resource assignment field in DCI (e.g., for activating the first CG configuration) is greater than 1, for example, for determining the resources and/or the number of coded modulation symbols.

The wireless device 2702 may determine the number of coded modulation symbols per layer of the CG-PUSCH transmission for the first UCI transmission, for example, based on (e.g., in response to) determining the CG-PUSCH transmission not comprising HARQ-ACK bits and comprising the first UCI/CG-UCI/enhanced CG-UCI bits. The wireless device may determine the number of coded modulation symbols per layer of the CG-PUSCH transmission for the first UCI transmission, for example, based on the first beta offset and/or the second beta offset. The wireless device may determine the first UCI comprising the CG-UCI/enhanced CG-UCI bits. In some examples, the first UCI may not comprise the CG-UCI bits.

The wireless device 2702 may determine the number of coded modulation symbols per layer of the CG-PUSCH transmission for the first UCI transmission, for example, based on (e.g., in response to) determining the CG-PUSCH transmission comprising the CG-UCI bits and the first UCI bits (e.g., enhanced CG-UCI bits) and not comprising the HARQ-ACK bits. The wireless device may determine the number of coded modulation symbols per layer of the CG-PUSCH transmission for the first UCI transmission, for example, based on the first beta offset. Alternatively, the wireless device may determine the number of coded modulation symbols per layer of the CG-PUSCH transmission for the first UCI transmission, for example, based on (e.g., in response to) determining the CG-PUSCH transmission comprising the CG-UCI bits and/or the first UCI bits (e.g., enhanced CG-UCI bits) and not comprising the HARQ-ACK bits. The wireless device may determine the number of coded modulation symbols per layer of the CG-PUSCH transmission for the first UCI transmission, for example, based on the second beta offset. The wireless device may determine the number of coded modulation symbols per layer of the CG-PUSCH transmission for the first UCI transmission (or perform the rate matching), for example, based on (e.g., in response to) determining the CG-PUSCH transmission comprising HARQ-ACK bits and the first UCI bits (e.g., the enhanced CG-UCI bits). The wireless device may determine the number of coded modulation symbols per layer of the CG-PUSCH transmission for the first UCI transmission (or perform the rate matching), for example, based on a beta offset corresponding to the HARQ-ACK $$\beta_{offset}^{HARQ-ACK}$$

e.g., the second beta offset)

The wireless device 2702 may determine uci-MuxWithDiffPrio being configured. For example, the wireless device may multiplex the first UCI (e.g., enhanced CG-UCI bits) on the CG-PUSCH. The wireless device may determine HARQ-ACK being associated with priority index 0/1, and/or the first UCI/CG-UCI/enhance CG-UCI being associated with priority index 1, and/or the CSI comprising the CSI part 1, for example, for the transmission of the CG-PUSCH. The wireless device may perform rate matching for HARQ-ACK with priority index 1 by taking HARQ-ACK with priority index 1 as HARQ-ACK and replacing $$\beta_{offset}^{PUSCH}$$

by $$\beta_{offset}^{HARQ-ACK-HP},$$

for example, based on determining HARQ-ACK bits associated with priority index 1 being sent (e.g., transmitted) without the first UCI (e.g., enhanced CG-UCI) associated with priority index 1. The wireless device may perform rate matching for the first UCI (e.g., enhanced CG-UCI) with priority index 1, for example, based on the first UCI (e.g., enhanced CG-UCI) associated with priority index 1 being sent (e.g., transmitted) without HARQ-ACK bits associated with priority index 1. For example, the wireless device may perform rate matching for the first UCI (e.g., enhanced CG-UCI) with priority index 1, for example, based on the first UCI (e.g., enhanced CG-UCI) associated with priority index 1 being sent (e.g., transmitted) without HARQ-ACK bits associated with priority index 1. For example, the wireless device may perform rate matching for the first UCI with priority index 1 and HARQ-ACK with priority index 1, for example, based on both the first UCI (e.g., enhanced CG-UCI) associated with priority index 1 and HARQ-ACK bits associated with priority index 1 being sent (e.g., transmitted), for example, by taking HARQ-ACK with priority index 1 as HARQ-ACK and replacing $$\beta_{offset}^{PUSCH}$$

by $$\beta_{offset}^{HARQ-ACK-HP}.$$

For example, the wireless device may perform rate matching for the first UCI (e.g., enhanced CG-UCI) with priority index 1 and HARQ-ACK with priority index 1, for example, based on both first UCI (e.g., enhanced CG-UCI) associated with priority index 1 and HARQ-ACK bits associated with priority index 1 being sent (e.g., transmitted), by taking HARQ-ACK with priority index 1 as HARQ-ACK and replacing $$\beta_{offset}^{PUSCH}$$

by $$\beta_{offset}^{HARQ-ACK-HP}.$$

The wireless device may perform rate matching for the CSI part 1 by taking HARQ-ACK with priority index 1 as HARQ-ACK, and/or taking the first UCI (e.g., enhanced CG-UCI) associated with priority index 1 as the CG-UCI, for example, based on CSI part 1 being sent (e.g., transmitted) on the CG-PUSCH and the CG-PUSCH being associated with priority index 1. The wireless device may perform rate matching for HARQ-ACK with priority index 0 by taking HARQ-ACK with priority index 0 as the CSI part 2 and replacing $$\beta_{offset}^{PUSCH}$$

by $$\beta_{offset}^{HARQ-ACK-LP},$$

and taking HARQ-ACK with priority index 1 as HARQ-ACK, and taking the first UCI (e.g., enhanced CG-UCI) associated with priority index 1 as the CG-UCI, for example, based on CSI part 1 being sent (e.g., transmitted) on the CG-PUSCH and the CG-PUSCH being associated with priority index 1. The wireless device may perform rate matching for HARQ-ACK with priority index 0 by taking HARQ-ACK with priority index 0 as CSI-part 1 and replacing $$\beta_{offset}^{PUSCH}$$

by $$\beta_{offset}^{HARQ-ACK-LP},$$

and taking HARQ-ACK with priority index 1 as HARQ-ACK, and taking the first UCI (e.g., enhanced CG-UCI) associated with priority index 1 as the CG-UCI, for example, if CSI part 1 is not sent (e.g., transmitted) on the CG-PUSCH and/or the CG-PUSCH is not associated with priority index 1.

The wireless device 2702 may determine uci-MuxWithDiffPrio being configured. For example, the wireless device may determine the first UCI (e.g., enhanced CG-UCI) being sent (e.g., transmitted)/multiplexed on the CG-PUSCH associated with priority index 0. The wireless device may, for the transmission of the CG-PUSCH, determine HARQ-ACK being associated with priority index 0/1, and/or the first UCI (e.g., enhanced CG-UCI) being associated with priority index 0, and/or the CSI comprising the CSI part 1. The wireless device may perform rate matching for HARQ-ACK with priority index 1 by taking HARQ-ACK with priority index 1 as HARQ-ACK and replacing $$\beta_{offset}^{PUSCH}$$

by $$\beta_{offset}^{HARQ-ACK-HP}.$$

By taking the first UCI (e.g., enhanced CG-UCI) associated with priority index 0 as CSI-part 1 and replacing $$\beta_{offset}^{PUSCH}$$

by $$\beta_{offset}^{CG-UCI}$$

and taking HARQ-ACK with priority index 1 as HARQ-ACK, the wireless device may perform rate matching for the first UCI (e.g., enhanced CG-UCI) associated with priority index 0 based on the first UCI (e.g., enhanced CG-UCI) associated with priority index 0 is sent (e.g., transmitted) without HARQ-ACK bits associated with priority index 0. By taking the first UCI (e.g., enhanced CG-UCI) associated with priority index 0 and HARQ-ACK bits associated with priority index 0 as CSI-part 1 and replacing $$\beta_{offset}^{PUSCH}$$

by $$\beta_{offset}^{HARQ-ACK-LP}$$

and taking HARQ-ACK with priority index 1 as HARQ-ACK, the wireless device may perform rate matching for the first UCI (e.g., enhanced CG-UCI) associated with priority index 0 and HARQ-ACK bits associated with priority index 0 based on both the first UCI (e.g., enhanced CG-UCI) associated with priority index 0 and HARQ-ACK bits associated with priority index 0 being sent (e.g., transmitted) on the CG-PUSCH transmission. The wireless device may perform rate matching for CSI part 1 by taking CSI part 1 as CSI part 2 and replacing $$\beta_{offset}^{PUSCH}$$

by $$\beta_{offset}^{CSI-part1},$$

taking the first UCI/CG-UCI associated with priority index 0 and HARQ-ACK bits associated with priority index 0 if any as CSI-part 1 and taking HARQ-ACK with priority index 1 as HARQ-ACK, for example, based on the CSI part 1 being sent (e.g., transmitted) on the CG-PUSCH and the CG-PUSCH being associated with priority index 0.

The wireless device 2702 may determine whether the CG-UCI is present or not and/or whether the HARQ-ACK (e.g., HARQ-ACK part 1 and/or HARQ-ACK part 2) is present or not and/or whether the CSI (e.g., CSI part 1 and/or CSI part 2) is present or not, for example, if the first UCI is present for transmission on the CG-PUSCH (e.g., with UL-SCH). For example, the wireless device may combine the first UCI with the CG-UCI (if present) and consider the combination of the first UCI and the CG-UCI as the enhanced CG-UCI, for example, by concatenating the coded bits of the first UCI with coded bits of the CG-UCI. The wireless device may concatenate the coded bits of the first UCI with coded bits of the CG-UCI, for example, based on the first UCI and the CG-UCI being associated with similar/same priority index x (x=1 or 0). For example, the wireless device may consider the enhanced CG-UCI comprising the first UCI bits as a CG-UCI associated with priority index 1 or priority index 0. The wireless device may consider the first UCI as the CG-UCI for determining the resources for multiplexing with the CG-PUSCH, for example, if the CG-UCI is not present. The wireless device may consider the enhanced CG-UCI (or concatenated coded bits) as the CG-UCI for determining the resources for multiplexing with the CG-PUSCH, for example, if the CG-UCI is present. The base station may configure the wireless device for concatenating coded bits of the first UCI with the coded bits of the CG-UCI (e.g., via a configured parameter in the one or more CG configuration parameters).

The wireless device 2702 may send (e.g., transmit) the first UCI (e.g., the enhanced CG-UCI) by multiplexing the first UCI by a PUSCH resource/occasion (e.g., the CG-PUSCH or a DG-PUSCH). For example, the wireless device may determine that the one or more configuration parameters enable/configure multiplexing of the first UCI with the CG-PUSCH. The base station may configure the wireless device for multiplexing the first UCI with the CG-PUSCH via a configured parameter (e.g., via a configured parameter in the one or more CG configuration parameters). The configured parameter may be cg-UCI-Multiplexing. For example, the configured parameter may be different from cg-UCI-Multiplexing. The wireless device may send (e.g., transmit) the first UCI via/using a PUCCH resource/occasion of the at least one PUCCH resource/occasion, for example, based on (e.g., in response to) the configured parameter not being configured/enabled (or being absent from the one or more configuration parameters). For example, the wireless device may determine the PUCCH occasion not overlapping/colliding with the CG-PUSCH resource/occasion. The wireless device may multiplex the first UCI with the CG-PUSCH, for example, based on (e.g., in response to) the configured parameter being configured/enabled (e.g., cg-UCI-Multiplexing) and/or the PUCCH occasion overlapping/colliding with the CG-PUSCH resource/occasion.

The CG-PUSCH resource/occasion may correspond to a CG occasion of the first CG configuration or a second CG configuration of the at least one CG configuration. For the CG-PUSCH transmission comprising the first UCI, the wireless device may multiplex the first UCI in the CG-PUSCH transmission.

The wireless device 2702 may multiplex the first indication (e.g., the enhanced CG-UCI and/or the CG-UCI) and/or at least one HARQ-ACK information in the CG-PUSCH transmission, for example, if the one or more configuration parameters enable/configure multiplexing (e.g., via cg-UCI-Multiplexing). The wireless device may jointly encode the first UCI (e.g., the enhanced CG-UCI) with the at least one HARQ-ACK information. For example, the wireless device may jointly encode the first UCI and the CG-UCI, for example, to obtain/derive/calculate the enhanced CG-UCI. For example, the wireless device may determine a number of resources for multiplexing the combined information (e.g., comprising the at least one HARQ-ACK information, the CG-UCI, and/or the first UCI and/or the CSI) in the CG-PUSCH using one or more beta offset values. For example, the wireless device may determine whether the CG-PUSCH transmission may correspond to a priority index 0 (e.g., low priority) or a priority index 1 (e.g., high priority). For example, the wireless device may determine whether a HARQ-ACK information (of the at least one HARQ-ACK information) is with a priority 0 (e.g., low priority) or with a priority 1 (e.g., high priority). For example, the first index $$I_{offset}^{XX-UCI}$$

may correspond to the first UDI with a priority index 0 (e.g., low priority). For example, the first index $$I_{offset}^{XX-UCI}$$

may correspond to the first UDI with a priority index 1 (e.g., high priority). For example, to multiplex the first UCI in the CG-PUSCH transmission, the wireless device may determine the one or more configuration parameter configuring/indicating cg-RetransmissionTimer.

The wireless device 2702 may refrain from multiplexing/sending (e.g., transmitting) the first UCI with a high priority transmission. For example, the wireless device 2702 may refrain from multiplexing/sending (e.g., transmitting) the first UCI with a high priority CG-PUSCH transmission. The wireless device may determine that the priority of the first UCI is low (e.g., the low priority).

The wireless device 2702 may refrain from multiplexing/sending (e.g., transmitting) the first UCI with a low priority transmission. For example, the wireless device 2702 may refrain from multiplexing/sending (e.g., transmitting) the first UCI with a low priority CG-PUSCH transmission. The wireless device may determine that the priority of the first UCI is high (e.g., the high priority).

The wireless device 2702 may multiplex/send (e.g., transmit) the first UCI regardless of the priority. For example, the wireless device may multiplex/send (e.g., transmit) the first UCI regardless of the priority of the first UCI and/or regardless of the priority of the CG-PUSCH. For example, the wireless device may ignore the priority of the first UCI. The wireless device may ignore the priority of the CG-PUSCH. The CG-UCI may have a priority index x, for example, if the CG-UCI comprises the unused/unusable/recyclable information of (the at least one CG occasion of) the first CG configuration. The priority index x may be 0. The priority index x may be 1.

The wireless device 2702 may apply an offset value, for example, for transmission of the first UCI (e.g., by multiplexing the first UCI with the CG-PUSCH). For example, the wireless device may apply a beta offset value of one or more beta offset values. The beta offset value may be the first beta offset value. The beta offset value may be the second beta offset value. For example, the wireless device may reuse one or more configuration parameters for transmission/multiplexing of the CG-UCI in the CG-PUSCH transmission. The wireless device may use the second beta offset for transmission of the first indication (e.g., the first UCI/CG-UCI/enhanced CG-UCI) via/using the CG-PUSCH.

An offset value (e.g., a beta offset value) may be based on the offset value of other control information (e.g., acknowledgement). For example, the beta offset value may be based on the beta offset value of the HARQ-ACK. The beta offset value may be provided by CG-UCI-OnPUSCH='semiStatic' corresponding to the first UCI (e.g., unused/unusable/recyclable information of (the at least one CG occasion of) the first CG configuration). The wireless device may apply a beta offset value of the one or more beta offset values (e.g., the $$\beta_{offset}^{XX})$$

that is determined from CG-UCI-OnPUSCH='dynamic' (e.g., a first/initial/starting value of CG-UCI-OnPUSCH='dynamic' or a second value of CG-UCI-OnPUSCH='dynamic' and/or a last/final/ending value of CG-UCI-OnPUSCH='dynamic'), for example, if the first CG configuration is the Type 2 CG configuration and the one or more configuration parameters comprise/configure/indicate CG-UCI-OnPUSCH='dynamic'. For example, the wireless device may apply $$\beta_{offset}^{HARQ-ACK},\ \beta_{offset}^{CSI-1},\ \text{and}\ \beta_{offset}^{CSI-2}$$

values corresponding to HARQ-ACK information, Part 1 CSI reports and Part 2 CSI reports. For example, the wireless device may determine the one or more configuration parameters comprise uci-MuxWithDiffPrio or uci-MuxWithDiffPrio-secondaryPUCCHgroup for enabling multiplexing a high-priority (HP) HARQ-ACK UCI and a low-priority (LP) HARQ-ACK UCI into a CG-PUSCH.

The CG-PUSCH may correspond to a CG occasion (e.g., CGO #n in FIG. 27) of the plurality of CG occasions of the first CG configuration. The CG occasion may be a starting/first/initial/earliest CG occasion of the first CG configuration (e.g., n=1). For example, CG occasion may be a last/final/ending/latest CG occasion of the first CG configuration (e.g., n=3). For example, the CG occasion may not be one of the at least one CG occasion (e.g., n=2). The CG occasion may be one or the at least one CG occasion. The CG-PUSCH may correspond to a CG occasion of a second CG configuration of the at least one CG configuration. As shown in FIG. 27, the CG-PUSCH may be within/during a CG period of a CG configuration (e.g., the first CG configuration) of the at least one CG configuration.

The wireless device 2702 may multiplex a transport block corresponding to a transmission and UCI. For example, the wireless device 2702 may multiplex a transport block corresponding to the CG-PUSCH transmission and UCI (comprising the coded modulation bits/rate matched bits of the UCI sequence bits). For example, the UCI may comprise the first UCI (e.g., the enhanced CG-UCI) and/or the at least one HARQ-ACK information and/or the CG-UCI and/or CSI report. For example, the wireless device may multiplex/modulate/generate coded bits of CG-PUSCH, for example, for sending (e.g., transmitting) the first indication via/using the CG-PUSCH transmission occasion. The coded bits of the CG-PUSCH may comprise coded bits of data and coded bits coded bits of the first UCI (e.g., the enhanced CG-UCI). The coded bits of the first UCI (e.g., the enhanced CG-UCI) may correspond to a jointly coded bits of the first UCI and the coded bits of the at least one HARQ-ACK information (when the high layer parameter cg-UCI-Multiplexing is configured). For example, the coded bits of the first UCI may comprise coded bits of the CG-UCI. The wireless device may jointly code bits of the first UCI and the bits of the CG-UCI. The coded bits of the first UCI may not comprise the coded bits of the CG-UCI and/or the coded bits of the at least one HARQ-ACK information. For example, the coded bits of the CG-PUSCH may comprise coded bits for CSI (e.g., CSI part 1 or CSI part 2), and/or the coded bits for the CG-UCI without HARQ-ACK.

Examples may allow multiplexing of the first UCI (e.g., corresponding to the first indication) into the CG-PUSCH transmission. Examples described herein may allow resource allocation for transmission of the first indication via/using the CG-PUSCH. Examples may improve resource allocation and/or reduce decoding error at the base station for receiving the first indication.

A wireless device may perform a method comprising multiple operations. The wireless device may receive one or more radio resource control (RRC) configuration parameters. The one or more RRC configuration parameters may comprise: an indication of a plurality of configured grant (CG) physical uplink shared channel (PUSCH) transmission occasions of a CG configuration; and an offset value associated with multiplexing, in a first CG PUSCH occasion of the plurality of CG PUSCH occasions, uplink control information (UCI). The wireless device may multiplex, in the first CG PUSCH occasion and based on the offset value, the UCI. The wireless device may transmit, during the first CG PUSCH occasion, the UCI. The UCI may indicate a second CG PUSCH occasion of the plurality of CG PUSCH occasions is unused. The RRC configuration parameters may further comprise a second offset value associated with multiplexing, in the first CG PUSCH occasion, CG-UCI. The CG-UCI may indicate at least a hybrid automatic repeat request (HARQ) process number of the first CG PUSCH occasion. The one or more RRC configuration parameters may further comprise an indication to enable transmission of the UCI. The wireless device may multiplex, in a second CG PUSCH occasion of the plurality of CG PUSCH occasions and based on a second offset of the one or more RRC configuration parameters, the UCI and second UCI. The second UCI may comprise at least one hybrid automatic repeat request (HARQ) acknowledgment information bit. The one or more RRC configuration parameters may enable joint encoding of the UCI and second UCI. A priority index of the UCI may equal a priority index of the CG configuration. The wireless device may determine resources for transmission of the UCI during the first CG PUSCH occasion. The determining the resources may be based on at least one of: a number of bits of the UCI; or a number of cyclic redundancy check (CRC) bits of the UCI. The RRC configuration parameters may further comprise a second offset value associated with multiplexing, in the first CG PUSCH occasion, CG-UCI. The CG-UCI may indicate at least a hybrid automatic repeat request (HARQ) process number of the first CG PUSCH occasion. The CG-UCI may further indicate at least one of: a redundancy version (RV) of the first CG PUSCH occasion; a new data indicator (NDI) of the first CG PUSCH occasion; or a channel occupancy time (COT) sharing. The RRC configuration parameters may further comprise: a second offset value associated with multiplexing, in the first CG PUSCH occasion, CG-UCI that may indicate at least a hybrid automatic repeat request (HARQ) process number of the first CG PUSCH occasion, and indexes associated with determining a quantity of resources, in a CG PUSCH occasion of the plurality of CG PUSCH occasions, for the UCI, the CG-UCI, and second UCI comprising at least one hybrid automatic repeat request (HARQ) acknowledgement information bit. The wireless device may receive an activation command associated with activating the CG configuration. The transmitting the UCI may be based on transmitting a physical uplink control channel (PUCCH). The first CG PUSCH occasion may be a last symbol of the PUCCH carrying the UCI. The offset value may be based on a processing capability of the wireless device. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

A wireless device may perform a method comprising multiple operations. The wireless device may receive one or more radio resource control (RRC) configuration parameters. The one or more RRC configuration parameters may comprise: an indication of a plurality of configured grant (CG) physical uplink shared channel (PUSCH) transmission occasions of a CG configuration; a first offset value associated with multiplexing, in a first CG PUSCH occasion of the plurality of CG PUSCH occasions, uplink control information (UCI); and a second offset value associated with multiplexing, in the first CG PUSCH occasion, CG-UCI that may indicate at least a hybrid automatic repeat request (HARQ) process number of the first CG PUSCH occasion. The wireless device may multiplex, in the first CG PUSCH occasion and based on the first offset value, the UCI. The wireless device may transmit, during the first CG PUSCH occasion, the UCI. The UCI may indicate a second CG PUSCH occasion of the plurality of CG PUSCH occasions is unused. The one or more RRC configuration parameters may further comprise an indication to enable transmission of the UCI. The CG-UCI may further indicate at least one of: a redundancy version (RV) of the first CG PUSCH occasion; a new data indicator (NDI) of the first CG PUSCH occasion; or a channel occupancy time (COT) sharing. The one or more RRC configuration parameters may further comprise indexes associated with determining a quantity of resources, in a CG PUSCH occasion of the plurality of CG PUSCH occasions, for the UCI, the CG-UCI, and second UCI comprising at least one hybrid automatic repeat request (HARQ) acknowledgement information bit. The wireless device may multiplex, in a third CG PUSCH occasion of the plurality of CG PUSCH occasions and based on a third offset value of the one or more RRC parameters, the UCI and second UCI. The second UCI may comprise at least one hybrid automatic repeat request (HARQ) acknowledgement information bit. The one or more RRC configuration parameters may enable joint encoding of the UCI and second UCI. The wireless device may determine resources for transmission of the UCI during the first CG PUSCH occasion. The determining the resources may be based on at least one of: a number of bits of the UCI; or a number of cyclic redundancy check (CRC) bits of the UCI. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

A wireless device may perform a method comprising multiple operations. The wireless device may receive one or more radio resource control (RRC) configuration parameters. The one or more RRC configuration parameters may comprise: a plurality of configured grant (CG) physical uplink shared channel (PUSCH) transmission occasions of a CG configuration; an indication to enable transmission of uplink control information (UCI) indicating one or more unused CG PUSCH occasions of the plurality of CG PUSCH occasions; and an offset value associated with multiplexing, in a CG PUSCH occasion of the plurality of CG PUSCH occasions, the UCI. The wireless device may multiplex, in the CG PUSCH occasion and based on the offset value, the UCI. The wireless device may transmit, during the CG PUSCH occasion, the UCI indicating the one or more unused CG PUSCH occasions. The RRC configuration parameters may further comprise a second offset value associated with multiplexing, in the CG PUSCH occasion, CG-UCI. The CG-UCI may indicate at least a hybrid automatic repeat request (HARQ) process number of the CG PUSCH occasion. The wireless device may determine resources for transmission of the UCI during the CG PUSCH occasion. The determining the resources may be based on at least one of: a number of bits of the UCI; or a number of cyclic redundancy check (CRC) bits of the UCI. The wireless device may multiplex, in a second CG PUSCH occasion of the plurality of CG PUSCH occasions and based on a second offset of the one or more RRC configuration parameters, the UCI and second UCI. The second UCI may comprise at least one hybrid automatic repeat request (HARQ) acknowledgement information bit. The one or more RRC configuration parameters may enable joint encoding of the UCI and second UCI. A priority index of the UCI may equal a priority index of the CG configuration. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

A wireless device may perform a method comprising multiple operations. The wireless device may receive one or more radio resource control (RRC) configuration parameters. The one or more RRC configuration parameters may indicate: a plurality of configured grant (CG) physical uplink shared channel (PUSCH) transmission occasions of a CG configuration; a first beta offset for multiplexing a first uplink control information (UCI) in a first CG PUSCH occasion of the plurality of CG PUSCH occasions; and a second beta offset for multiplexing a CG-UCI in the first CG PUSCH occasion. The first UCI may indicate that a second CG PUSCH occasion of the plurality of CG PUSCH occasions is unused. The CG-UCI may indicate at least a hybrid automatic repeat request (HARQ) process number of the first CG PUSCH occasion. The wireless device may multiplex, based on the first beta offset, the first UCI in the first CG PUSCH occasion. The wireless device may send (e.g., transmit) the first UCI, for example, during the first CG PUSCH occasion. The one or more RRC configuration parameters may indicate an indication enabling the transmission of the first UCI. The wireless device may multiplex the first UCI and a second UCI in a third CG PUSCH occasion of the plurality of CG PUSCH occasions based on a third beta offset. The one or more RRC configuration parameters may indicate the third beta offset for multiplexing the second UCI in the third CG PUSCH occasion. The second UCI may comprise at least one hybrid automatic repeat request (HARQ) acknowledgement information bit. The one or more RRC configuration parameters may enable joint encoding of the first UCI and the second UCI in the third CG PUSCH occasion. A priority index of the first UCI may be equal to a priority index of the CG configuration. The CG-UCI may further indicate at least one of: a redundancy version (RV) of the first CG PUSCH; a new data indicator (NDI) of the first CG PUSCH; or a channel occupancy time (COT) sharing. The first UCI may not comprise at least one of: The HARQ number of the first CG PUSCH occasion; a redundancy version (RV) of the first CG PUSCH occasion; a new data indicator (NDI) of the first CG PUSCH occasion; or a channel occupancy time (COT) sharing. The one or more RRC configuration parameters may indicate one or more indexes for determining a number of resources of the first UCI, the CG-UCI, and the second UCI in a CG PUSCH occasion of the plurality of CG PUSCH occasions. A first index of the one or more indexes may correspond to the first UCI. The first beta offset may be based on the first index. A second index of the one or more indexes may correspond to the CG-UCI. The second beta offset may be based on the second index. A third index of the one or more indexes may correspond to the third UCI. The third beta offset may be based on the third index. The wireless device may determine resources for the transmission of the first UCI during the first CG PUSCH occasion based on at least one of: a number of bits of the first UCI; or a number of cyclic redundancy check (CRC) bits of the first UCI. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

A wireless device may perform a method comprising multiple operations. The wireless device may receive one or more radio resource control (RRC) configuration parameters. The one or more RRC configuration parameters may indicate: a plurality of CG physical uplink shared channel (PUSCH) occasions of a CG configuration; and a first priority index of the CG configuration. The wireless device may send (e.g., transmit), during a first CG PUSCH occasion of the plurality of CG PUSCH occasions, an uplink control information (UCI), with a priority index of the first priority index, indicating a second CG PUSCH occasion of the plurality of CG PUSCH occasions being unused. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

A wireless device may perform a method comprising multiple operations. The wireless device may receive one or more radio resource control (RRC) configuration parameters. The one or more RRC configuration parameters may indicate: a plurality of CG physical uplink shared channel (PUSCH) occasions of a CG configuration; and an indication enabling a transmission of an uplink control information (UCI) indicating whether a CG PUSCH occasion of the plurality of CG PUSCH occasions being unused. The wireless device may transmit, during a first CG PUSCH occasion of the plurality of CG PUSCH occasions, the UCI indicating a second CG PUSCH occasion of the plurality of CG occasions is unused, for example, based on the indication. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

A wireless device may perform a method comprising multiple operations. The wireless device may receive one or more radio resource control (RRC) configuration parameters. The one or more RRC configuration parameters may indicate a plurality of CG physical uplink shared channel (PUSCH) occasions of a CG configuration. The wireless device may send (e.g., transmit), during a first CG PUSCH occasion of the plurality of CG PUSCH occasions, an uplink control information (UCI) indicating a second CG PUSCH occasion of the plurality of CG PUSCH occasions being unused. The wireless device may refrain from transmitting uplink data during the second CG PUSCH occasion, for example, based on the transmitting the UCI. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

A wireless device may perform a method comprising multiple operations. The wireless device may send (e.g., transmit), at/in/during a first occasion, an uplink control information (UCI) indicating a configured grant (CG) occasion of a plurality of CG occasions of a CG configuration is unused/unusable/suspended. The wireless device may receive a downlink control information (DCI) scheduling a physical uplink shared channel (PUSCH) transmission that overlaps in time with the CG occasion. The wireless device may send (e.g., transmit) the PUSCH transmission during the CG occasion based on the transmission of the UCI indicating the CG occasion is unused, for example, based on (e.g., in response to) the receiving the DCI within a second offset prior to the CG occasion. The wireless device may receive one or more configuration parameters indicating the plurality of CG occasions/resources, per CG period, of the CG configuration. Each CG occasion of the plurality of CG occasions may be a physical uplink shared channel (PUSCH) occasion. The CG configuration may be a Type 1 configured grant. The CG configuration may be a Type 2 configured grant. The wireless device may receive an activation command activating the CG configuration. The activation command may activate the plurality of CG occasions. The activation command may activate a subset of CG occasions of the plurality of CG occasions. The subset of CG occasions may comprise the CG occasion. The sending (e.g., transmitting) the UCI may be based on sending (e.g., transmitting) a physical uplink control channel (PUCCH). The first occasion may be a last/final/ending symbol of the PUCCH carrying the UCI. The sending (e.g., transmitting) the UCI may be based on sending (e.g., transmitting) a second PUSCH. The second PUSCH may be different than the PUSCH scheduled by the DCI. The occasion may be a last/final/ending symbol of a transmission occasion of the second PUSCH. The wireless device may multiplex the UCI with data of the second PUSCH transmission based on a beta offset. The one or more configuration parameters may indicate the beta offset. The beta offset may be different than a second beta offset corresponding to a CG-UCI. The UCI may be a CG-UCI. The UCI may be different than a CG-UCI. The DCI may be received after a first offset from the first occasion. The DCI may indicate a first hybrid automatic repeat request (HARQ) process number. The first HARQ process number may be different than a HARQ process number corresponding to the CG occasion. The first HARQ process number may be the same as a HARQ process number corresponding to the CG occasion. The second offset may be different than the first offset. The second offset may be based on a processing capability of the wireless device. The second offset may be based on one or more subcarrier spacings. The one or more subcarrier spacings may comprise a first subcarrier spacing of a PUSCH corresponding to the CG occasion and a second subcarrier spacing corresponding to a physical downlink control channel (PDCCH) carrying the DCI. The one or more configuration parameters may indicate/configure the first offset. The first offset may be pre-defined (hardcoded) for the wireless device. The first offset may be based on a processing capability of the wireless device. The processing capability of the wireless device may be based on a PUSCH preparation time and/or a PDSCH preparation time. The first offset may be based on one or more subcarrier spacings. The one or more subcarrier spacings may comprise a first subcarrier spacing of a PUSCH corresponding to the at least one CG occasion and a second subcarrier spacing corresponding to a physical downlink control channel (PDCCH) carrying the second DCI. The second PUSCH transmission may be via/using a second CG occasion of the CG configuration. The wireless device may determine the one or more configuration parameters configure the wireless device for multiplexing the UCI with the second PUSCH transmission. The second CG occasion may be a starting CG occasion of the CG configuration. The second CG occasion may be an ending CG occasion of the CG configuration. The second CG occasion corresponds to a CG occasion of the CG configuration that the UCI becomes available. The second CG occasion may be before the CG occasion. The second CG occasion may be the CG occasion. The DCI may be received within the second offset from a starting symbol of the CG occasion. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

A wireless device may perform a method comprising multiple operations. The wireless device may communicate (receive or send (e.g., transmit)), at/in a first occasion, an indication indicating at least one configured grant (CG) occasion of a CG configuration is unused/unusable/recyclable/suspend-able. The wireless device may receive a downlink control information (DCI) indicating/scheduling a communication (transmission or reception) of a signal/channel during a set of symbols. At least one symbol of the set of symbols may overlap/collide with a CG occasion of the at least one CG occasion. The wireless device may send (e.g., transmit) the PUSCH transmission during the at least one CG occasion based on the communicating the indication indicating the at least one CG occasion is unused, for example, based on (e.g., in response to) the receiving the DCI within a second offset prior to the at least one CG occasion. The wireless device may determine the receiving the DCI being after a first offset from the first occasion. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

A wireless device may perform a method comprising multiple operations. The wireless device may communicate (receive or send (e.g., transmit)), at/in a first occasion, an indication indicating at least one configured grant (CG) occasion of a CG configuration is unused/unusable/recyclable/suspend-able. The wireless device may receive a downlink control information (DCI) indicating/scheduling a communication (transmission or reception) of a signal/channel during a set of symbols. At least one symbol of the set of symbols may overlap/collide with a CG occasion of the at least one CG occasion. The wireless device may communicate (send (e.g., transmit)/receive) the signal during the set of symbols, for example, based on (e.g., in response to) the receiving the DCI after a first offset from the first occasion. The wireless device may determine the receiving the DCI being within a second offset from a starting of the CG occasion. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

A wireless device may perform a method comprising multiple operations. The wireless device may communicate (receive or send (e.g., transmit)), at/in a first occasion, an indication indicating at least one configured grant (CG) occasion of a CG configuration is unused/unusable/recyclable/suspend-able. The wireless device may receive a downlink control information (DCI) indicating/scheduling a communication (transmission or reception) of a signal/channel during a set of symbols. At least one symbol of the set of symbols may overlap/collide with a CG occasion of the at least one CG occasion. The wireless device may refrain from communicating (sending (e.g., transmitting)/receiving) the signal during the set of symbols based on (e.g., in response to): the receiving the DCI within a first offset from the first occasion; and the receiving the DCI within a second offset prior to the at least one CG occasion. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

A wireless device may perform a method comprising multiple operations. The wireless device may communicate (receive or send (e.g., transmit)), at/in a first occasion, an indication indicating at least one configured grant (CG) occasion of a plurality of CG occasions of a CG configuration is unused/unusable. The wireless device may receive a downlink control information (DCI) indicating a transmission of physical uplink shared channel (PUSCH) during a first transmission duration. The first transmission duration may overlap in time with the at least one CG occasion. The wireless device may send (e.g., transmit) the PUSCH during the first transmission duration, and, for example, based on (e.g., in response to) the receiving the DCI being after a first offset from the first occasion. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

A wireless device may perform a method comprising multiple operations. The wireless device may communicate (receive or send (e.g., transmit)), at/in a first occasion, an indication indicating at least one configured grant (CG) occasion of a plurality of CG occasions of a CG configuration is unused/unusable. The wireless device may receive a downlink control information (DCI) indicating a transmission of physical uplink shared channel (PUSCH) during a first transmission duration. The first transmission duration may overlap in time with the at least one CG occasion. The wireless device may send (e.g., transmit) the PUSCH during the first transmission duration, for example, based on (e.g., in response to): the receiving the DCI being within a first offset from the first occasion; and a starting of the at least one CG occasion being after a second offset from the receiving of the DCI. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

A wireless device may perform a method comprising multiple operations. The wireless device may communicate (receive or send (e.g., transmit)), at/in a first occasion, an indication indicating at least one configured grant (CG) occasion of a plurality of CG occasions of a CG configuration may be unused/unusable. The wireless device may receive a downlink control information (DCI) indicating a reception of a downlink signal (PDSCH/CSI-RS) during a first reception duration. The first reception duration may overlap in time with the at least one CG occasion. The wireless device may receive the downlink signal reception during the first reception duration based on the communicating the indication indicating the at least one CG occasion is unused, for example, based on (e.g., in response to) the receiving the DCI within a second offset prior to the at least one CG occasion. The wireless device may determine the receiving the DCI being after a first offset from the first occasion. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

A wireless device may perform a method comprising multiple operations. The wireless device may communicate (receive or send (e.g., transmit)), at/in a first occasion, an indication indicating at least one configured grant (CG) occasion of a plurality of CG occasions of a CG configuration is unused/unusable. The wireless device may receive a downlink control information (DCI) indicating a reception of a downlink signal (PDSCH/CSI-RS) during a first reception duration. The first reception duration may overlap in time with the at least one CG occasion. The wireless device may receive the downlink signal reception during the first reception duration, for example, based on (e.g., in response to) the receiving the DCI after a first offset from the first occasion. The wireless device may determine the receiving the DCI being within a second offset from a starting of the CG occasion. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

A wireless device may perform a method comprising multiple operations. The wireless device may communicate (receive or send (e.g., transmit)), at/in a first occasion, an indication indicating at least one configured grant (CG) occasion of a plurality of CG occasions of a CG configuration is unused/unusable. The wireless device may receive a downlink control information (DCI) indicating a reception of a downlink signal (PDSCH/CSI-RS) during a first reception duration. The first reception duration may overlap in time with the at least one CG occasion; The wireless device may receive the downlink signal reception during the first reception duration based on the communicating the indication indicating the at least one CG occasion is unused, for example, based on (e.g., in response to) the receiving the DCI after a first offset from the first occasion. The wireless device may determine the receiving the DCI being within a second offset from a starting of the CG occasion. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

A wireless device may perform a method comprising multiple operations. The wireless device may communicate (receive or send (e.g., transmit)), at/in a first occasion, an indication indicating at least one configured grant (CG) occasion of a CG configuration is unused/unusable/recyclable/suspend-able. The wireless device may receive a downlink control information (DCI) indicating/scheduling a communication (transmission or reception) of a signal/channel during a set of symbols. At least one symbol of the set of symbols may overlap/collide with a CG occasion of the at least one CG occasion. The wireless device may communicate (send (e.g., transmit)/receive) the signal during the set of symbols, for example, based on (e.g., in response to) the receiving the DCI after a first offset from the first occasion. The wireless device may receive one or more configuration parameters indicating a plurality of CG occasions/resources, per CG period, of the CG configuration. Each CG occasion of the plurality of CG occasions may be a physical uplink shared channel (PUSCH) occasion. The plurality of CG occasions may comprise the at least one CG occasion. The CG configuration may be a Type 1 configured grant. The CG configuration may be a Type 2 configured grant. The wireless device may receive an activation command activating the CG configuration. The activation command may activate the plurality of CG occasions. The activation command may activate a subset of CG occasions of the plurality of CG occasions. The subset of CG occasions may comprise the at least one CG occasion. The communicating the indication may comprise sending (e.g., transmitting) an uplink signal in/at the first occasion. The uplink signal may be at least one of: a physical uplink control channel (PUCCH). The first occasion may be a last/final/ending symbol of a transmission occasion of the PUCCH; or a PUSCH. The first occasion may be a last/final/ending symbol of a transmission occasion of the PUSCH. The indication may be based on an uplink medium access control (MAC) control element (CE). The uplink MAC CE may be sent (e.g., transmitted) via the PUSCH in/at the first occasion. The indication may comprise a first uplink control information (UCI) corresponding to the at least one CG occasion. The first UCI may be a CG-UCI. The first UCI may be different than CG-UCI. The communicating the indication may comprise receiving a downlink signal. The downlink signal may be at least one of: a physical downlink control channel (PDCCH). The first occasion may be a last/final/ending symbol of a reception occasion of the PDCCH; or a physical downlink shared channel (PDSCH). The first occasion may be a last/final/ending symbol of a transmission occasion of the PDSCH. The indication may be based on a downlink medium access control (MAC) control element (CE). The downlink MAC CE may be received via/using the PDSCH. The communicating the indication may comprise: sending (e.g., transmitting) a first uplink signal to the base station; and based on (e.g., in response to) the sending (e.g., transmitting) the first uplink signal, receiving a first downlink signal indicating a confirmation indication. The first occasion may correspond to a transmission occasion of the first uplink signal. The first occasion may correspond to a reception occasion of the first downlink signal. The wireless device may determine a starting of the at least one CG occasion being at least a second offset from the receiving the DCI. The second offset may be different than the first offset. The second offset may be based on a processing capability of the wireless device. The second offset may be based on one or more subcarrier spacings. The one or more subcarrier spacings may comprise a first subcarrier spacing of a PUSCH corresponding to the at least one CG occasion and a second subcarrier spacing corresponding to a physical downlink control channel (PDCCH) carrying the second DCI. The signal may be a first PDSCH or a channel state information (CSI) reference signal (RS). The signal may be a first PUSCH. The one or more configuration parameters may indicate/configure the first offset. The first offset may be pre-defined (hardcoded) for the wireless device. The first offset may be based on a processing capability of the wireless device. The processing capability of the wireless device may be based on a PUSCH preparation time and/or a PDSCH preparation time. The second offset may be based on one or more subcarrier spacings. The one or more subcarrier spacings may comprise a first subcarrier spacing of a PUSCH corresponding to the at least one CG occasion and a second subcarrier spacing corresponding to a physical downlink control channel (PDCCH) carrying the second DCI. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

A base station may perform a method comprising multiple operations. The base station may receive, from a wireless device, an uplink control information (UCI) indicating a configured grant (CG) occasion of a plurality of CG occasions of a CG configuration being unused/unusable/suspended. The base station may send (e.g., transmit), to the wireless device, a downlink control information (DCI) scheduling a physical uplink shared channel (PUSCH) transmission that may overlap in time with the CG occasion. The base station may receive, from the wireless device, the PUSCH transmission during the CG occasion based on the reception of the UCI indicating the CG occasion may be unused, for example, based on (e.g., in response to) the sending (e.g., transmitting) the DCI within a second offset prior to the CG occasion. The base station may comprise one or more processors; and memory storing instructions that, when executed by the one or more processors, cause the base station to perform the described method, additional operations and/or include the additional elements. A system may comprise a base station configured to perform the described method, additional operations and/or include the additional elements. A computer-readable medium may store instructions that, when executed, cause performance of the described method, additional operations, and/or include the additional elements.

A base station may perform a method comprising multiple operations. The base station may communicate (receive or send (e.g., transmit)), at/in a first occasion, an indication indicating at least one configured grant (CG) occasion of a CG configuration is unused/unusable/recyclable/suspendable. The base station may send (e.g., transmit), to a wireless device, a downlink control information (DCI) indicating/scheduling a communication (transmission or reception) of a signal/channel during a set of symbols. At least one symbol of the set of symbols may overlap/collide with a CG occasion of the at least one CG occasion. The base station may receive, from the wireless device, the PUSCH transmission during the at least one CG occasion based on the communicating the indication indicating the at least one CG occasion is unused, for example, based on (e.g., in response to) the sending (e.g., transmitting) the DCI within a second offset prior to the at least one CG occasion. The base station may determine the sending (e.g., transmitting) the DCI being after a first offset from the first occasion. The base station may comprise one or more processors; and memory storing instructions that, when executed by the one or more processors, cause the base station to perform the described method, additional operations and/or include the additional elements. A system may comprise a base station configured to perform the described method, additional operations and/or include the additional elements. A computer-readable medium may store instructions that, when executed, cause performance of the described method, additional operations, and/or include the additional elements.

A base station may perform a method comprising multiple operations. The base station may communicate (receive or send (e.g., transmit)), at/in a first occasion, an indication indicating at least one configured grant (CG) occasion of a CG configuration is unused/unusable/recyclable/suspendable. The base station may send (e.g., transmit), to a wireless device, a downlink control information (DCI) indicating/scheduling a communication (transmission or reception) of a signal/channel during a set of symbols. At least one symbol of the set of symbols may overlap/collide with a CG occasion of the at least one CG occasion. The base station may communicate (send (e.g., transmit)/receive) with the wireless device the signal during the set of symbols, for example, based on (e.g., in response to) the sending (e.g., transmitting) the DCI after a first offset from the first occasion. The base station may determine the receiving the DCI being within a second offset from a starting of the CG occasion. The base station may comprise one or more processors; and memory storing instructions that, when executed by the one or more processors, cause the base station to perform the described method, additional operations and/or include the additional elements. A system may comprise a base station configured to perform the described method, additional operations and/or include the additional elements. A computer-readable medium may store instructions that, when executed, cause performance of the described method, additional operations, and/or include the additional elements.

A base station may perform a method comprising multiple operations. The base station may communicate (receive or send (e.g., transmit)), at/in a first occasion, an indication indicating at least one configured grant (CG) occasion of a CG configuration is unused/unusable/recyclable/suspendable. The base station may send (e.g., transmit), to a wireless device, a downlink control information (DCI) indicating/scheduling a communication (transmission or reception) of a signal/channel during a set of symbols. At least one symbol of the set of symbols may overlap/collide with a CG occasion of the at least one CG occasion. The base station may refrain from communicating (sending (e.g., transmitting)/receiving) with the wireless device the signal during the set of symbols based on (e.g., in response to): the sending (e.g., transmitting) the DCI within a first offset from the first occasion; and the sending (e.g., transmitting) the DCI within a second offset prior to the at least one CG occasion. The base station may comprise one or more processors; and memory storing instructions that, when executed by the one or more processors, cause the base station to perform the described method, additional operations and/or include the additional elements. A system may comprise a base station configured to perform the described method, additional operations and/or include the additional elements. A computer-readable medium may store instructions that, when executed, cause performance of the described method, additional operations, and/or include the additional elements.

A base station may perform a method comprising multiple operations. The base station may communicate (receive or send (e.g., transmit)), at/in a first occasion, an indication indicating at least one configured grant (CG) occasion of a plurality of CG occasions of a CG configuration is unused/unusable. The base station may send (e.g., transmit), to a wireless device, a downlink control information (DCI) indicating a transmission of physical uplink shared channel (PUSCH) during a first transmission duration. The first transmission duration may overlap in time with the at least one CG occasion. The base station may receive, from the wireless device, the PUSCH during the first transmission duration, for example, based on (e.g., in response to) the sending (e.g., transmitting) the DCI being after a first offset from the first occasion. The base station may comprise one or more processors; and memory storing instructions that, when executed by the one or more processors, cause the base station to perform the described method, additional operations and/or include the additional elements. A system may comprise a base station configured to perform the described method, additional operations and/or include the additional elements. A computer-readable medium may store instructions that, when executed, cause performance of the described method, additional operations, and/or include the additional elements.

A base station may perform a method comprising multiple operations. The base station may communicate (receive or send (e.g., transmit)), at/in a first occasion, an indication indicating at least one configured grant (CG) occasion of a plurality of CG occasions of a CG configuration is unused/unusable. The base station may send (e.g., transmit), to a wireless device, a downlink control information (DCI) indicating a transmission of physical uplink shared channel (PUSCH) during a first transmission duration. The first transmission duration may overlap in time with the at least one CG occasion. The base station may receive, from the wireless device, the PUSCH during the first transmission duration based on (e.g., in response to): the sending (e.g., transmitting) the DCI being within a first offset from the first occasion; and a starting of the at least one CG occasion being after a second offset from the sending (e.g., transmitting) of the DCI. The base station may comprise one or more processors; and memory storing instructions that, when executed by the one or more processors, cause the base station to perform the described method, additional operations and/or include the additional elements. A system may comprise a base station configured to perform the described method, additional operations and/or include the additional elements. A computer-readable medium may store instructions that, when executed, cause performance of the described method, additional operations, and/or include the additional elements.

A base station may perform a method comprising multiple operations. The base station may communicate (receive or send (e.g., transmit)), at/in a first occasion, an indication indicating at least one configured grant (CG) occasion of a plurality of CG occasions of a CG configuration is unused/unusable. The base station may send (e.g., transmit), to a wireless device, a downlink control information (DCI) indicating a reception of a downlink signal (PDSCH/CSI-RS) during a first reception duration. The first reception duration may overlap in time with the at least one CG occasion. The base station may send (e.g., transmit) to the wireless device the downlink signal reception during the first reception duration based on the communicating the indication indicating the at least one CG occasion is unused, for example, based on (e.g., in response to) the sending (e.g., transmitting) the DCI within a second offset prior to the at least one CG occasion. The base station may determine the receiving the DCI being after a first offset from the first occasion. The base station may comprise one or more processors; and memory storing instructions that, when executed by the one or more processors, cause the base station to perform the described method, additional operations and/or include the additional elements. A system may comprise a base station configured to perform the described method, additional operations and/or include the additional elements. A computer-readable medium may store instructions that, when executed, cause performance of the described method, additional operations, and/or include the additional elements.

A base station may perform a method comprising multiple operations. The base station may communicate (receive or send (e.g., transmit)), at/in a first occasion, an indication indicating at least one configured grant (CG) occasion of a plurality of CG occasions of a CG configuration is unused/unusable. The base station may send (e.g., transmit), to a wireless device, a downlink control information (DCI) indicating a reception of a downlink signal (PDSCH/CSI-RS) during a first reception duration. The first reception duration may overlap in time with the at least one CG occasion. The base station may send (e.g., transmit) to the wireless device the downlink signal reception during the first reception duration, for example, based on (e.g., in response to) the sending (e.g., transmitting) the DCI after a first offset from the first occasion. The base station may determine the receiving the DCI being within a second offset from a starting of the CG occasion. The base station may comprise one or more processors; and memory storing instructions that, when executed by the one or more processors, cause the base station to perform the described method, additional operations and/or include the additional elements. A system may comprise a base station configured to perform the described method, additional operations and/or include the additional elements. A computer-readable medium may store instructions that, when executed, cause performance of the described method, additional operations, and/or include the additional elements.

A base station may perform a method comprising multiple operations. The base station may communicate (receive or send (e.g., transmit)), at/in a first occasion, an indication indicating at least one configured grant (CG) occasion of a plurality of CG occasions of a CG configuration is unused/unusable. The base station may send (e.g., transmit) to the wireless device a downlink control information (DCI) indicating a reception of a downlink signal (PDSCH/CSI-RS) during a first reception duration. The first reception duration may overlap in time with the at least one CG occasion. The base station may send (e.g., transmit) to the wireless device the downlink signal reception during the first reception duration based on the communicating the indication indicating the at least one CG occasion is unused, for example, based on (e.g., in response to) the sending (e.g., transmitting) the DCI after a first offset from the first occasion. The base station may determine the receiving the DCI being within a second offset from a starting of the CG occasion. The base station may comprise one or more processors; and memory storing instructions that, when executed by the one or more processors, cause the base station to perform the described method, additional operations and/or include the additional elements. A system may comprise a base station configured to perform the described method, additional operations and/or include the additional elements. A computer-readable medium may store instructions that, when executed, cause performance of the described method, additional operations, and/or include the additional elements.

A wireless device may perform a method comprising multiple operations. The wireless device may send (e.g., transmit), to a base station, a first indication indicating at least one configured grant (CG) occasion of a CG configuration is unused/unusable/recyclable. The wireless device may determine uplink data being available for transmission, for example, after sending (e.g., transmitting) the first indication. The wireless device may send (e.g., transmit) a third indication indicating requesting/increasing/activating one or more CG occasions. The one or more CG occasions may comprise the at least one CG occasion. The uplink data may be available during a window from the sending (e.g., transmitting) the first indication. The at least one CG occasion may be not available for transmission, for example, during the window. The wireless device may receive a fourth indication based on (e.g., in response to) the sending (e.g., transmitting) the third indication. The fourth indication may indicate the at least one CG occasion of the CG configuration being available for transmission of the uplink data. The fourth indication may be based on DCI or a MAC CE. The DCI may be a group-common DCI. The wireless device may determine a remaining time of the uplink data being smaller than a threshold. The wireless device may determine a delay budget of the uplink data being violated. The uplink data may comprise one or more packet data unit (PDU) set. The wireless device may trigger a buffer status report (BSR) based on uplink data being available for transmission. The BSR may comprise delay information or remaining time of one or more PDUs. The third indication may be an enhanced BSR MAC CE. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

A wireless device may perform a method comprising multiple operations. The wireless device may receive one or more configuration parameters indicating: one or more bandwidth parts (BWPs); and a configurated grant (CG) configuration of a first BWP of the one or more BWPs. The CG configuration may comprise a plurality of CG occasions per CG period of the CG configuration. The wireless device may communicate with a base station, via/using/on the first BWP, an indication indicating at least one CG occasion of the CG configuration being unused/unusable/recyclable/suspended. The wireless device may switch, after the communicating the first indication, to a second BWP of the one or more BWPs. The wireless device may reinitialize the at least one CG occasion of the CG configuration according to the CG configuration, for example, based on (e.g., in response to) the switching from the first BWP to the second BWP. The one or more configuration parameters may enable/configure the wireless device to reinitialize the at least one CG occasion of the CG configuration based on (e.g., in response to) a BWP switching. The communicating an indication with the base station may comprise sending (e.g., transmitting) a first indication to the base station. The communication an indication with the base station may comprise receiving a second indication from the base station. The wireless device may consider the at least one CG occasion of the CG configuration being available/allowable for uplink transmission with configured grant on the first BWP. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

A wireless device may perform a method comprising multiple operations. The wireless device may receive one or more configuration parameters indicating: one or more bandwidth parts (BWPs); and a configurated grant (CG) configuration of a first BWP of the one or more BWPs. The CG configuration may comprise a plurality of CG occasions per CG period of the CG configuration. The wireless device may communicate with a base station, via/using/on the first BWP, an indication indicating at least one CG occasion of the CG configuration being unused/unusable/recyclable/suspended. The wireless device may switch, after the communicating the first indication, to a second BWP of the one or more BWPs. The wireless device may avoid/skip reinitializing the at least one CG occasion of the CG configuration according to the CG configuration, for example, based on (e.g., in response to) the switching from the first BWP to the second BWP. The one or more configuration parameters may enable/configure the wireless device to avoid/skip reinitializing the at least one CG occasion of the CG configuration based on (e.g., in response to) a BWP switching. The communicating an indication with the base station may comprise sending (e.g., transmitting) a first indication to the base station. The communication an indication with the base station may comprise receiving a second indication from the base station. The wireless device may consider the at least one CG occasion of the CG configuration not being available/allowable for uplink transmission with configured grant on the first BWP. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

A wireless device may perform a method comprising multiple operations. The wireless device may receive one or more configuration parameters indicating: one or more bandwidth parts (BWPs); and a configurated grant (CG) configuration of a first BWP of the one or more BWPs. The CG configuration may comprise a plurality of CG occasions per CG period of the CG configuration. The wireless device may communicate with a base station, via/using/on the first BWP, an indication indicating CG at least once occasion of the CG configuration being unused/unusable/recyclable/suspended. The wireless device may switch, after the communicating the first indication, to a second BWP of the one or more BWPs. The wireless device may reinitialize the at least one CG occasion of the CG configuration according to the CG configuration, for example, based on (e.g., in response to) the switching from the second BWP to the first BWP. The one or more configuration parameters may enable/configure the wireless device to reinitialize the at least one CG occasion of the CG configuration based on (e.g., in response to) a BWP switching. The communicating an indication with the base station may comprise sending (e.g., transmitting) a first indication to the base station. The communication an indication with the base station may comprise receiving a second indication from the base station. The wireless device may consider the at least one CG occasion of the CG configuration being available/allowable for uplink transmission with configured grant on the first BWP. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

A wireless device may perform a method comprising multiple operations. The wireless device may receive one or more configuration parameters indicating: one or more bandwidth parts (BWPs); and a configurated grant (CG) configuration of a first BWP of the one or more BWPs. The CG configuration may comprise a plurality of CG occasions per CG period of the CG configuration. The wireless device may communicate with a base station, via/using/on the first BWP, an indication indicating at least one of CG occasion the CG configuration being unused/unusable/recyclable/suspended. The wireless device may switch, after the communicating the first indication, to a second BWP of the one or more BWPs. The wireless device may avoid/skip reinitializing the at least one CG occasion of the CG configuration according to the CG configuration, for example, based on (e.g., in response to) the switching from the second BWP to the first BWP. The one or more configuration parameters may enable/configure the wireless device to avoid/skip reinitializing the at least one CG occasion of the CG configuration based on (e.g., in response to) a BWP switching. The communicating an indication with the base station may comprise sending (e.g., transmitting) a first indication to the base station. The communication of an indication with the base station may comprise receiving a second indication from the base station. The wireless device may consider the at least one CG occasion of the CG configuration not being available/allowable for uplink transmission with configured grant on the first BWP. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

A wireless device may perform a method comprising multiple operations. The wireless device may receive one or more configuration parameters indicating: one or more bandwidth parts (BWPs); and a configurated grant (CG) configuration of at least one BWP of the one or more BWPs. The CG configuration may comprise a plurality of CG occasions per CG period of the CG configuration. The wireless device may communicate with a base station, via/using/on the first BWP of the at least one BWP, an indication indicating at least one CG occasion of the CG configuration being unused/unusable/recyclable/suspended. The wireless device may switch, after the communicating the first indication, to a second BWP of the at least one BWP. The wireless device may reinitialize the at least one CG occasion of the CG configuration according to the CG configuration, for example, based on (e.g., in response to) the switching from the first BWP to the second BWP. The communicating an indication with the base station may comprise sending (e.g., transmitting) a first indication to the base station. The communication an indication with the base station may comprise receiving a second indication from the base station. The wireless device may consider the at least one CG occasion of the CG configuration being available/allowable for uplink transmission with configured grant on the second BWP. The wireless device may switch from the second BWP to the first BWP. The wireless device may consider, based on (e.g., in response to) the switching from the second BWP to the first BWP, the at least one CG occasion of the CG configuration being available/allowable for uplink transmission with configured grant on the first BWP. The wireless device may switch from the second BWP to the first BWP. The wireless device may consider, based on (e.g., in response to) the switching from the second BWP to the first BWP, the at least one CG occasion of the CG configuration not being available/allowable for uplink transmission with configured grant on the first BWP. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

A wireless device may perform a method comprising multiple operations. The wireless device may receive one or more configuration parameters indicating: one or more bandwidth parts (BWPs); and a configurated grant (CG) configuration of at least one BWP of the one or more BWPs. The CG configuration may comprise a plurality of CG occasions per CG period of the CG configuration. The wireless device may communicate with a base station, via/using/on the first BWP of the at least one BWP, an indication indicating at least one CG occasion of the CG configuration being unused/unusable/recyclable/suspended. The wireless device may switch, after the communicating the first indication, to a second BWP of the at least one BWP. The wireless device may avoid/skip reinitializing the at least one CG occasion of the CG configuration according to the CG configuration, for example, based on (e.g., in response to) the switching from the first BWP to the second BWP. The communicating an indication with the base station may comprise sending (e.g., transmitting) a first indication to the base station. The communication an indication with the base station may comprise receiving a second indication from the base station. The wireless device may consider the at least one CG occasion of the CG configuration not being available/allowable for uplink transmission with configured grant on the second BWP. The wireless device may switch from the second BWP to the first BWP. Based on (e.g., in response to) the switching from the second BWP to the first BWP, the wireless device may avoid/skip reinitializing the at least one CG occasion of the CG configuration according to the CG configuration. The wireless device may consider, based on (e.g., in response to) the switching from the second BWP to the first BWP, the at least one CG occasion of the CG configuration not being available/allowable for uplink transmission with configured grant on the first BWP. The wireless device may switch from the second BWP to the first BWP. Based on (e.g., in response to) the switching from the second BWP to the first BWP, the wireless device may reinitialize the at least one CG occasion of the CG configuration according to the CG configuration. The wireless device may consider, based on (e.g., in response to) the switching from the second BWP to the first BWP, the at least one CG occasion of the CG configuration being available/allowable for uplink transmission with configured grant on the first BWP. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

A wireless device may perform a method comprising multiple operations. The wireless device may receive one or more configuration parameters indicating: a plurality of configured grant (CG) occasions of a CG configuration per CG period of the CG configuration; one or more beta offsets for multiplexing uplink control information (UCI) with a CG physical uplink shared channel (PUSCH) transmission. The wireless device may multiplex with the CG-PUSCH a first UCI based on a first beta offset of the one or more beta offsets and a second UCI based on a second beta offset of the one or more beta offsets. The first UCI may comprise information regarding at least one CG occasion of the plurality of CG occasions being unused/recyclable. The second UCI may be a CG-UCI. The wireless device may send (e.g., transmit) the CG-PUSCH comprising the first UCI and the second UCI. The wireless device may determine resources for the multiplexing the first UCI with the CG-PUSCH transmission based on the first beta offset. The first beta offset may be different than the second beta offset. The first beta offset may be the same as the second beta offset. The wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements. A computer-readable medium may store instructions that, when executed, cause performance of the described method, additional operations, and/or include the additional elements.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, 6G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described herein, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:

receiving, by a wireless device, one or more radio resource control (RRC) configuration parameters comprising:

an indication of a plurality of configured grant (CG) physical uplink shared channel (PUSCH) transmission occasions of a CG configuration; and an offset value associated with multiplexing, in a first CG PUSCH transmission occasion of the plurality of CG PUSCH transmission occasions, uplink control information (UCI) that indicates whether at least one CG PUSCH transmission occasion, of the plurality of CG PUSCH transmission occasions, is unused;

multiplexing, in the first CG PUSCH transmission occasion and based on the offset value, the UCI; and transmitting, during the first CG PUSCH transmission occasion, the UCI, wherein the UCI is multiplexed in the first CG PUSCH transmission occasion and indicates that a second CG PUSCH transmission occasion, of the plurality of CG PUSCH transmission occasions, is unused.

2. The method of claim 1, wherein the RRC configuration parameters further comprise a second offset value associated with multiplexing, in the first CG PUSCH transmission occasion, CG-UCI that indicates at least a hybrid automatic repeat request (HARQ) process number of the first CG PUSCH transmission occasion, and wherein the method further comprises multiplexing, in the first CG PUSCH transmission occasion and based on the second offset value, the CG-UCI.

3. The method of claim 1, wherein the one or more RRC configuration parameters further comprise an indication to enable transmission of the UCI.

4. The method of claim 1, further comprising multiplexing, in a third CG PUSCH transmission occasion of the plurality of CG PUSCH transmission occasions and based on a second offset value of the one or more RRC configuration parameters, the UCI and second UCI, wherein the second UCI comprises at least one hybrid automatic repeat request (HARQ) acknowledgment information bit.

5. The method of claim 1, wherein the one or more RRC configuration parameters enable joint encoding of the UCI and second UCI.

6. The method of claim 1, wherein a priority index of the UCI equals a priority index of the CG configuration.

7. The method of claim 1, further comprising determining resources for transmission of the UCI during the first CG PUSCH transmission occasion, wherein the determining the resources is based on at least one of:

a number of bits of the UCI; or a number of cyclic redundancy check (CRC) bits of the UCI.

8. A method comprising:

receiving, by a wireless device, one or more radio resource control (RRC) configuration parameters comprising:

an indication of a plurality of configured grant (CG) physical uplink shared channel (PUSCH) transmission occasions of a CG configuration;

a first offset value associated with multiplexing, in a first CG PUSCH transmission occasion of the plurality of CG PUSCH transmission occasions, uplink control information (UCI) that indicates whether at least one CG PUSCH transmission occasion, of the plurality of CG PUSCH transmission occasions, is unused; and a second offset value associated with multiplexing, in the first CG PUSCH transmission occasion, CG-UCI that indicates at least a hybrid automatic repeat request (HARQ) process number of the first CG PUSCH transmission occasion;

multiplexing, in the first CG PUSCH transmission occasion and based on the first offset value, the UCI; and transmitting, during the first CG PUSCH transmission occasion, the UCI, wherein the UCI is multiplexed in the first CG PUSCH transmission occasion and indicates that a second CG PUSCH transmission occasion, of the plurality of CG PUSCH transmission occasions, is unused.

9. The method of claim 8, wherein the one or more RRC configuration parameters further comprise an indication to enable transmission of the UCI.

10. The method of claim 8, wherein the CG-UCI further indicates at least one of:

a redundancy version (RV) of the first CG PUSCH transmission occasion;

a new data indicator (NDI) of the first CG PUSCH transmission occasion; or a channel occupancy time (COT) sharing.

11. The method of claim 8, wherein the one or more RRC configuration parameters further comprise indexes associated with determining a quantity of resources, in a CG PUSCH transmission occasion of the plurality of CG PUSCH transmission occasions, for the UCI, the CG-UCI, and second UCI, and wherein the second UCI comprises at least one hybrid automatic repeat request (HARQ) acknowledgement information bit.

12. The method of claim 8, further comprising multiplexing, in a third CG PUSCH transmission occasion of the plurality of CG PUSCH transmission occasions and based on a third offset value of the one or more RRC configuration parameters, the UCI and second UCI, wherein the second UCI comprises at least one hybrid automatic repeat request (HARQ) acknowledgement information bit.

13. The method of claim 8, wherein the one or more RRC configuration parameters enable joint encoding of the UCI and second UCI.

14. The method of claim 8, further comprising determining resources for transmission of the UCI during the first CG PUSCH transmission occasion, wherein the determining the resources is based on at least one of:

a number of bits of the UCI; or a number of cyclic redundancy check (CRC) bits of the UCI.

15. A method comprising:

receiving, by a wireless device, one or more radio resource control (RRC) configuration parameters comprising:

an indication of a plurality of configured grant (CG) physical uplink shared channel (PUSCH) transmission occasions of a CG configuration;

an indication to enable transmission of uplink control information (UCI) indicating one or more unused CG PUSCH transmission occasions of the plurality of CG PUSCH transmission occasions; and an offset value associated with multiplexing, in a CG PUSCH transmission occasion of the plurality of CG PUSCH transmission occasions, the UCI indicating the one or more unused CG PUSCH transmission occasions;

multiplexing, in the CG PUSCH transmission occasion and based on the offset value, the UCI; and transmitting, during the CG PUSCH transmission occasion, the UCI indicating the one or more unused CG PUSCH transmission occasions.

16. The method of claim 15, wherein the RRC configuration parameters further comprise a second offset value associated with multiplexing, in the CG PUSCH transmission occasion, CG-UCI that indicates at least a hybrid automatic repeat request (HARQ) process number of the CG PUSCH transmission occasion.

17. The method of claim 15, further comprising determining resources for transmission of the UCI during the CG PUSCH transmission occasion, wherein the determining the resources is based on at least one of:

a number of bits of the UCI; or a number of cyclic redundancy check (CRC) bits of the UCI.

18. The method of claim 15, further comprising multiplexing, in a second CG PUSCH transmission occasion of the plurality of CG PUSCH transmission occasions and based on a second offset value of the one or more RRC configuration parameters, the UCI and second UCI, wherein the second UCI comprises at least one hybrid automatic repeat request (HARQ) acknowledgement information bit.

19. The method of claim 15, wherein the one or more RRC configuration parameters enable joint encoding of the UCI and second UCI.

20. The method of claim 15, wherein a priority index of the UCI equals a priority index of the CG configuration.

* * * * *